US008869018B2

(12) United States Patent
Wang

(10) Patent No.: US 8,869,018 B2
(45) Date of Patent: *Oct. 21, 2014

(54) METHOD AND SYSTEM OF DELIVERY OF INFORMATION SERVICES COMBINED FROM MULTIPLE WEB-BASED SOURCES

(71) Applicant: Exceedland Incorporated, Carlsbad, CA (US)

(72) Inventor: Quanying Wang, Carlsbad, CA (US)

(73) Assignee: Exceedland Incorporated, Carlsbad, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,787

(22) Filed: Nov. 1, 2013

(65) Prior Publication Data
US 2014/0059034 A1    Feb. 27, 2014

Related U.S. Application Data

(63) Continuation of application No. 12/497,094, filed on Jul. 2, 2009, now Pat. No. 8,607,137.

(60) Provisional application No. 61/078,375, filed on Jul. 5, 2008, provisional application No. 61/169,722, filed on Apr. 16, 2009.

(51) Int. Cl.
G06F 17/00 (2006.01)
G06F 3/048 (2013.01)
G06F 17/30 (2006.01)

(52) U.S. Cl.
CPC .... G06F 17/30867 (2013.01); G06F 17/30873 (2013.01)
USPC ........................... 715/206; 715/240; 715/792

(58) Field of Classification Search
CPC .................................. G06Q 30/02; H04L 67/04
USPC ......... 715/204, 206, 219, 227, 234, 238, 240, 715/777, 783, 788, 790, 792
See application file for complete search history.

(56) References Cited

U.S. PATENT DOCUMENTS

| | | |
|---|---|---|
| 5,838,318 A | 11/1998 | Porter et al. |
| 6,658,419 B2 | 12/2003 | Pasquali |
| 6,832,355 B1 | 12/2004 | Duperrouzel et al. |
| 7,296,219 B1 | 11/2007 | Guttman et al. |
| 7,596,760 B2 | 9/2009 | Sauve et al. |
| 7,890,856 B2 | 2/2011 | Chiang |

(Continued)

OTHER PUBLICATIONS

Kandogan et al., "Elastic Windows: A Hierarchical Multi-Window World-Wide Web Browser", Proceedings of the 10th Annual ACM Symposium on User Interface Software and Technology (UIST '97), pp. 169-177, copyright ACM 1997.

*Primary Examiner* — Omar Abdul-Ali
*Assistant Examiner* — Andrew Tank
(74) *Attorney, Agent, or Firm* — Mark R. Malek; William A. Harding; Zies Widerman & Malek

(57) ABSTRACT

A computer implemented method for displaying a plurality of web pages within a single web browsing display area includes determining a Uniform Resource Locator (URL) for each of the plurality of web pages to be displayed. Each of the URLs may be determined from user inputs or predefined settings. The method may also include allocating a display region within the web browsing display area to define an allocated display region and displaying the one of the plurality of web pages within the allocated display region.

15 Claims, 46 Drawing Sheets

(56) References Cited

U.S. PATENT DOCUMENTS

| | | |
|---|---|---|
| 7,913,183 B2 | 3/2011 | Czerwinski et al. |
| 8,245,151 B2 | 8/2012 | Selig |
| 8,255,824 B2 * | 8/2012 | Selig ............................ 715/781 |
| 8,280,819 B2 * | 10/2012 | Davis et al. .................... 705/67 |
| 8,527,881 B2 * | 9/2013 | Selig ............................ 715/738 |
| 8,528,003 B2 * | 9/2013 | Everett-Church ............ 719/313 |
| 8,607,137 B2 | 12/2013 | Wang |
| 2006/0224951 A1 | 10/2006 | Burke et al. |
| 2008/0072157 A1 | 3/2008 | Pally |
| 2008/0115081 A1 | 5/2008 | Sankaravadivelu et al. |
| 2008/0256467 A1 | 10/2008 | Chu et al. |

\* cited by examiner

METHOD AND SYSTEM OF DELIVERY OF INFORMATION SERVICES COMBINED FROM MULTIPLE WEB-BASED SOURCES

RELATED APPLICATIONS

This application is a continuation and claims the benefit under 35 U.S.C. §120 of pending U.S. patent application Ser. No. 12/497,094, titled Method And System For Enhancing Information Accessibility Via A Global Communication Network filed Jul. 9, 2009, by the inventor of the present application, which, in turn, claims the benefit of U.S. Provisional Patent Application Ser. No. 61/078,375 titled Intelligent Searching with Multiple Search Engines, Intelligent Browsing of Multiple Web Pages Simultaneously, Intelligent Entry Word Processing for Searching and/or Browsing, Intelligent Web Page Opening with Speed Access, Intelligent Web Page Commenting, Intelligent Online Bookmarks, and Intelligent Use of Proxy Searching and Browsing Statistics filed by the inventor of the present application on Jul. 5, 2008, and U.S. Provisional Patent Application Ser. No. 61/169,722 titled Method and Apparatus for Generating, Retrieving and Presenting Information to Improve Information Accessibility, to Secure Information Delivery and to Facilitate Information Access filed by the inventor of the present application on Apr. 16, 2009, the entire contents of each of which are incorporated herein by reference.

FIELD OF THE INVENTION

The present invention relates to the field of global communications network information retrieval and, more specifically to systems and methods for enhancing the ability to readily view information via a global communications network.

BACKGROUND

Global communications networks, such as, for example, the internet, have grown exponentially and, as such, information available via global communications networks have also grown. As the internet has gained popularity to become one of the largest computer networks in existence to connect the world together, internet browsing has become an important way for users to obtain and use information, knowledge, social connections and tool facilities.

Known internet browsing methods present one web page in one browser window or in one browser tab. Accordingly, users can only view and access one web page at a time. Some browsing services provide thumbnail icons for web pages in one browser window or one browser tab for users to view multiple web pages at once. These thumbnail icons, however, are not fully functional web pages. Instead, users have to open the corresponding web page to access its full functionality and content. In the meantime, monitors have become much bigger and wider than a decade ago when internet browsing just gained popularity. This trend is likely to continue in the foreseeable future. Generally, a significant portion of the monitor screen is left unused since only one browser window or one browse tab is being used to view the information on the web page. Accordingly, there exists a desire for users to obtain and be able to readily view information from the internet at an enhanced pace.

As the internet has flourished, so to have businesses and services built around internet, i.e., ecommerce. With many internet businesses and services available for users to select, readily accessible objective comments directed to those businesses and services have become especially helpful in guiding users. Many comment services are provided by the business or service providers themselves. Accordingly, objectiveness may be impaired because of an inherent conflict of interest. Some third party comment services exist for some businesses or services. Unfortunately, these third party comment services are not widely known to a majority of users and require multiple steps to reach the desired comment page.

The growth of the internet has made the ability to locate pertinent information somewhat difficult. Many known search engines deliver search results based on search keywords. This simplistic form of searching provides matches that may be beyond a user's desired search scope. Some known search services also conduct searches using a certain scope as described by certain special scope specification phases. These special scope specification phases are not readily known to most users. Also, entering these special scope specification phases may be slow due to their relatively long length. Further, due to business conflicts or special interest influences, some known search services block or bias certain information from being retrieved during a search.

Digital media has become a major information delivery vehicle. More specifically, people browse the Internet daily for email, news, and sports. There exist various web sites that provide users access to email, news and sports. Traditionally users are required to type in an access address, such as a URL, to access these information services. This may be tedious when it is desirous to browse several web sites. While some people use bookmarks to readily archive certain favorite websites, there still exists a requirement to go through several steps to go through a bookmark menu to retrieve the website. Bookmarks may also be disadvantageous in that users need to set up the bookmark websites.

The Internet has also changed users' traditional life and work style by providing vast tools without the need for user maintenance and upgrade. Accordingly, Internet tools may be scattered throughout various web sites, and may not be known to most internet users. When searching for proper tools, users may have a hard time figuring out what tools to use because so many tools are available over the Internet. Even when users know which tools to use, the user must still enter an access address and other related information to be applied by the tools.

Calculators are one of the most common tools used in our daily lives. Traditional calculators are simplistic and generally only provide one display row to show either a question or answer. Accordingly, users may easily lose track of the question that was presented for answering. This may be a problem when trying to determine if a question was entered correctly. While some calculators implemented in mobile phone devices or computers show both answers and questions at the same time, the answers may be shown below the questions, preventing the question from being modified when needed.

As legitimate ecommerce becomes prosperous on the internet, cybercrime, such as hacking, information breaching, and ID theft, has also grown. Hence, internet security has gained more and more importance when people are conducting additional business over the internet. Accordingly, web page access permission should be well defined and controlled. Traditionally, the permissions for web pages accesses have been controlled by username and password. This system has become cumbersome as several users have several different usernames and passwords used to access multiple websites. Alternately, the security of such a system is decreased as users generally select weak passwords which are easy to memorize and, as such, can be easily cracked. Accordingly, it is desirable to provide heightened security while maintaining ease of use. Some web pages provide unique URLs to control access without using user names and passwords. Only one class of permissions may generally be provided for such accesses. From a security perspective, it is desirable to have fine control over the life span of web pages. Existing web life span controls are based on a server defined time period, not a visit counter based life span control.

As more users browse the internet and even more websites, more web access addresses or URLs are shared between many users. Currently users share web access addresses or URLs by cutting and pasting individual addresses into messages to be sent as links. It is desirable to enable a user to share multiple web access addresses or URLs by simply transmitting one link.

SUMMARY OF THE INVENTION

In view of the foregoing, it is therefore an object of the present invention to, among other things, provide a mechanism for users to be able to open and/or view a plurality of web pages in a single browser display area (hereinafter sometimes referred to as a browser viewer, browser tab or browser window), preferably with the plurality of web pages being fully functional, fully viewable and scrollable (hereinafter sometimes referred to as scrollable full browser frames) to the left, right, top or bottom of the single browser viewer. These scrollable full browser frames would preferably visually present themselves side-by-side or otherwise adjacent to one another. This is referred to throughout this application as a "gallery view" which is a term readily understood by those skilled in the art. It is also an additional object of the present invention to create a single access address for multiple desired web pages, and when the single address is accessed, the corresponding multiple web pages are presented in fully functional view within a single browser viewer that is preferably scrollable to the left, right, top or bottom.

The present invention advantageously allows a user to view multiple fully functional web pages in one browser window or in one browser tab so that multiple web pages may be viewed and accessed at the same time. This advantageously provides for enhanced use of monitors in terms of resolution and size. Further, an enhanced amount of information may advantageously be viewed in an expedited manner, making, among other things, comparison shopping of the same or similar product at different vendors extremely easy. Additionally, such a fully functional multiple web page view will make it exceptionally easy to compare similar products when those products are available without need to resort to the somewhat popular comparison feature found on many websites that provides product comparison in table form. Using this invention, the same or similar product, for example, can each be viewed in its own fully functional web page displayed in the same browser area and compared by scrolling left, right, up or down.

Similarly, use of the present invention will make conducting research exceptionally easy because various references can all be displayed in full view within one browser window or browser tab and accessible by scrolling left, right, up or down. This is particularly advantageous because when one has multiple browser windows open or multiple tabs within a browser window the taskbar or browser tabs can become so cluttered that they collapse into a single tab of non-descript title. The present invention also advantageously includes an apparatus and methods for creating and presenting third party web page commenting services with one button click for users to quickly access desired third party comment pages. This advantageously allows for users to view or post objective comments on the third party comment pages.

The present invention also provides the ability for an end user to enter a search term, phrase, keyword or alphanumeric string (collectively referred to sometimes hereinafter as "search criteria) into a search field and then run a multiple searches using the entered text on a variety of different websites and/or search engines, including websites and/or search engines that are standardized (pre-selected) or user defined through default settings or through selection prior to running the search. These multiple searches can be run in sequence, simultaneously or nearly simultaneously. The returned pages may then propagate a corresponding number of scrollable full browser frames sufficient to display the information located on the various websites and/or search engines selected. This so-called "omnibus side-by-side search" could be conducted manually by an end user entering search criteria into a search field, or automated through computer implemented means to deliver a predetermined set of results, such as may be useful with respect to comparison shopping for a particular product or service. Such functionality may be extremely advantageous for online comparison shopping. In fact, this functionality is very advantageous for those companies that provide reviews and then offer comparison shopping opportunities.

The present invention also includes an apparatus and methods for conducting categorized searches for users. This allows a user to intuitively and quickly confine their searching scope to provide more pertinent searching results. The present invention also advantageously allows for multiple search services to provide unbiased and unblocked information accessing. The present invention further includes an apparatus and methods for providing speedy and intuitive categorized browsing for users to access desired browsing web sites or topics quickly and easily without the need to create and maintain up to date accessing information.

The present invention still further includes an apparatus and methods to provide tool invocation for users to launch desired high quality web tools quickly and easily without the need to evaluate which tools to use and the need to memorize or bookmark the tool access addresses and related access information. The present invention also includes a calculator showing questions and answers side-by-side in two displaying areas. This configuration provides better organization and easier comparison, thereby enabling users to enter questions in a natural way as taught in traditional math books, and giving users an intuitive experience of writing questions as though writing them on a sheet of paper. The questions can also be modified and the answer sheet may also be updated in real time to show corresponding results.

The present invention also advantageously includes an apparatus and method for providing secure pages with multiple classes of access permission and settings for master accesses and guest accesses. Users may also access secure pages with special access addresses. Security may include user names, passwords and IP addresses. The secure pages may expire after a predetermined period of time, or after a predetermined number of accesses. Life spans, access credentials and other settings may also be controlled by users. The present invention further advantageously includes an apparatus and methods for creating and a single access address and representing multiple web pages associated with the single access address.

These and other objects, features and advantages in accordance with the present invention are provided by a computer implemented method for displaying a plurality of web pages within a single web browsing display area, which may be a typical, full browser display window or tab, or a condensed space within a website or webpage. The method may include determining a Uniform Resource Locator (URL) for each of the plurality of web pages to be displayed. Each of the URLs may be determined from user inputs or predefined settings. The method may also include allocating at least one display region within the web browsing display area to define an allocated display region. The method may further include displaying at least one of the plurality of web pages within the allocated display region.

The method according to the present invention may still further include providing a search tool for receiving data inputted from a user via a user interface. The data may be defined as inputted data. The inputted data may be searched using a predetermined search engine or a customizable selected search engine specified by the user. The at least one web page may be defined as a first web page displayed within a first allocated display region within the single web browsing display area. This first allocated display region may, but does not need to be, devoted to providing the search functionality and features that will be used by the end user. The search results may be displayed in a second and subsequent web page positioned adjacent to or in proximity to the first web page in a second allocated display area. The first allocated display area and the second allocated display area may be positioned in side by side relationship within the single web browsing display area.

It should be readily understood by those of skill in the art that any number of additional web pages can be made to be visible within any number of allocated display areas. Furthermore, it is within the scope of the invention to have dynamically created additional display areas with such additional display areas being allocated and made available as necessary or required in order to assist a manual end user search, an automated search or any other type of predetermined search. In essence, the dynamic use of additional display areas allows for multiple related or even unrelated search results to be displayed on an as needed, or just in time, basis. This feature may facilitate the graphical display of potentially multiple searches with web pages positioned adjacent to, or in proximity to, one another. It is also within the scope of the present invention to allow for the overall collective searches to be memorialized in a static single URL which, when revisited, will reopen all of the previously viewed web pages in allocated display regions. This static, single URL may also be operatively selected to reopen upon subsequent visit less than all of the previously viewed web pages in a corresponding number of allocated display regions.

A plurality of additional web pages may be opened adjacent to or in close proximity thereto the first and/or second web pages within a respective plurality of additional allocated display areas. The first allocated display area, the second allocated display area and the respective plurality of additional allocated display areas may be positioned in side by side relationship within the single web browsing display area. The first allocated display area displaying the first web page, the second allocated display area displaying the second web page, and the respective plurality of additional allocated display areas displaying the respective plurality of additional web pages may be collectively defined as a plurality of allocated display areas. Each of the plurality of allocated display areas may be sized to be displayed within the single web browsing display area.

The method may also include providing a display customization tool to allow the user to customize a size of one or more of the plurality of allocated display areas. The method may further comprise providing a tool bar including a plurality of browsing control tools to be used by a user to navigate each of the plurality of web pages. The plurality of browsing tools may include a "back" button, a "reload" button, a "forward" button, an "open new window or tab" button, a "bookmark" button, a "comment" button or a "print" button. The tool bar may include a respective plurality of tool bars. Each one of the respective plurality of tool bars may be provided for each of the respective plurality of web pages displayed within the single web browsing display area.

The method according to the present invention may still further include providing a position adjustment tool to allow a user to adjust a position of at least one of the plurality of web pages displayed within the single web browsing area. The method may also include providing an address display tool to display a web address of each of the plurality of web pages displayed within the single web browsing area and providing a calculator tool to be selectively used by a user. The method may further include providing a merge tool to provide a link relating to displaying the plurality of allocated display areas displaying the plurality of web pages in at least one of a new web browser window and a new web browser tab. The method may still further include providing a categorized search tool to allow a user to conduct a search in one of a plurality of predetermined categories.

The present invention also includes a computer system for displaying a plurality of web pages within a single web browsing display area on a computer monitor. The system may include a server for receiving requests to provide information relating to each of the plurality of web pages. The system may further include a user interface in communication with the server. The user interface is adapted to be used to determine a URL for each of the plurality of web pages to be displayed. Each of the URLs may be determined from user inputs provided via the user interface or predefined settings. The display region may be allocated within the web browsing display area to define an allocated display region so that one of the plurality of web pages may be displayed within the allocated display region.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations, when used, refer to similar elements in alternate embodiments.

Described herein is a method and apparatus for information creation, retrieval and presentation. The method and apparatus of the present invention provides secure and robust information delivery with multiple sources and secure delivery channels and proxies. The method and apparatus of the present invention also facilitates information accesses with novel categorized search capabilities, categorized browsing, tool accessing, gallery view page presentation, comment page invocation, creation and presentation, URL merging and secure pages creation, customization and presentation, and a 2-sheet calculator.

Figure 1:
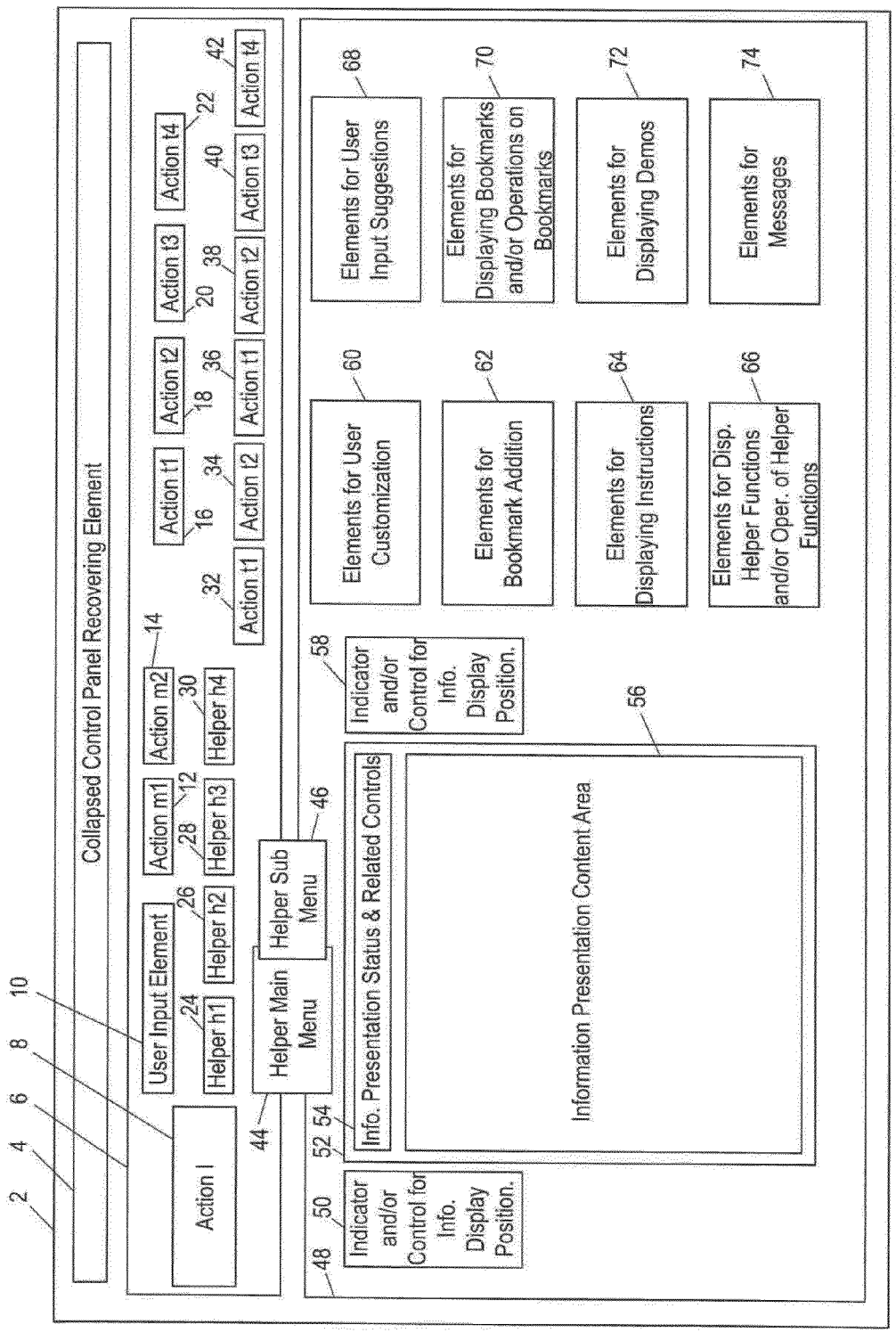
FIG. 1 is a schematic block diagram showing user interface elements of a system for delivery of information services combined for multiple web-based sources according to the present invention.
Figure 2:
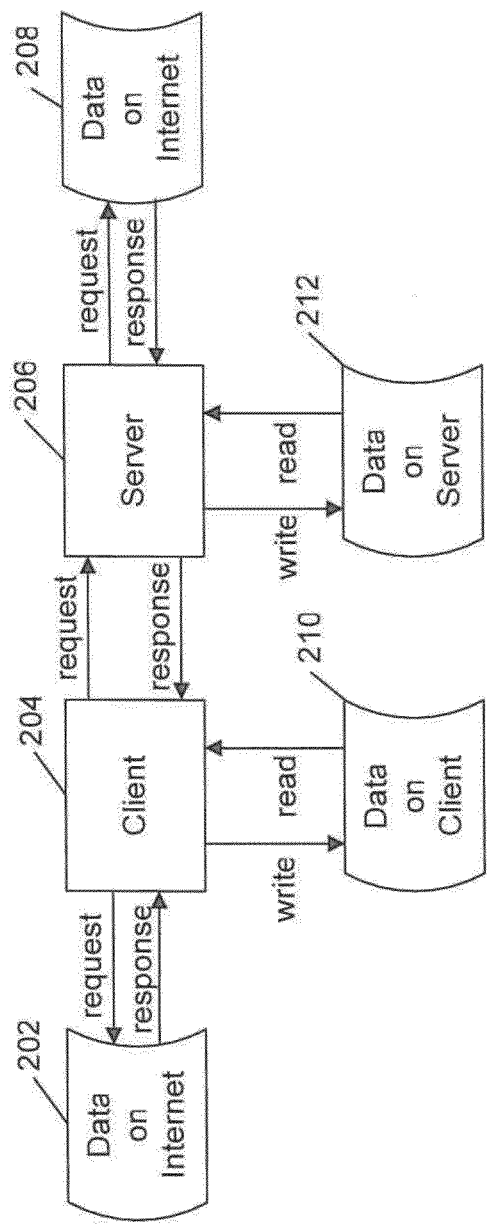
FIG. 2 is a block diagram showing the system according to the present invention.

Referring to the drawings, FIG. 2 shows the apparatus of the present invention. This embodiment includes an information server 206 and an information client 204. The information server responds to requests from the information client with information directly or indirectly either from data stored on sever local storage devices 212, or from data retrieved from the internet 208, or from both data stored on server local storage devices 212 and data retrieved from the internet 208. The information client may also retrieve information directly or indirectly from data stored on storage devices 210 local to the information client, or retrieve information directly or indirectly from internet services 202 other than the information server, or from both storage devices 210 local to the information client and from internet services 202 other than the information server, FIG. 1 shows one embodiment of a main user interface 2 on the information client 204 illustrated in FIG. 2. The main user interface 2 may contain a top control panel 6. The top control panel 6 may contain an action element 8. The action element 8 may be a logo, and upon clicking the logo, the action element 8 may activate the displaying of system default information.

The top control panel 6 may contain a user input element 10 to allow a user to enter search keywords or internet addresses such as URLs or IP addresses, for example. The user input element 10 may also allow the user to enter commands for categorized search, commands for categorized browsing, commands for tool accessing, and browsing shortcut keywords.

The top control panel 6 may contain an action element 12, upon the user clicking on the action element 12, the entries of the user input element 10 may be treated as for a search request, corresponding search operations may be carried out and corresponding search results may be presented. The top control panel 6 may contain an action element 14. Upon clicking the action element 14, the entries of the user input element 10 may be treated as a browsing request, corresponding browsing operations may be conducted and corresponding web pages may be presented.

The top control panel 6 may contain a plurality of helper elements 24, 26, 28 and 30. For example, by clicking the mouse or even hovering the mouse over the helper element 24, 26, 28, or 30, a corresponding helper main menu 44 may be shown. The helper element 24 and corresponding menus 44 and 46 may be updated with a corresponding description, color and icons for corresponding user entries to the user input element 10. The helper element 24 may be used to facilitate categorized search as illustrated, for example, in FIG. 16. The helper element 26 may be used to facilitate categorized browsing, as illustrated, for example, in FIG. 17. The helper element 28 may be used to facilitate web tool accessing, as illustrated, for example, in FIG. 18. The helper element 30 may be used to configure privacy settings, as illustrated, for example, in FIG. 19.

The top control panel 6 may contain additional plural action elements 16, 18, 20, 22, 32, 34, 36, 38, 40, and 42. Upon the user clicking on the action element 16, a sign-in user interface or web page may be presented in gallery view or in a new browser window or browser tab according to the configured page opening mode. Upon the user clicking on the action element 18, a corresponding user interlace or web page may be presented in gallery view or in a new browser window or browser tab according to the configured page opening mode for user to access online bookmarks. Upon the user clicking on the action element 20, a corresponding user interface or web page may be presented with help information in gallery view or in a new browser window or browser tab according to the configured page opening mode. Upon the user clicking on the action element 22, the top control panel 6 may toggle between hidden and stay shown.

Upon the user clicking on the action element 32, the visible region of the content area 48 may shift left by the width of a page in gallery view in the content area 48. The shifting of the visible region may be in slow motion like sliding, or may be instant. Upon the user clicking on the action element 34, the visible region of the content area 48 may be configured to toggle between shifting and not shifting to a newly added page presented in gallery view, or not shifting for every new sub page inserted into the content area 48. Upon the user clicking on the action element 36, the visible region of the content area 48 may shift right by the width of a page in gallery view in the content area 48. The shifting of the visible region may be in slow motion like sliding or may be instant.

Upon the user clicking on the action element 38, the width of the gallery view pages presented hi the content area 48 may be increased with a fixed or varying amount. Upon the user clicking on the action element 40, the width of the gallery view pages presented in the content area 48 may be set to predefined values. Upon the user clicking on the action element 42, the width of the gallery view pages presented in the content area 48 may be decreased with a fixed or varying amount.

Figure 16:
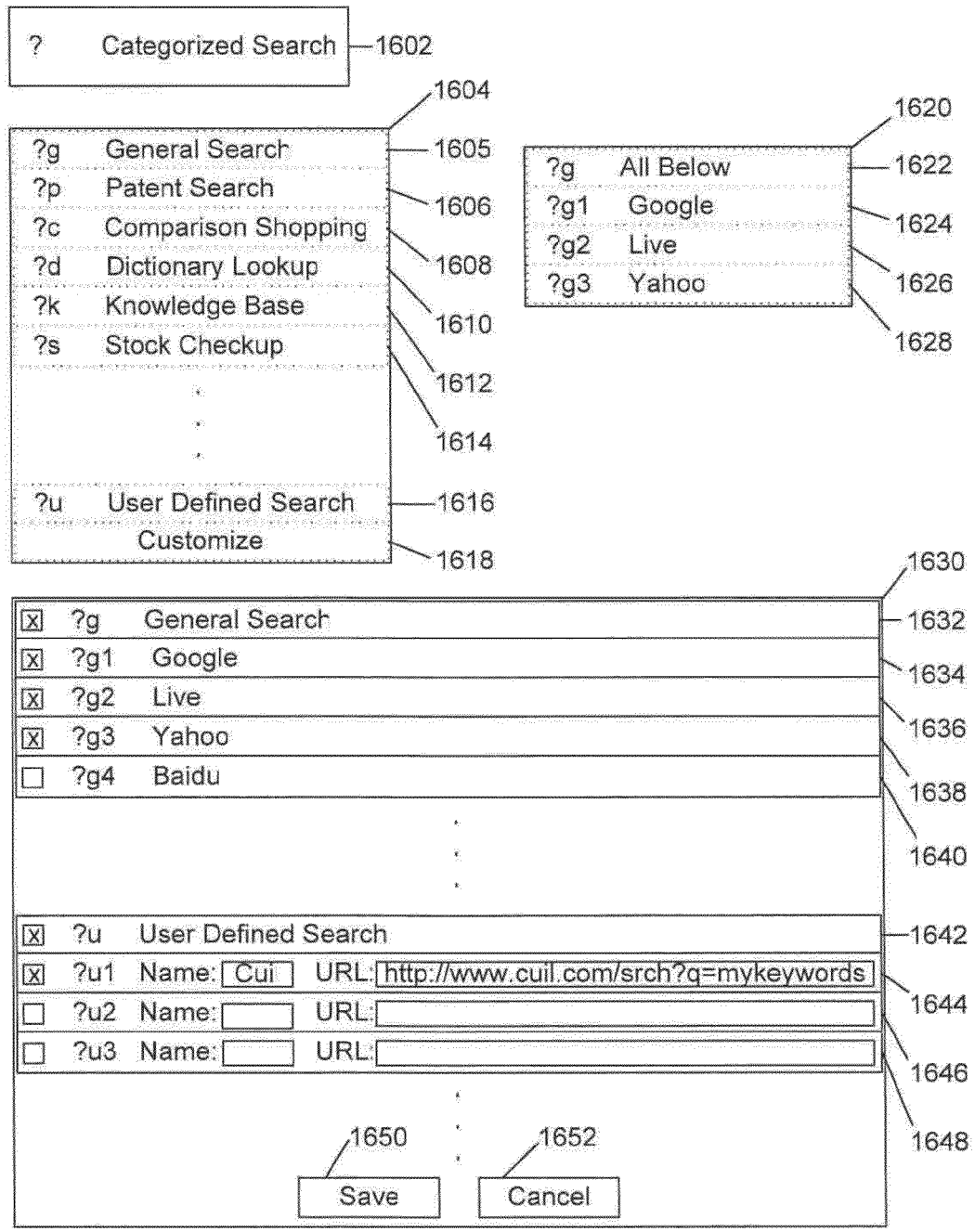
FIG. 16 is a schematic block diagram showing user interface elements of the system according to the present invention.

The helper main menu 44 may contain menu items corresponding to the corresponding activating helper element 24, 26, 28 or 30, or the entries in the user input element 10. When the user clicks the mouse on, or hovers the mouse over a main menu item, the corresponding sub menu 46 may be shown with related sub menu items. FIG. 16, for example, illustrates an embodiment 1604 of helper main menu 44 with the corresponding activating helper 24 being embodied as a categorized search helper 1602. The main menu 1604 may be shown when the user clicks or hovers the mouse on the categorized search helper 1602 or when a categorized search command, such as a "?", for example, is entered into the user input element 10. The corresponding sub menu 1620 for main menu item 1605 may be shown when user hovers the mouse over corresponding main menu item 1605 or when a corresponding general search command, such as "?g", for example, is entered into the user input element 10. Those skilled in the art will appreciate that the "?" and the "?g" commands are meant as examples only, and any other characters may be used for such commands.

Figure 17:
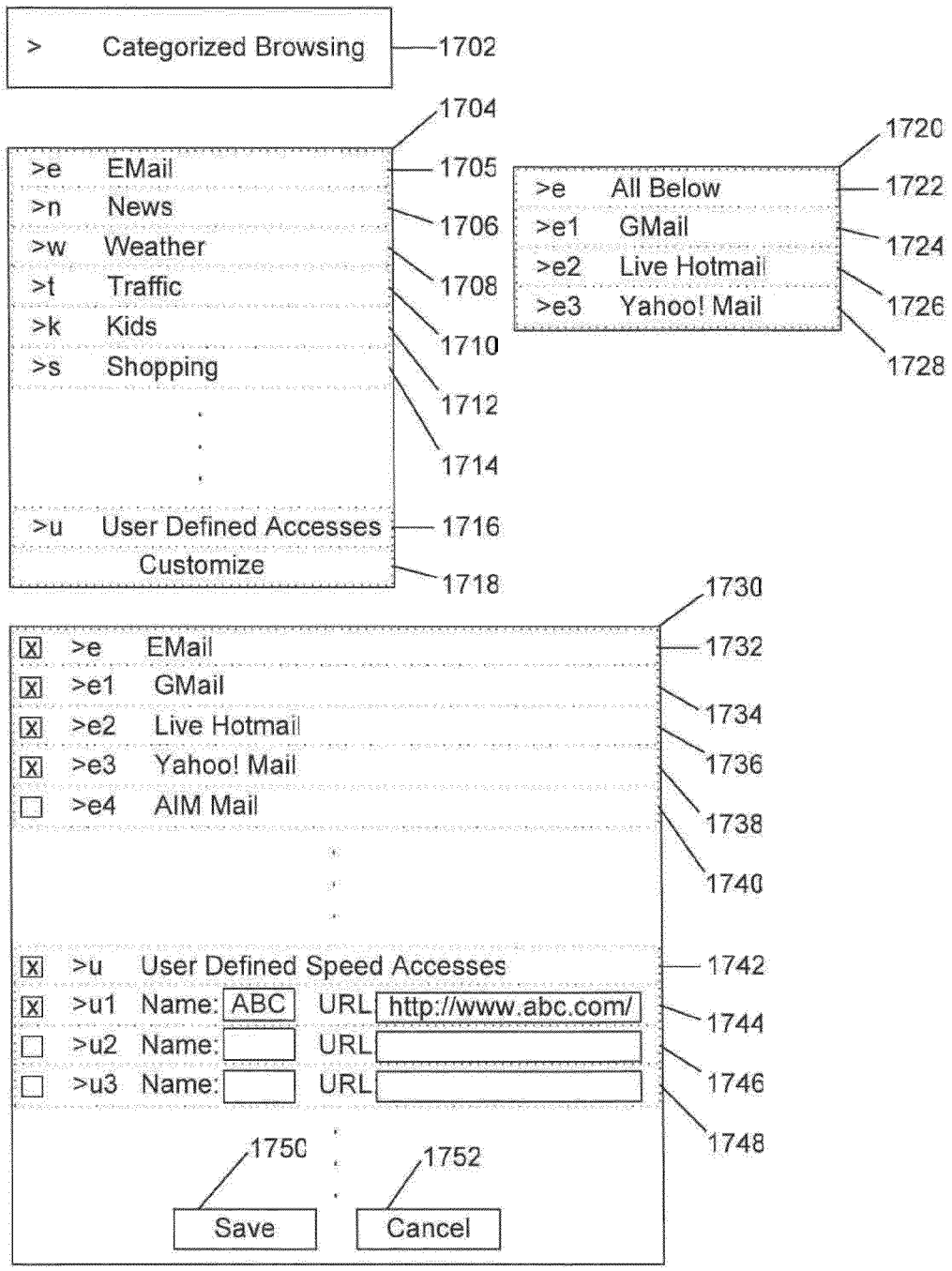
FIG. 17 is a schematic block diagram showing user interface elements for categorized browsing of the system according to the present invention.

FIG. 17, for example, illustrates an embodiment 1704 of the helper main menu 44 with the corresponding activating helper 26 being embodied as a categorized browsing helper 1702. Main menu 1704 may be shown when the user clicks or hovers the mouse on the categorized browsing helper 1702, or when a categorized browsing command, such as ">", for example, is entered into the user input element 10. The corresponding sub menu 1720 for main menu item 1705 may be shown when the user hovers the mouse over the main menu item 1705, or when a corresponding categorized browsing command for email accessing, such as ">e", for example, is entered into the user input element 10. Those skilled in the art will appreciate that the ">" and the ">e" commands are meant as examples only, and any other characters may be used for such commands.

Figure 18:
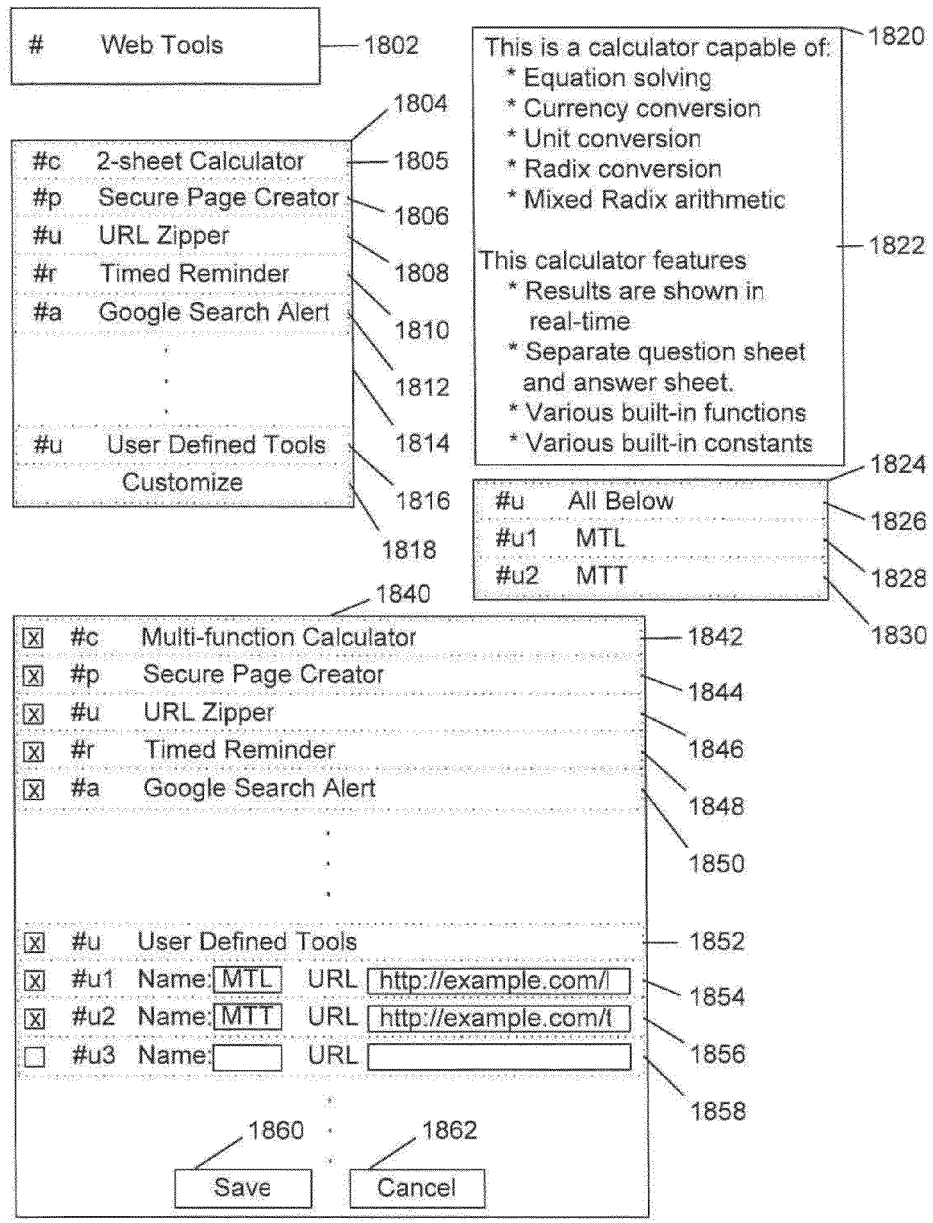
FIG. 18 is a schematic block diagram showing user interface elements for web tool accessing of the system according to the present invention.

FIG. 18, for example, illustrates an embodiment 1804 of helper main menu 44 with the corresponding activating helper 28 being embodied as tool accessing helper 1802. Main menu 1804 may be shown when the user clicks or hovers the mouse over the categorized browsing helper 1802, or when a tool accessing command, such as "#", for example, is entered into the user input element 10. The corresponding sub menu 1820 for main menu item 1805 may be shown when the user hovers the mouse over the main menu item 1805 or when a corresponding tool accessing command for a 2-sheet calculator, such as "#c", for example is entered into the user input element 10. Those skilled in the art will appreciate that the "#" and the "#c" commands are meant as examples only, and any other characters may be used for such commands.

The main user interface 2 may have a horizontal bar 4 which may be shown when the top control panel 6 is collapsed or hidden. Upon the user hovering the mouse over the horizontal bar 4, the top control panel 6 may be shown and may cover or hide the horizontal bar 4. The main user interface 2 in FIG. 1 of information client 204 may have a content area 48 for displaying plural information pages 52 and plural page insertion anchor elements 50, 58 for configuring the position for next new page 52. Information pages presented in this way are preferably referred to as a gallery view. Each gallery view page 52 may have a status and control region 54 which may display page information such as URL, title, and ranking, as well as action elements such as "back", "forward", "reload", "open web comment page", "bookmark this page", and "print this page." Each gallery view page 52 may have an information region 56 for displaying web pages like browsers do.

The main user interface 2 of the information client may have user interface elements 60 for user customization. The main user interface 2 of the information client may also have user interface elements 62 for bookmark addition, as well as user interface elements 64 for displaying instructions. The main user interface 2 may further include user interface elements 66 for displaying helper function menus and for invoking helper functions, as well as user interface elements 68 for user input suggestions. The main user interface 2 may still further include interface elements 70 for displaying bookmarks and invoking bookmark functions, as well as user interface elements 72 for displaying demonstrations, and user interface elements 74 for displaying messages.

Figure 3:
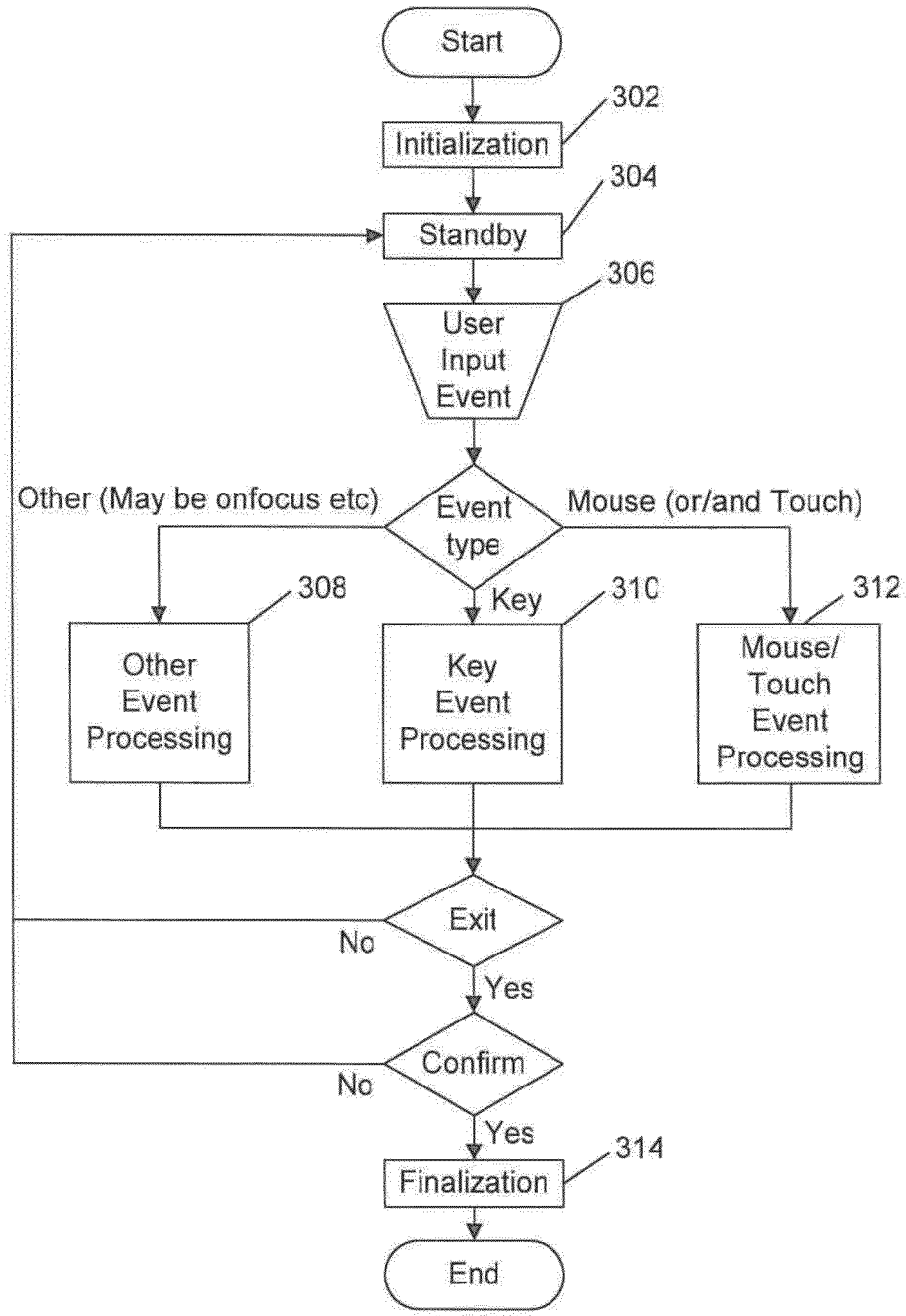
FIG. 3 is a flowchart illustrating a process of user input handling on the system according to the present invention.

A flowchart for the overall process for user input handling is illustrated, for example, in FIG. 3. After starting the information client 204, an initialization process 302 may be invoked to initialize user interfaces into a desired state. Afterwards, the main user interface 2 may go to a standby state 304, while waiting for user inputs 306. Depending on the type of user input, a key processing process 310 may be invoked for inputs by keys, a mouse and touch processing process 312 may be invoked for inputs by mouse or by touch, or process 308 may be invoked for inputs of other input types. If the main user interface does not receive exit instruction, it goes back to the standby state 304 after user input processing is completed. If the main user interface receives exit instructions, confirmation is requested. If confirmation is not provided, the main user interface may go back to the standby state 304 after user input processing is completed. If confirmation for exit is received, a finalization process 314 may be invoked after user input processing is complete.

Figure 4:
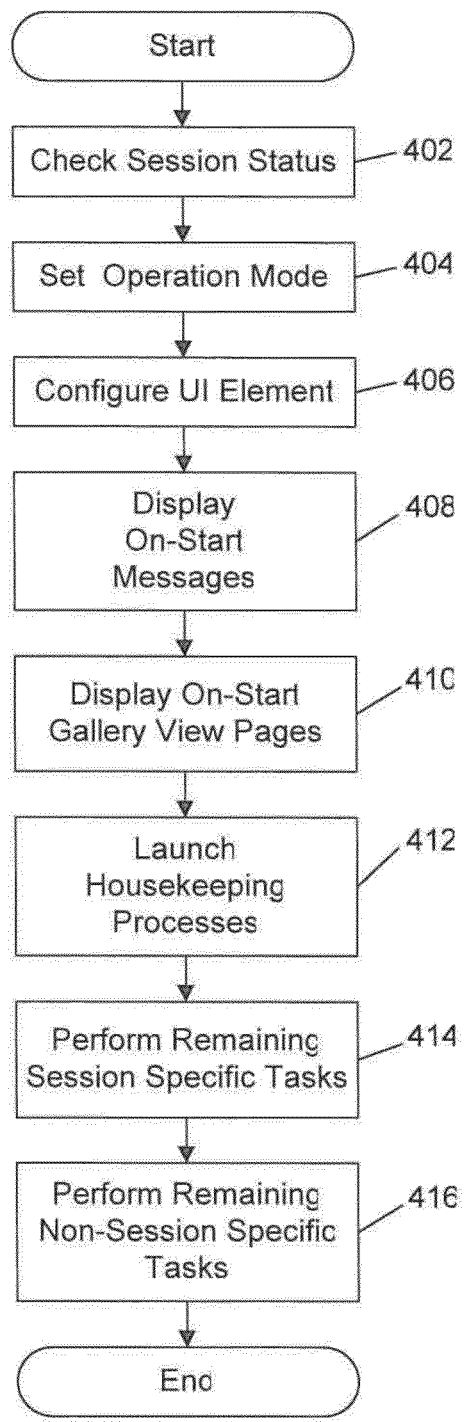
FIG. 4 is a flowchart illustrating an initialization process shown in FIG. 3 on the system according to the present invention.

A flowchart illustrating implementation of the initialization process 302 is illustrated in FIG. 4. The initialization process 302 may have a sub process 402 to check a session status to determine if the user has signed in or not. The initialization process 302 may then carry out a sub process 404 to set an operation mode of the information client 204 according to the corresponding session status. The initialization process 302 may then carry out a sub process 406 to configure user interfaces accordingly. The initialization process 302 may then carry out a sub process 408 to display on-start messages. The initialization 302 may then carry out sub process 410 to open gallery view pages 52 for on-start information presentation. The initialization process 302 may then carry out a sub process 412 for housekeeping tasks. The initialization 302 may then carry out another sub process 414 for remaining session specific tasks. The initialization 302 may then carry out still another sub process 416 for remaining non-session specific tasks.

Figure 5:
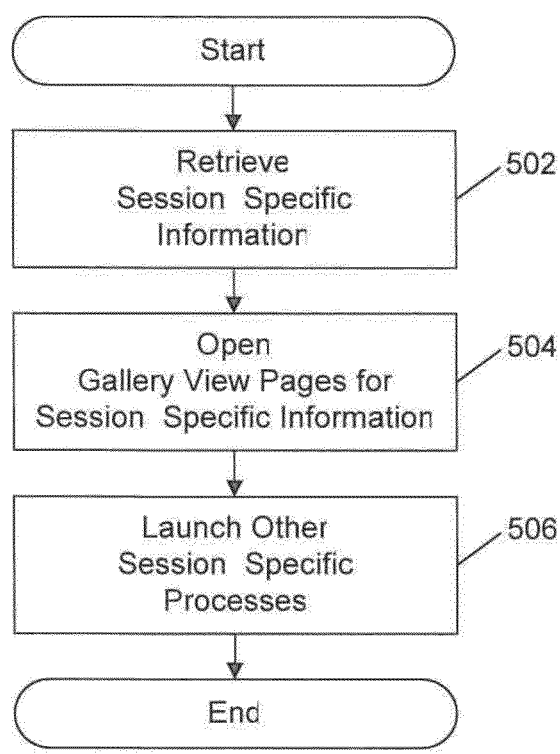
FIG. 5 is a flowchart illustrating a sub initialization process shown in FIG. 4 according to the present invention.

A flowchart for implementation of the housekeeping process 412 is illustrated in FIG. 5. The housekeeping process 412 may include a sub process 502 to retrieve session specific information such as user bookmarks, customized option settings, and other session specific information. The housekeeping process 412 may then carry out a sub process 504 to open gallery view pages 52 for corresponding session specific information. The housekeeping process 412 may then carry out another sub process 506 for other session specific tasks.

Figure 6:
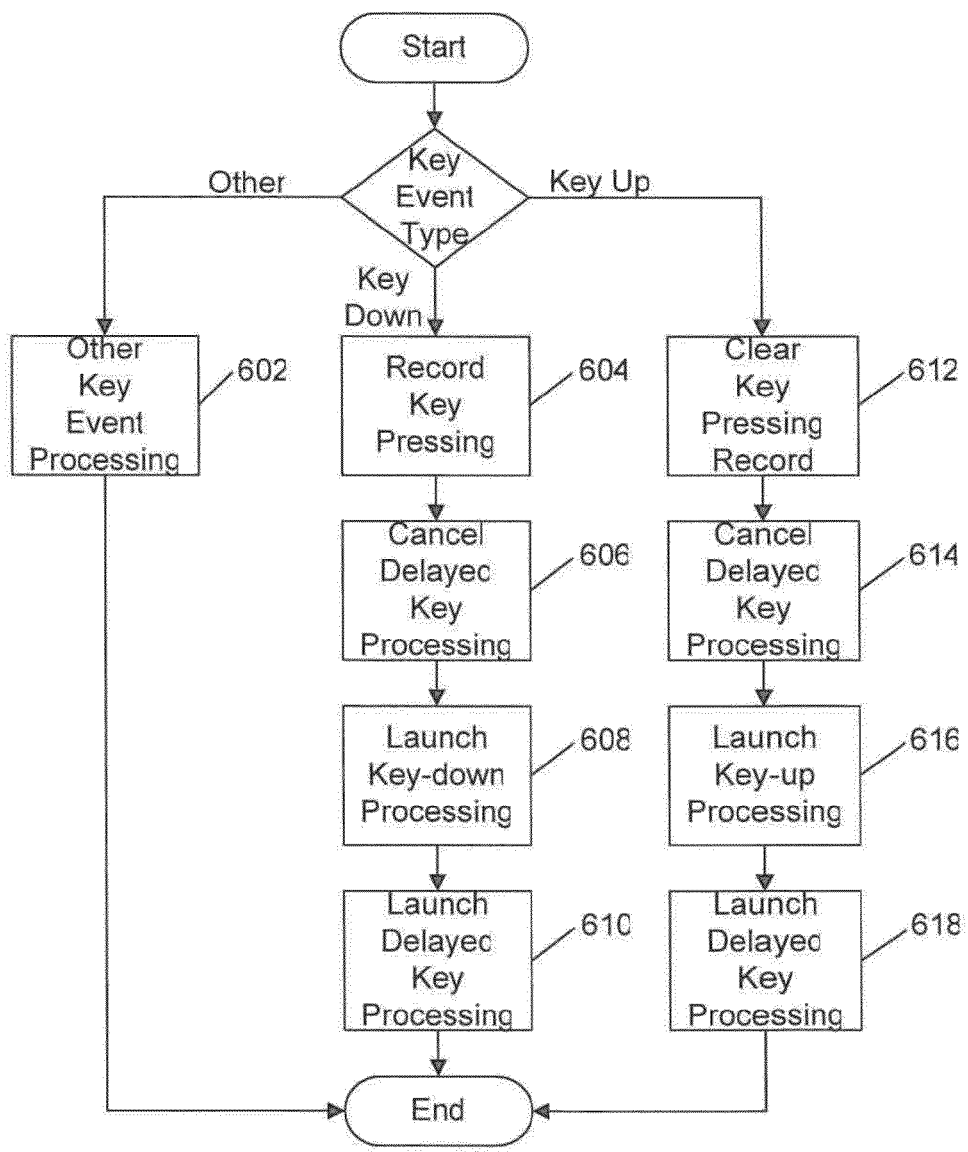
FIG. 6 is a flowchart illustrating a process of handling key events on the system according to the present invention.

A flowchart illustrating key event processing process is shown in FIG. 6. If the key event is "key down", a process 604 may be invoked to record which key is being depressed. Another process 606 may then be invoked to cancel the corresponding postponed or scheduled key processing processes, and yet process 608 may then be launched to process the key-down event. Still another process 610 may then be launched as a postponed or scheduled key processing process. If the key event is "key up", a process 612 may be invoked to clear the corresponding key-pressing record, and another process 614 may then be invoked to cancel the corresponding postponed or scheduled key processing processes. Another process 616 may then be launched to process the key-up event, and a process 618 may be launched as a postponed, or scheduled, key processing process. If the key event is neither "key down" nor "key up", a process 602 may be launched to process the key event.

Figure 7:
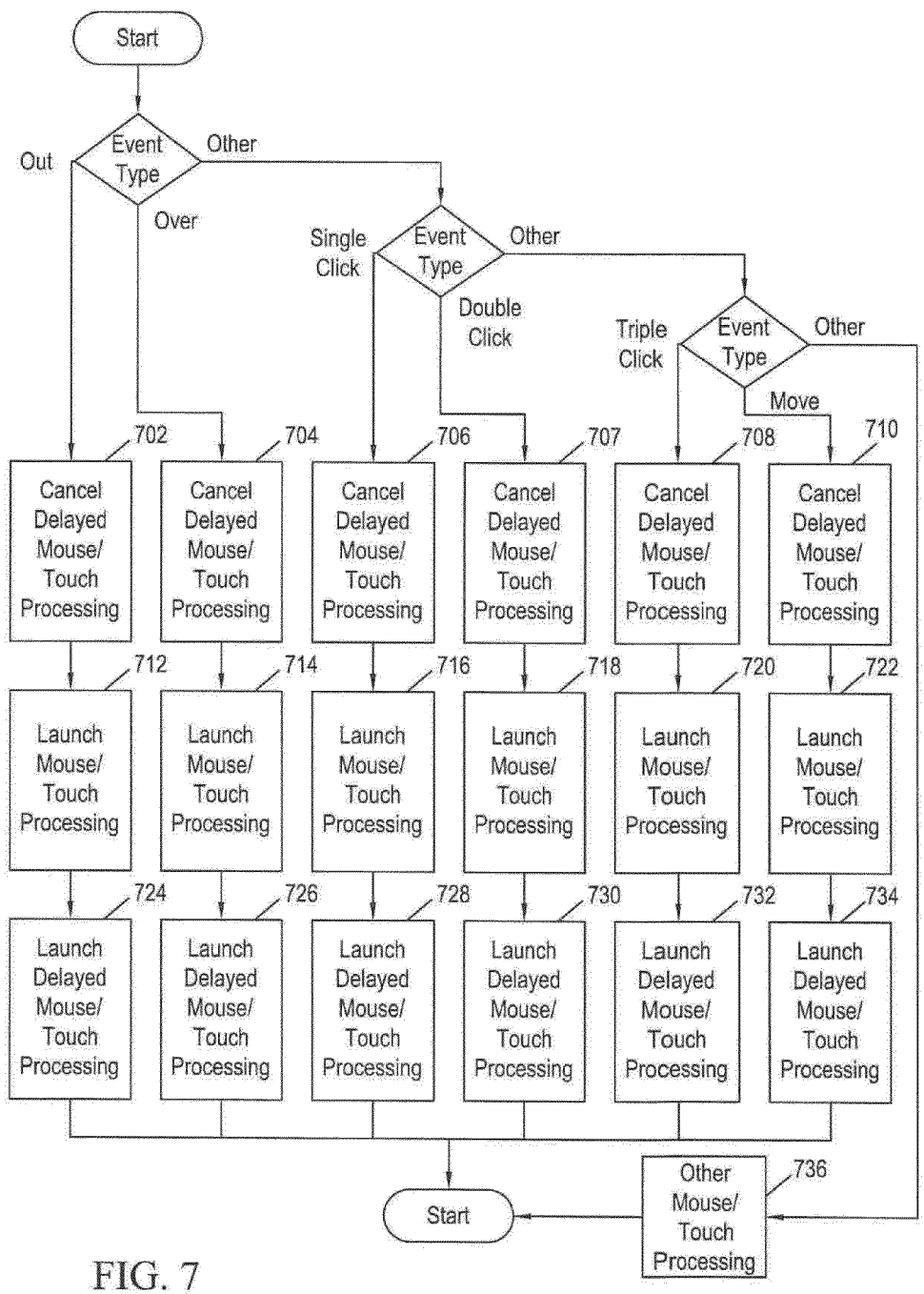
FIG. 7 is a flowchart illustrating a process of handling mouse or touch events on the system according to the present invention.

A flowchart illustrating the mouse or touch event processing process 312 is shown in FIG. 7. If the mouse or touch event is of a "mouse out" or "touch out" type, a process 702 may be invoked to cancel corresponding postponed or scheduled mouse or touch event processing. A process 712 may then be launched for processing the corresponding mouse or touch event, and a process 724 may then be launched as a postponed or scheduled process for mouse or touch event processing.

If the mouse or touch event is of the "mouse over" or "touch over" type, a process 704 may be invoked to cancel corresponding postponed or scheduled mouse or touch event processing, and a process 714 may then be launched for processing the corresponding mouse or touch event. A process 726 may then be launched as a postponed or scheduled process for mouse or touch event processing. If the mouse or touch event is of "single cock" type, a process 706 may be invoked to cancel corresponding postponed or scheduled mouse or touch event processing, and a process 716 may then be launched for processing the corresponding mouse or touch event. A process 728 may then be launched as a postponed or scheduled process for mouse or touch event processing.

If the mouse or touch event is of the "double click" type, a process 707 may be invoked to cancel corresponding postponed or scheduled mouse or touch event processing, and a process 718 may then be launched for processing the corresponding mouse or touch event. A process 730 may then be launched as a postponed or scheduled process for mouse or touch event processing. If the mouse or touch event is of a "triple click" type, a process 708 may be invoked to cancel corresponding postponed or scheduled mouse or touch event processing, and a process 720 may then be launched for processing the corresponding mouse or touch event. A process 732 may then be launched as a postponed or scheduled process for mouse or touch event processing.

If the mouse or touch event is of the "move" type, a process 710 may then be invoked to cancel corresponding postponed or scheduled mouse or touch event processing, and a process 722 may then be launched for processing the corresponding mouse or touch event. A process 734 may then be launched as a postponed or scheduled process for mouse or touch event processing. If the mouse or touch event is none of above stated, a process 736 may be invoked for processing the corresponding mouse or touch event.

Figure 8:
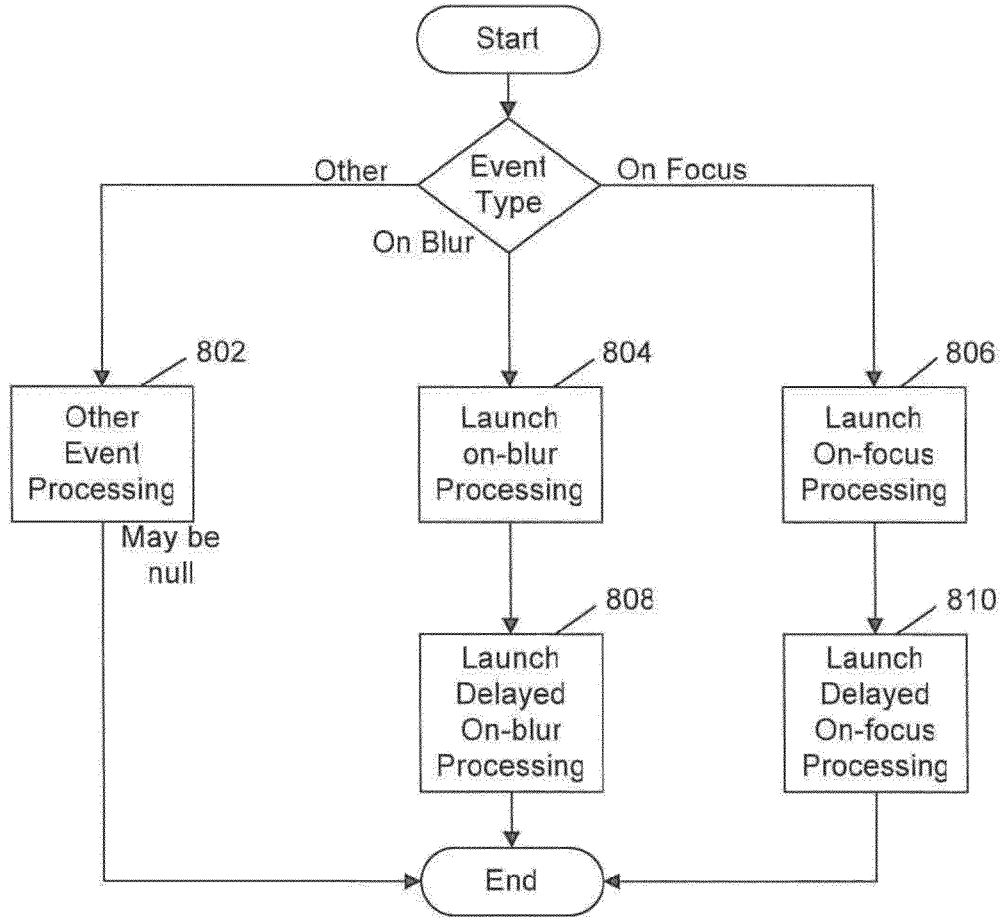
FIG. 8 is a flowchart illustrating a process of handling non-key, non-mouse and non-touch events on the system according to the present invention.

A flowchart of one implementation of the non-key, non-mouse and non-touch event processing process 308 is illustrated in FIG. 8. If the user event is "on blur", a process 804 may be invoked for "on-blur" event processing, and a process 808 may then be launched as a postponed or scheduled "on-blur" event processing process. If the user event, however, is "on focus", a process 806 may be invoked for "on-focus" event processing, and a process 810 may then be launched as a postponed or scheduled "on-focus" event processing process. If the non-key, non-mouse and non-touch event is none of above stated, then a process 802 may be launched for processing a corresponding user input event.

Figure 9:
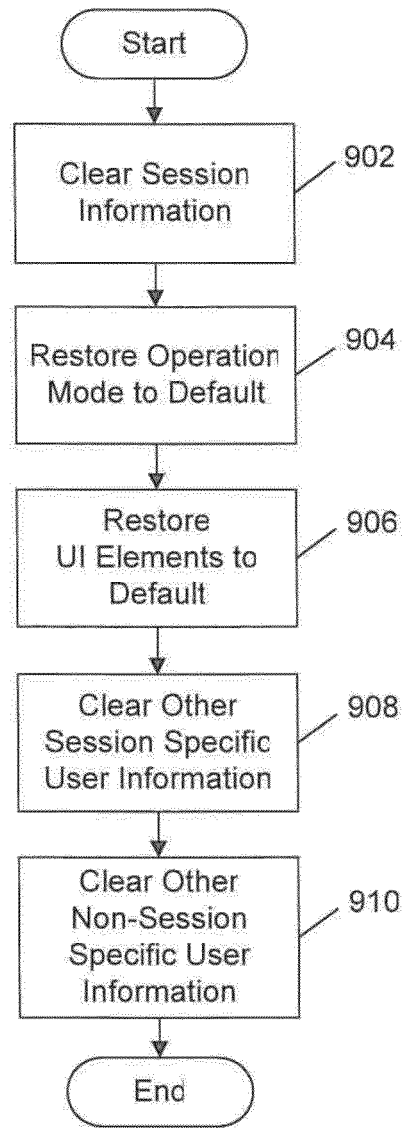
FIG. 9 is a flowchart illustrating a process of handling finalization tasks on the system according to the present invention.

A flowchart illustrating the finalization process 314 is shown in FIG. 9. To protect a user's privacy, the finalization process 314 may include process 902 to clear session specific information, and may include process 904 to restore operation to default. Further, the finalization process 314 may include a process 906 to restore user interface elements to default, and process 908 to clear other session specific user information on the information client 204, as well as a process 910 to clear non-session specific user information.

Figure 10:
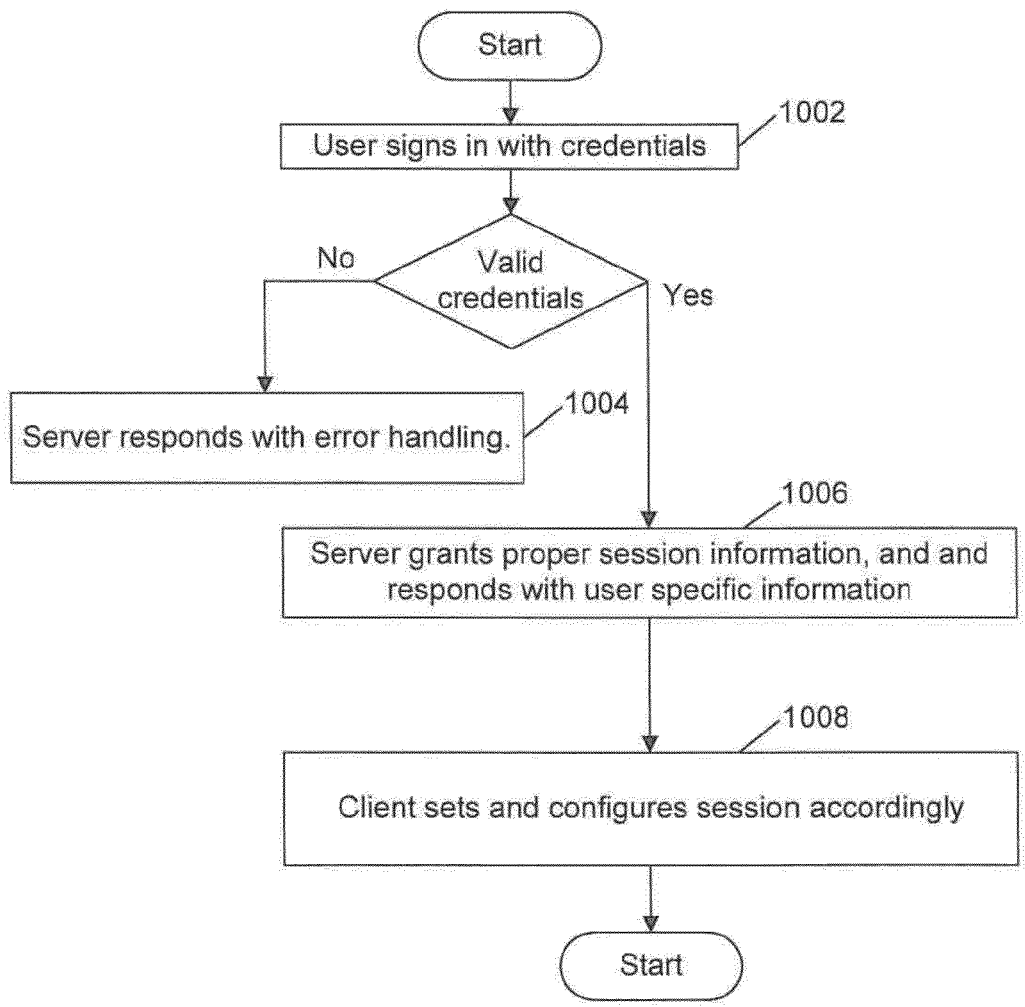
FIG. 10 is a flowchart illustrating a sign-in process on the system according to the present invention.

A flowchart illustrating a sign-in process for enabling user specific services is shown in FIG. 10. The user may initiate a sign-in process 1002 by providing credentials in a proper format to the information server 206. The information server may validate credentials. If the credentials are not valid, the information server 206 may respond with an error messages in process 1004. If, however, the credentials are valid, the information server 206 may grant the information client 204 corresponding session specific information, and corresponding user specific information in process 1006. The information client 204 may then configure user sessions accordingly in process 1008.

Figure 11:
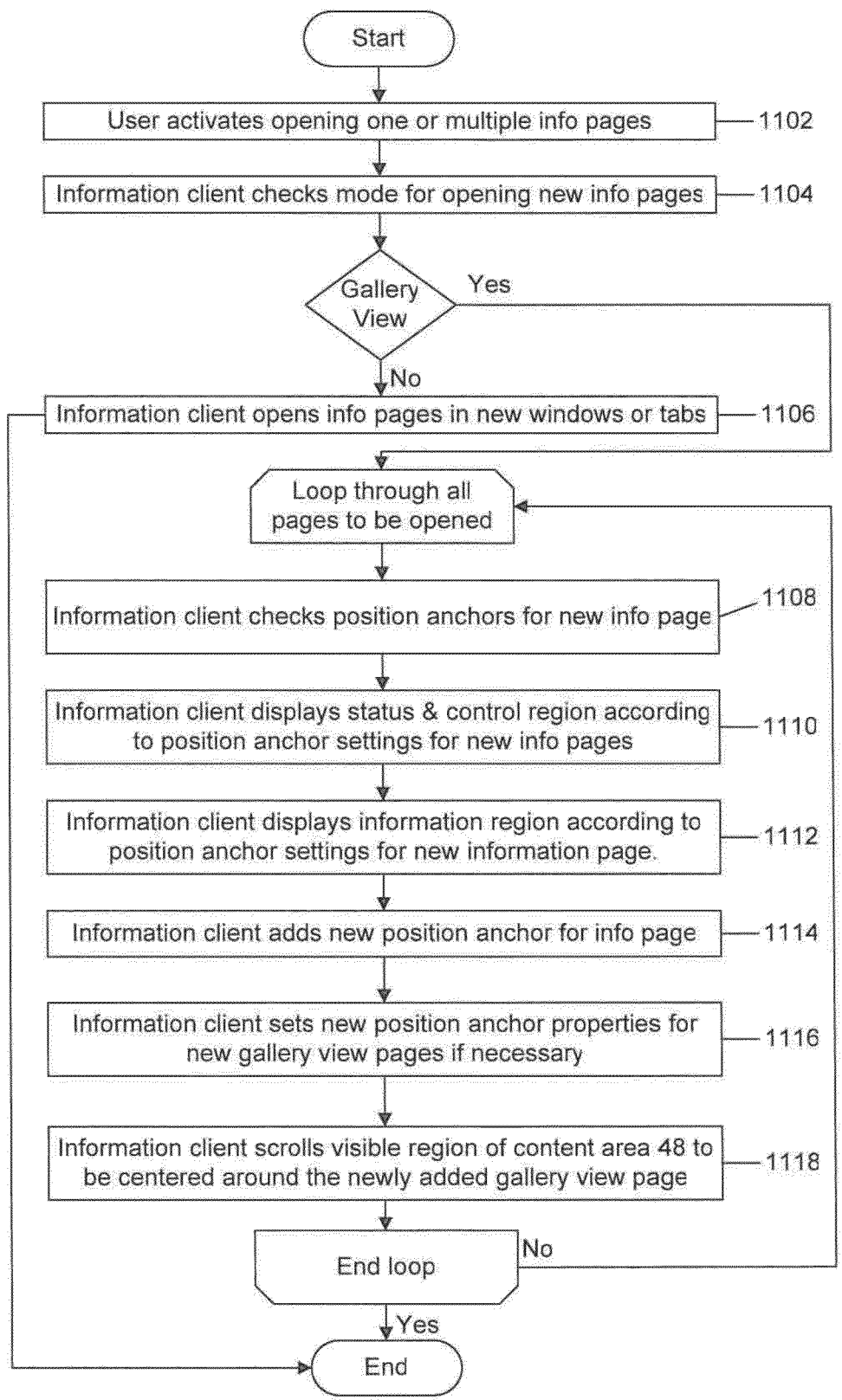
FIG. 11 is a flowchart illustrating a process of opening new pages for information to be presented on the system according to the present invention.

FIG. 11 illustrates a flowchart showing a page opening process for information presentation. When a request is received to open one or more pages in process 1102, the information client 204 checks the configured mode for opening pages in process 1104. If the page opening mode is not configured to open pages in gallery view, then the pages may be opened in a new browser window or a new browser tab in process 1106. If, however, the page opening mode is configured to open pages in the gallery view, then the information client 204 may loop through all the pages to be opened. For each page to be opened, the information client 204 may check position anchors to determine the insertion position for new pages in process 1108. The information client 204 may then display the status and control region 54 of the corresponding gallery page in the corresponding insertion position in the content area 48 in process 1110.

The information client 204 may then display the information region 56 with corresponding content for the corresponding gallery view page in the corresponding insertion position in the content area 48 in process 1112. The information client 204 may thereafter proceed to configure position anchors for new gallery view pages in process 1116. The information client 204 may then scroll the visible region of the content area 48 to be centered on the newly added gallery view page in process 1118. The scrolling may be staged or in slow motion so a user may be enabled to slide to the newly added page into the gallery view. The scrolling may be achieved by one step or may be instant scrolling so that the user may readily access the newly added page in the gallery view.

Figure 12:
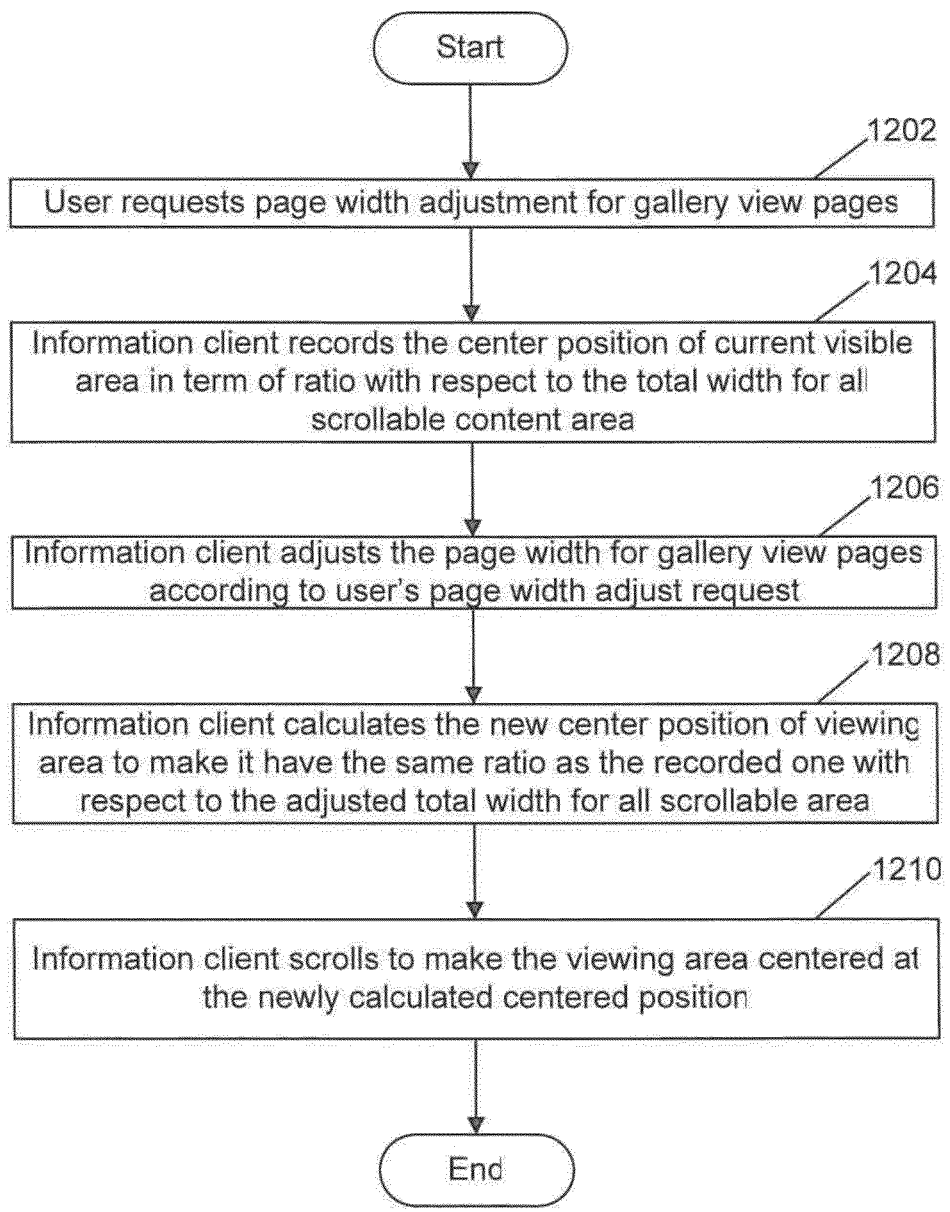
FIG. 12 is a flowchart illustrating a process of adjusting a width of content pages shown as 52 in FIG. 1 according to the present invention.

FIG. 12 illustrates a flowchart for one implementation of the process for adjusting the page width for gallery view pages displayed in the content area 48. The page width adjust process may have a sub process 1202 for the user to request width adjustment for pages displayed in gallery view in the content area 48. The page width adjust process may then carry out a sub process 1204 for the information client 204 to record the position of current visible area relative to the overall scrollable content area 48. The page width adjust process may then carry out a sub process 1206 for adjusting the page width for the pages displayed in gallery view in the content area 48 according to a request received from the user. The page width adjust process may then carry out a sub process 1208 for calculating a desired position of the visible area of the content area 48. This advantageously allows the visible area to have the same position relative to the adjusted overall scrollable content area 48 as before the page width adjustment took place. The page width adjust process may then carry out a sub process 1210 for scrolling the content area 48 to allow the visible area to have the same position relative to the width adjusted content area 48 as before the page width adjustment took place. The scrolling may be staged or in slow motion to allow the user to horizontally slide the newly added pages in the gallery view. Further, the scrolling may be one step or instant so to allow the user to jump to the newly added page in gallery view.

Figure 13:
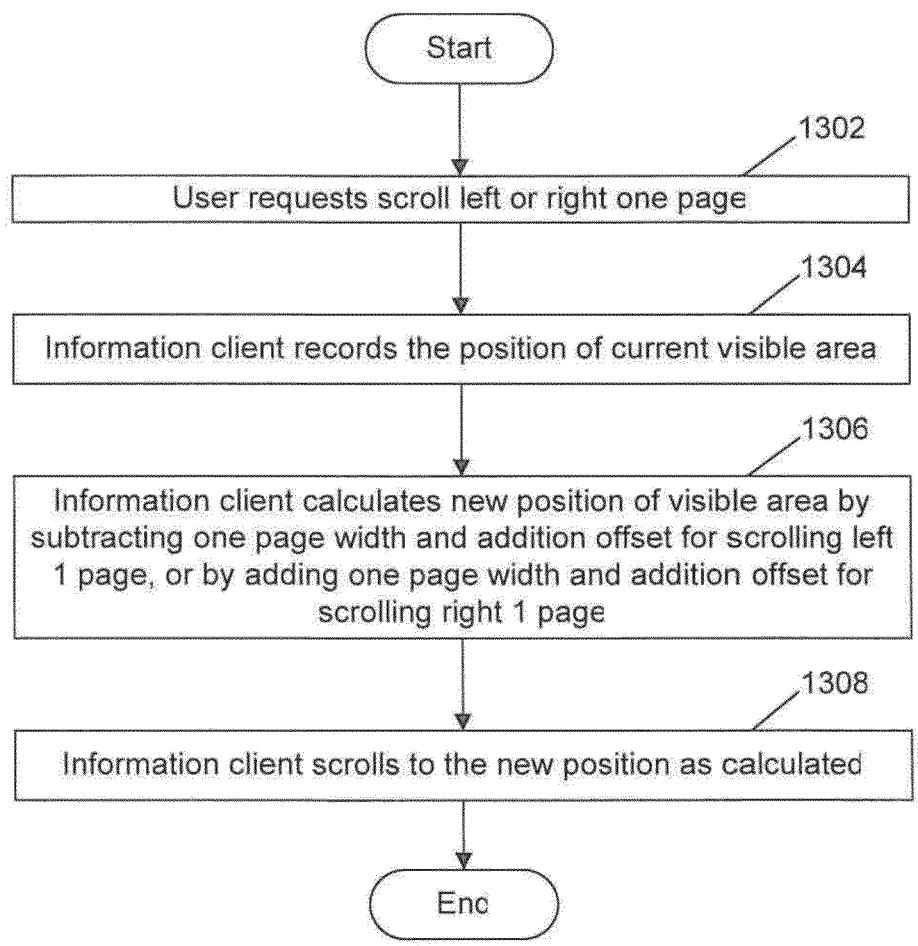
FIG. 13 is a flowchart illustrating a process of horizontally scrolling to show different content pages shown as 52 in FIG. 1 according to the present invention.

FIG. 13 illustrates a flowchart for one implementation of the process for scrolling the content area 48 left or right by 1 page width. The content area 1-page scrolling process may have sub process 1302 for the user to request 1-page scrolling left or right. The content area 1-page scrolling process may then carry out sub process 1304 for the information client 204 to record the position of current visible area relative to the overall scrollable content area 48. The content area 1-page scrolling process may then carry out sub process 1306 for the information client 204 to calculate the position of the new visible area by respective addition or subtraction of 1 page width and related padding width. The content area 1-page scrolling process may then carry out sub process 1308 to scroll the content area 48 to make the newly calculated visible area visible. The scrolling may be staged or in slow motion to allow the user to horizontally slide to the newly added pages in the gallery view. Further, the scrolling may be one step or instant to allow the user to jump to the newly added pages in gallery view.

Figure 14:
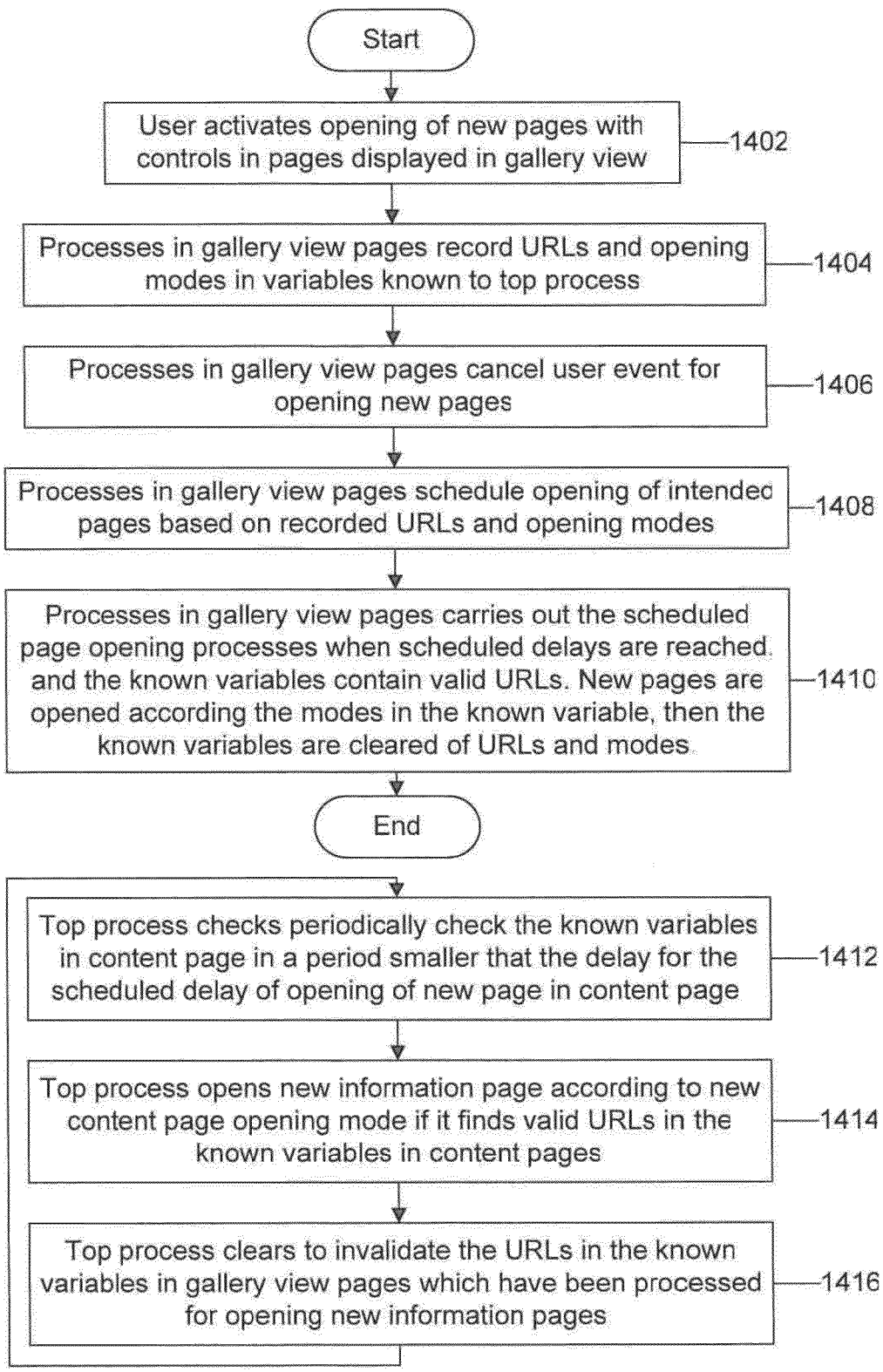
FIG. 14 is a flowchart illustrating a process of opening new content pages initiated from controls in the content pages as displayed in gallery view according to the present invention.

FIG. 14 illustrates a flowchart for one implementation of the processes for opening new pages by activation of controls such as, for example, hyperlinks in pages displayed in gallery view in the content area 48. Shown as 1402, user activates the opening of new pages with controls in pages displayed in gallery view in the content area 48. Shown as 1404, control processes in gallery view pages then record access addresses such as URLs for new pages and page opening modes in variables known to top control process. Shown as 1406, the control processes in gallery view pages then cancel the user request for opening new pages. Shown as 1408, the control processes in gallery view pages may then launch postponed or scheduled opening of the intended pages based on the recorded access addresses and opening modes. Shown as 1410, the control processes in gallery view pages then carries out the postponed or scheduled opening of the intended pages when the scheduled delay has been reached. If the access URLs are cleared by the top control process, then the process is ended.

The top control process checks periodically the known access address variables in gallery view pages with a period which may be smaller than the scheduled delay for the postponed or scheduled page opening processes at 1412. Shown as 1414, if the top control process then sees valid access addresses and opening modes in the known variables in gallery view pages, the top control process opens new pages according to the corresponding URLs and opening modes. Shown as 1416, the top control process then dears the corresponding known variables for access addresses or URLs and opening modes in gallery view pages after it opens corresponding new pages, the top control process then goes back to process 1412.

Figure 15:
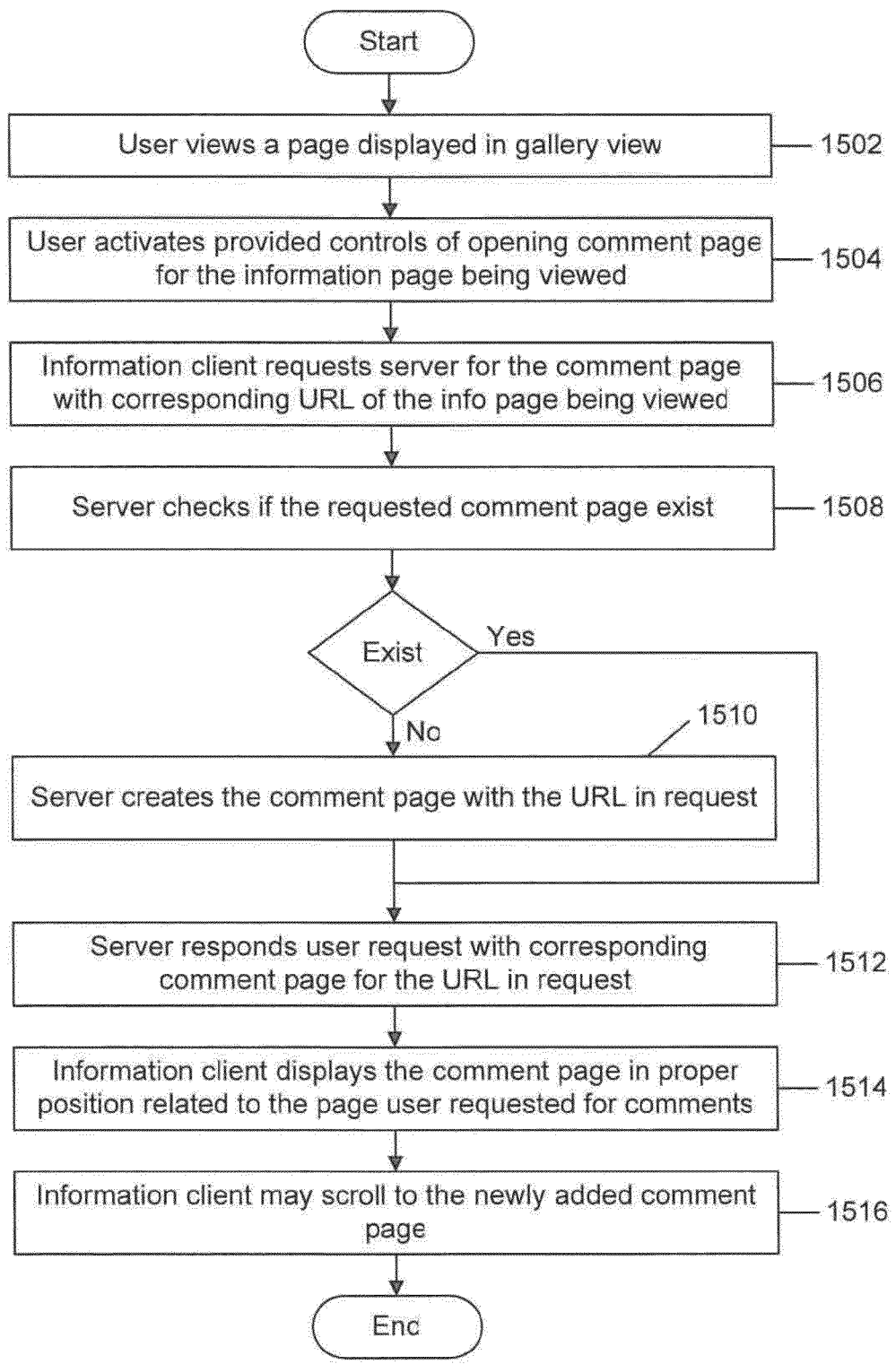
FIG. 15 is a flowchart illustrating a process of creating and presenting a third party comment pages for a page in a gallery view according to the present invention.

A flowchart for a process of opening comment pages in a gallery view within the content area is illustrated in FIG. 15. Shown as 1502, the user views a page displayed in gallery view in the content area 48. The controls for the gallery view page are shown in the corresponding status and control region 54, which includes a control for opening of the corresponding comment page. Shown as 1504, the user may then activate the control for opening the corresponding comment page for the gallery view page being viewed. Shown as 1506, the information client 204 may then request the information server 206 for the corresponding comment page with the access address or URL of the page the comment page control is activated for.

Shown as 1508, the information server may then check to see if the requested comment page exists. If the requested comment page does not exist, the information server 206 then creates the corresponding comment pages with the access address or URL in request at 1510. Shown as 1512, the information server 206 then responds to the information client 204 with the corresponding comment page for the access address or URL in request. Shown as 1514, the information client 204 then displays the comment page in gallery view in the content area 48 in a position related to the page the comment page is requested for. Shown as 1516, the information client 204 may scroll the content area 48 to make the newly added comment page visible. The scrolling may be staged or in slow motion so that user may slide to the newly added page in gallery view. The scrolling may be one step or may be instant so that the user may jump to the newly added page in gallery view.

FIG. 16 depicts the major user interface elements of the categorized search with menus and commands of present invention. Shown as 1602 is a user interface element for display activation of categorized search menus, it can be displayed as the helper element 24 in FIG. 1. This element may be updated for the selected categorized search. For example, if a search is performed for the terms "patent search" either by key entry or the categorized search command, which may, for example, be "?p" for "patent search" selection, or by the user cocking the mouse on a corresponding "patent search" menu item, the display activation user interface element 1602 for the categorized search menu may be updated to display "?p Patent Search". Those skilled in the art will appreciate that the "?p" categorized search command is merely meant for purposes of an example and, as such, the categorized search command may be any command desired.

Upon the user clicking the mouse on, or hovering the mouse over, the categorized search menu display activation user interface element 1602, the process, if any, for hiding the corresponding main menu 1604 for categorized search may be cancelled. The corresponding main menu 1604 for categorized search may then be shown. Upon the user moving the mouse away from the categorized search menu display activation user interface element 1602, the corresponding main menu 1604 for categorized search may be scheduled to be hidden after some delay, if the hiding process is not cancelled by then. When the user hovers the mouse over the main menu 1604 for categorized search, the process, if any, for hiding the corresponding main menu 1604 for categorized search may be cancelled. The corresponding sub menu 1620 may be shown for the corresponding main menu item 1605 where the hovering mouse is positioned. Upon the user moving the mouse away from the main menu 1604, the main menu 1604 for categorized search may be scheduled to be hidden after some delay if the hiding process is not cancelled by then. Further, the sub menu 1620 may be scheduled to be hidden after some delay if the hiding process is not cancelled by then.

When the user hovers the mouse over the sub menu 1620, the processes, if any, for hiding the corresponding main menu 1604 for categorized search, and for hiding the shown sub menu 1620 may be cancelled. When a menu item for the categorized search in either the main menu 1604 or the sub menu 1620 is activated, the existing command entries in the user input element 10 may be removed. The corresponding categorized search command may be prefixed to the non-command entry in the user input element.

The URLs for invoking corresponding categorized searches may be generated with the search URL templates for the selected categories or selected search services and with the search keywords entered by the user in the user input element. New pages may be then opened for the generated search URLs to carry out the selected categorized searches. If the categorized search is activated in a way other then from a menu item click, such as, for example, by the user depressing the "Enter" key or clicking the "Search" button after entering a categorized search command and search keywords, then URLs invoking corresponding categorized searches may be generated with the search URL templates for the corresponding search categories and services selected by categorized search commands and with the user entered search keywords entered into the user input element 10. New pages may be then opened for the generated search URLs to carry out the selected categorized searches.

When the "customize" menu item 1618 is activated, such as, for example, by the user clicking the mouse, the user interface element 1630 for categorized search customization may be shown. The user may pick search services to be used for categorized searches. More specifically, the user may set commands for categorized searches, and may add search categories and services with a corresponding access address or URL templates. The user may name or rename search categories and services. The customization information may be stored on a server if the user is signed in for use across sessions and machines. Alternately, the customization information may be stored only on the information client.

When categorized search commands are entered into the user input element 10, the display activation element 1602 for categorized search menus may be updated to show the corresponding categorized search command and description. The main menu 1604 for categorized search and corresponding sub menu 1620 may be shown, and corresponding menu items may be highlighted. As illustrated in FIG. 16, the categorized search command set may, for example, be "?" for a default search with system default search services. Also for example, the categorized search command may be "?g" for general search selecting all search services for general search, and "?g1" for general search with search service, such as Google, for example. Again, those skilled in the art will appreciate that the above referenced categorized search commands are merely meant for purposes of an example and, as such, the categorized search command may be any command desired.

The major user interface elements of categorized browsing with menus and commands of present invention are illustrated in FIG. 17. Shown as 1702 is a user interface element for display activation of categorized browsing menus. This may be displayed as the helper element 26 in FIG. 1. This element may be updated for categorized browsing. For example, if the term "News" is selected, either by key entry of a categorized browsing command such as, for example, ">n" for "News" selection, or by mouse clicking on the corresponding "News" menu item, the display activation user interface element 1702 for categorized browsing menu will be updated to display ">n News". Upon the user clicking the mouse on, or hovering the mouse over, the categorized browsing menu display activation user interface element 1702, the process, if any, for hiding the corresponding main menu 1704 for categorized browsing may be cancelled. The corresponding main menu 1704 for categorized browsing may then be shown. Those skilled in the art will appreciate that the above referenced categorized browsing command is merely meant for purposes of an example and, as such, the categorized browsing command may be any command desired.

Upon the user moving the mouse away from the categorized browsing menu display activation user interface element 1702, the corresponding main menu 1704 for categorized browsing may be scheduled to be hidden after some delay if the hiding process is not cancelled by then. When the user hovers the mouse over the main menu 1704 for categorized browsing, the process, if any, for hiding the corresponding main menu 1704 for categorized browsing may be cancelled. The corresponding sub menu 1720 may be shown for the corresponding main menu item 1705 where the user hovers the mouse. Upon the user moving the mouse away from the main menu 1704, the main menu 1704 for categorized browsing may be scheduled to be hidden after some delay if the hiding process is not cancelled by then. Further, the sub menu 1720 may be scheduled to be hidden after some delay if the hiding process is not cancelled by then.

When the user hovers the mouse over the sub menu 1720, the processes, if any, for hiding the corresponding main menu 1704 for categorized browsing and for hiding the displayed sub menu 1720 may be cancelled. When a menu item for categorized browsing in either the main menu 1704 or the sub menu 1720 is activated, the entries, if any, in the user input element 10 may be replaced with the corresponding categorized browsing command. Further, access addresses or URLs for invoking corresponding categorized browsing accesses may be generated from the configured URLs corresponding to the selected categorized browsing accesses. New pages may then be opened for the generated URLs. If accessing with categorized browsing is activated by a way other than by clicking on a menu item, such as, for example, by the user depressing the "Enter" key, or by the user clicking on the "Browse" button 14 after entering categorized browsing commands, access addresses or URLs for invoking corresponding browsing accesses may be generated from the configured access addresses or URLs corresponding to the categorized browsing accesses selected by the corresponding categorized browsing commands. New pages may be then opened for the generated access addresses or URLs.

When the "customize" menu item 1718 is activated by the user clicking thereon, the categorized browsing customization user interface element 1730 may be shown. The user may pick categorized browsing accesses to be used with categorized browsing. The user may also set commands for categorized browsing accesses, and can add access addresses or URLs for categorized browsing accesses, as well as have the ability to name or rename categorized browsing accesses. The customization information may be stored on a server if the user is signed in for use across sessions and machines, or may be stored only on the information client.

When categorized browsing commands are entered into the user input element 10, the display activation element 1702 for categorized browsing menus may be updated to show the corresponding categorized browsing command and description. The main menu 1704 for categorized browsing and corresponding sub menu 1720 may be shown. The corresponding menu items may be highlighted. As illustrated in FIG. 17, the categorized browsing command set may, for example, be ">" for default browsing with system default browsing access addresses or URLs, which can be the same as Email accesses. The categorized browsing command may also be ">e" for Email access with all the configured access addresses or URLs for Email services, and ">e1" for Email access with Email service, such as, for example, from Google. Those skilled in the art will appreciate that the above referenced command is merely meant for purposes of an example and, as such, the command may be any command desired.

FIG. 18 depicts major user interface elements of web tool accessing with menus and commands of according to the present invention. Shown as 1802 is a user interface element for display activation of web tool access menus. This can be displayed as the helper element 28. This element may be updated for the selected web tools. For example, if the "2-sheet Calculator" web tool is selected either by key entry of a tool accessing command, such as, for example, "#c" for "2-sheet Calculator" selection, or by the user clicking the mouse on the corresponding "2-sheet Calculator" menu item, the display activation user interface element 1802 for web tool accessing will be updated to display "#c 2-sheet Calculator". Upon the user clicking the mouse on, or hovering the mouse over, the web tool accessing menu display activation user interface element 1802, the process, if any, for hiding the corresponding main menu 1804 for web tool accessing may be cancelled. The corresponding main menu 1804 for web tools accessing may be shown. Those skilled in the art will appreciate that the above referenced command is merely meant for purposes of an example and, as such, the command may be any command desired.

Upon the user moving the mouse away from the web tool accessing menu display activation user interface element 1802, the corresponding main menu 1804 for web tool accessing may be scheduled to be hidden after some delay if the hiding process is not cancelled by then. When the user hovers the mouse over the main menu 1804 for web tool accessing, the process, if any, for hiding the corresponding main menu 1804 for web tool accessing may be cancelled. The corresponding sub menu 1820 may be shown for the corresponding main menu item 1805 where the user is hovering the mouse. Upon the user moving the mouse away from the main menu 1804, the main menu 1804 for web tool accessing may be scheduled to be hidden after some delay if the hiding process is not cancelled by then, also the sub menu 1820 may be scheduled to be hidden after some delay if the hiding process is not cancelled by then.

When the user hovers the mouse over the sub menu 1820, the processes, if any, for hiding the corresponding main menu 1804 for web tool accessing and for hiding the shown sub menu 1820 may be cancelled. When a menu item for web tool accessing in either the main menu 1804 or the sub menu 1820 is activated, the entries, if any, in the user input element 10 may be replaced with the corresponding web tool accessing command, access addresses. Similarly, URLs for invoking corresponding web tool accesses may be generated from the configured access addresses or URLs corresponding to the selected web tools, new pages may be then opened for the generated access addresses or URLs. If accessing with web tool accesses is activated by any other way then clicking the menu item, and is activated, for example, by the user depressing the "Enter" or by the user clicking the "Browse" button 14 after entering the web tool accessing command, access addresses or URLs for invoking corresponding web tools may be generated with the configured access addresses or URLs corresponding to the selected web tools. New pages may then be opened for the generated access addresses or URLs.

When the "customize" menu item 1818 is activated by the user clicking the mouse, the web tool accessing customization user interface element 1840 may be shown. This may allow the user to pick web tools to be used for accesses with web tool accessing, set commands for web tool accesses, add access addresses or URLs for web tool accesses and name or rename web tool accesses. The customization information may be stored on a server if the user is signed in for use across sessions and machines. Alternately, the customization information may be stored only on the information client. When web tool accessing commands are entered into the user input element 10, the display activation element 1802 for web tool menus may be updated to show the corresponding web tool accessing commands and description. The main menu 1804 for web tool accessing and corresponding sub menu 1820 may be shown and corresponding menu items may be highlighted. As illustrated in FIG. 18, the web tool accessing command set may, for example, be "#" for default web tools with system default web tool access addresses or URLs. This can be the same as the 2-sheet Calculator "#c" for accessing the 2-sheet Calculator. Those skilled in the art will appreciate that the above referenced command is merely meant for purposes of an example and, as such, the command may be any command desired.

Figure 19:
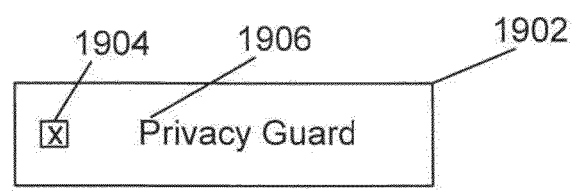
FIG. 19 is a schematic block diagram showing user interface elements for secure proxy browsing of the system according to the present invention.

Shown as 1902 in FIG. 19 is the major user interface element of one embodiment of user configuration of privacy mode and new page opening mode according to the present invention. This element can be displayed as the helper element 30. The checkbox 1904 may be checked by default. When the checkbox 1904 is checked, the privacy mode may be set to use an encrypted proxy for web page accesses, and new pages may be opened in gallery view in the content area 48. The color of the description text "Privacy Guard" 1906 may be in black or green to signal secure, but those skilled in the art will appreciate that this may be fully customizable and, as such, any color may be used. When the checkbox 1904 is unchecked, the privacy mode may be set to direct web page accesses, and new pages may be open in a new browser windows or new browser tabs and accessed without using proxy. Similarly, the color of the description text "Privacy Guard" 1906 may be in red or orange to signal warning of privacy risk, but, again, those skilled in the art will appreciate that this may be fully customizable and, as such, any color may be used.

Figure 20:
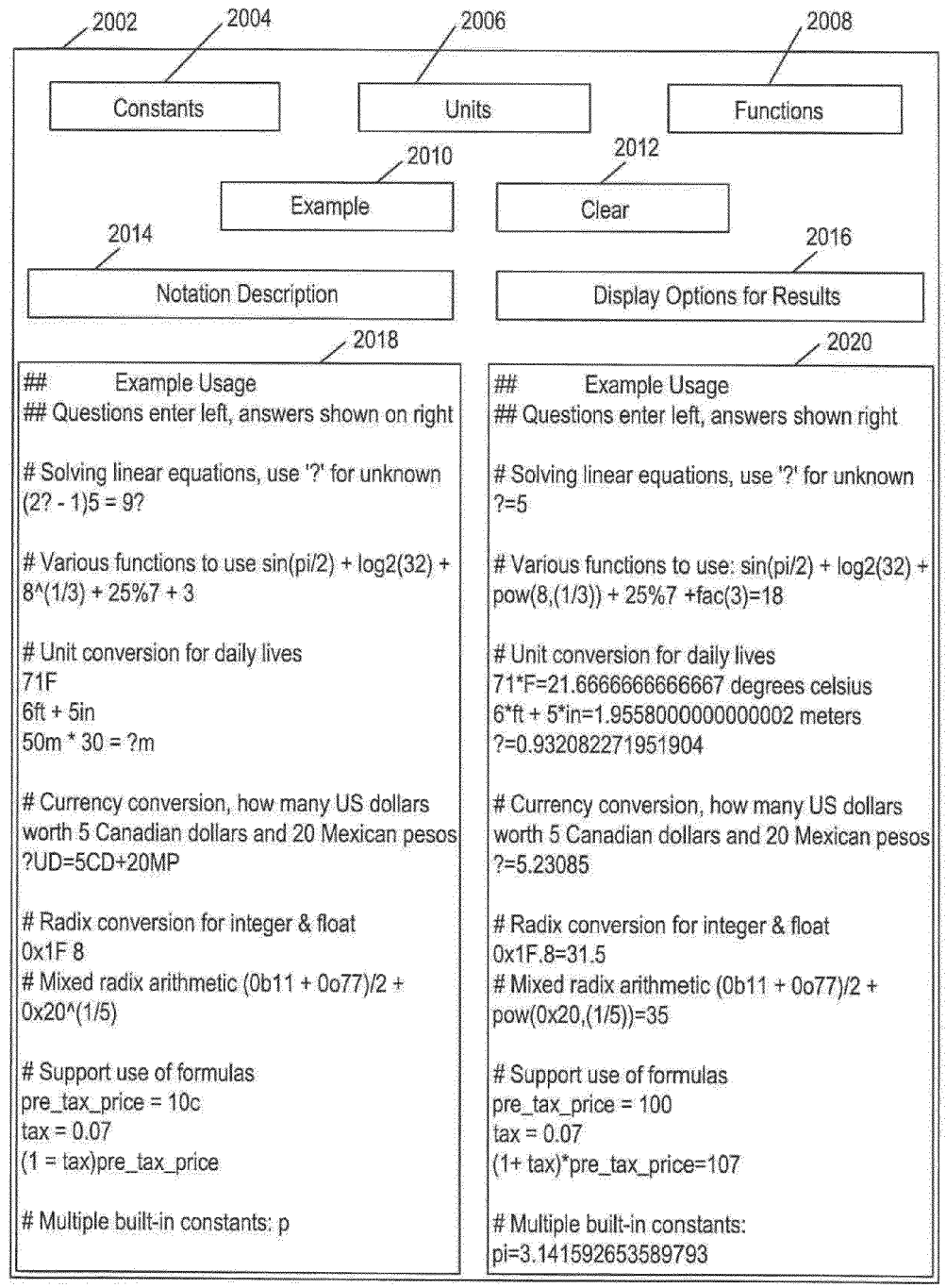
FIG. 20 is a schematic block diagram showing user interface elements for a 2-sheet calculator of the system according to the present invention.

The major user interface for the 2-sheet calculator according to the present invention is shown as 2002 in FIG. 20. Shown as 2004 may be a list box or an option box showing users the supported constants and corresponding notations. The constant box 2004 may also be used to insert corresponding selected constant notations into the question sheet 2018. Shown as 2006 may be a list box or an option box showing users the supported units and corresponding notations. The unit box 2006 may also be used to insert corresponding selected unit notations into the question sheet 2018. Shown as 2008 may be a list box or an option box showing users the supported functions and corresponding notations. The function box 2008 may also be used to insert corresponding selected function notations into the question sheet 2018.

Shown as 2010 may be a button which, upon activation, may populate the question sheet 2018 with example comments and questions. This button may also activate the calculation, generation and display of corresponding answers in the answer sheet 2020. This may be configured side-by-side to the corresponding questions or comments in question sheet 2018. Shown as 2012 may be a button which, upon activation, may clear both the question sheet 2018 and the answer sheet 2020, and may clear related variables and storages. Shown as 2014 may be brief instructions and notations for radices, variables, and unknowns, for example, for use in entering comments and question in the question sheet 2018. Shown as 2016 may be option controls, instructions and notations for radices, variables, and unknowns, for example, to be used for displaying the answers in the answer sheet 2020. The question sheet 2018 may be a text area, or a composite of entry boxes. Comments and questions may be entered into the question sheet 2018. Some delay or no delay may occur after the entering of the comments and questions. The corresponding answers may be calculated and the corresponding comments and answers may be displayed in the answer sheet 2020 side-by side to the corresponding comments and questions in the question sheet 2018.

Figure 21:
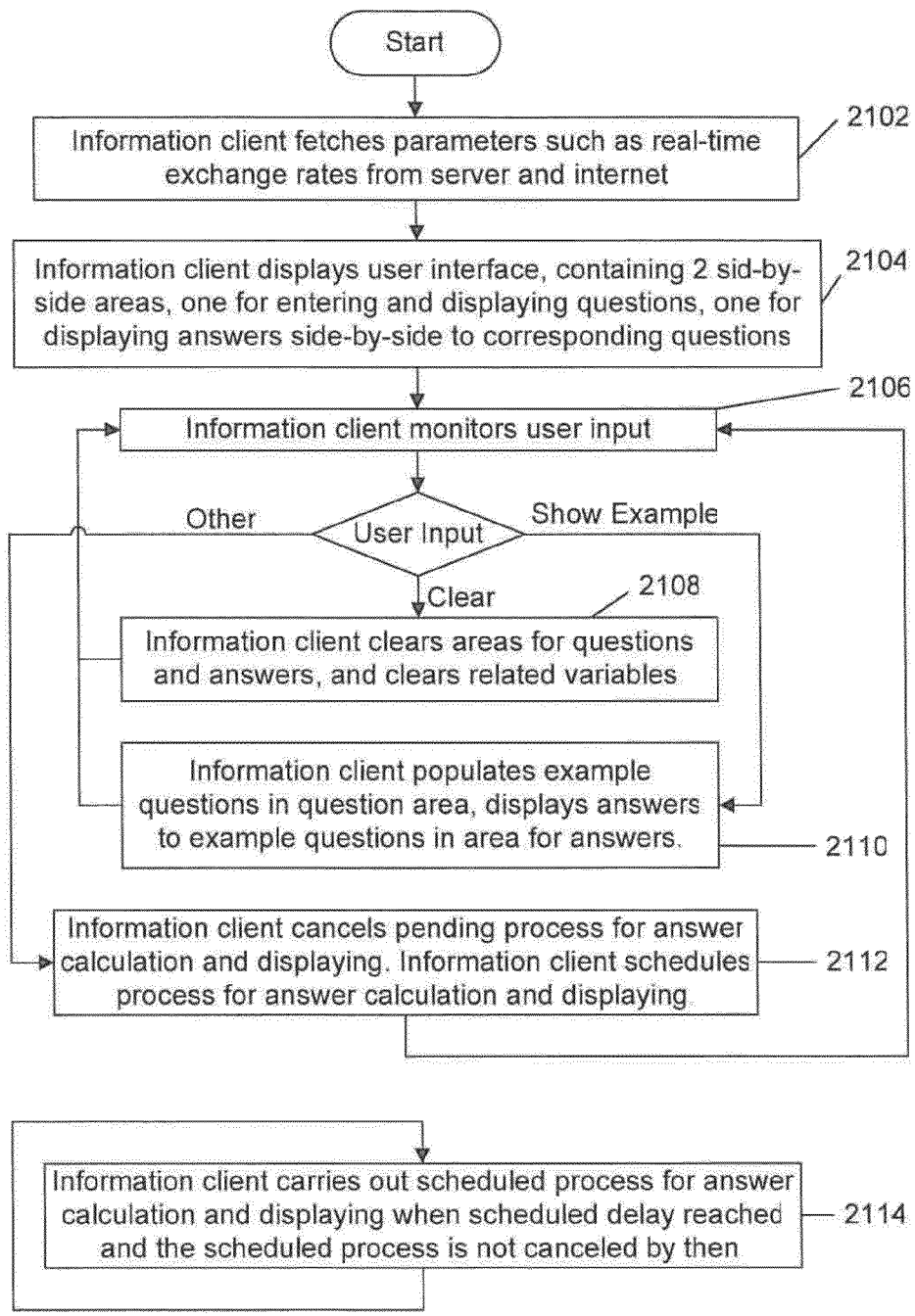
FIG. 21 is a flowchart illustrating use of the 2-sheet calculator described in FIG. 20.

FIG. 21 illustrates a flowchart showing the overall processing of the 2-sheet calculator according to the present invention. Shown as 2102 may be the process of the 2-sheet calculator to fetch necessary parameters such as rear-time currency exchange rates from the information server 206. Shown as 2104 is the process to display user interface elements as shown in FIG. 20 for the 2-sheet calculator according to the present invention. Shown as 2106 is the process for the 2-sheet calculator to monitor user input. If the 2-sheet calculator detects user input as a clearing command, the process 2108 may then be carried out to clear both the question sheet 2018 and the answer sheet 2020. The clearing process 2108 may also be carried out to clear related variables and storages.

If the 2-sheet calculator detects user input to be the activation of showing examples, the example showing process 2110 may then be carried out to first clear the question sheet 2018, the answer sheet 2020, and related variables and storages. Thereafter, the question sheet may be populated with example comments and questions to activate the calculation and generation of answers, and then to display the resulting comments and answers in the answer sheet 2020 in a side-by-side configuration to the corresponding comments and questions displayed in the question sheet 2018. If the 2-sheet calculator detects user input to be entries to the question sheet 2018, then the process 2112 may be activated to cancel pending process for answer calculation, generation and presentation. The process 2112 may also schedule process 2114 to carry out answer calculation, generation and presentation after certain delay or no delay since the latest user input. After a certain delay or no delay since the latest user input, if there are any pending process 2114 not being cancelled, the 2-sheet calculator may activate the calculation and generation of answers, and then may displays the resulting comments and answers in the answer sheet 2020 in a side-by-side configuration to the corresponding comments and questions displayed in the question sheet 2018.

Figure 22:
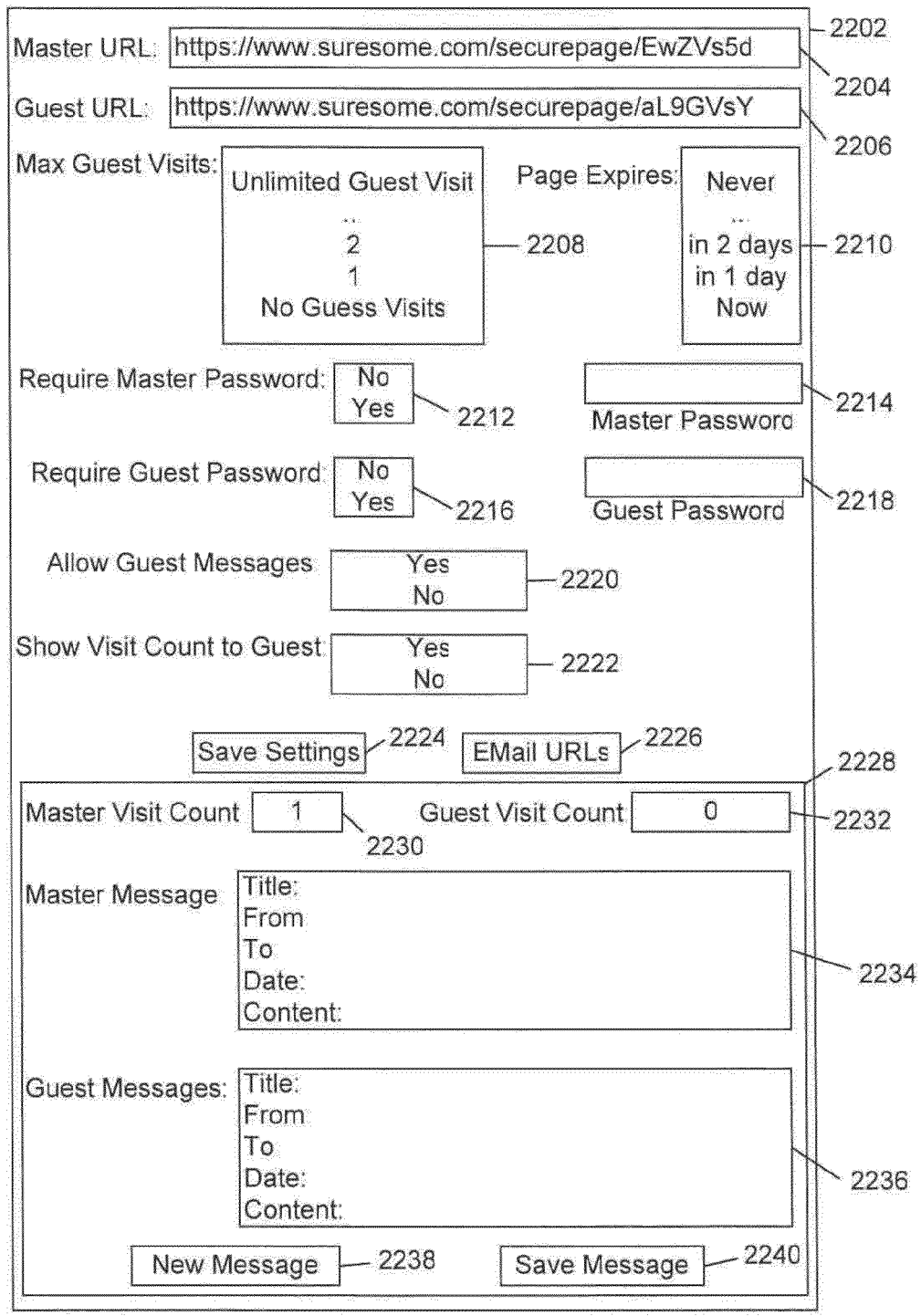
FIG. 22 is a schematic block diagram showing user interface elements for secure page customization and composition of the secure page of system according to the present invention.

FIG. 22 illustrates the major user interface for the secure page according to the present invention. When the secure page is accessed with a master address or a master URL, the full page 2202 may be presented to users on the information client 204 to allow user customization of secure page options. The communication between the information client 204 and the information server 206 may be encrypted. When the secure page is accessed with a guest address or a guest URL, a partial page 2228 may be presented on the information client 204 to users. The communication between the information client 204 and the information server 206 may be encrypted.

Shown as 2204 may be a text box for displaying the master access address or URL. Shown as 2206 may be a text box for displaying the guest access address or URL. Shown as 2208 may be a list box or an option box for limiting the number of guest visits to the secure page with the guest address or URL. Shown as 2210 may be a list box or an option box for limiting the life span of the secure page. When the life span is reached, the secure page may no longer be able to be accessed with the addresses or URLs for the secure page. Shown as 2212 may be a list box or an option box for configuring the password requirement for accessing of the secure page with corresponding master address or URL. Shown as 2214 may be a text box for setting the password for accessing of the secure page with corresponding master address or URL.

Shown as 2216 may be a list box or an option box for configuring the password requirement for accessing of the secure page with corresponding guest address or URL. Shown as 2218 may be a text box for setting the password for accessing of the secure page with corresponding guest address or URL. Shown as 2220 may be a list box or an option box for enabling or disabling guest message deposition and presentation when the corresponding secure page is accessed with corresponding guest address or URL. Shown as 2222 may be a list box or an option box for enabling or disabling the display of page access counts when the corresponding secure page is accessed with corresponding guest address or URL.

Shown as 2224 may be a button for allowing the user to save the above settings. Shown as 2226 may be a button for allowing the user to open the page 2302 in FIG. 23 for emailing the above master and guest URLs. Shown as 2230 may be a text box showing the access count of the secure page with corresponding master address or URL. Shown as 2232 may be a text box showing the access count of the secure page with corresponding guest address or URL. Shown as 2234 may a box for the user to enter textual or graphical messages when the secure page is accessed with the corresponding master address or URL. Shown as 2236 may a box for user to enter textual or graphical messages when the secure page is accessed with the corresponding master or guest address or URL. Shown as 2238 may be a button for creating new message entry areas. Shown as 2236 may be a button for activating saving of the messages user entered.

Figure 23:
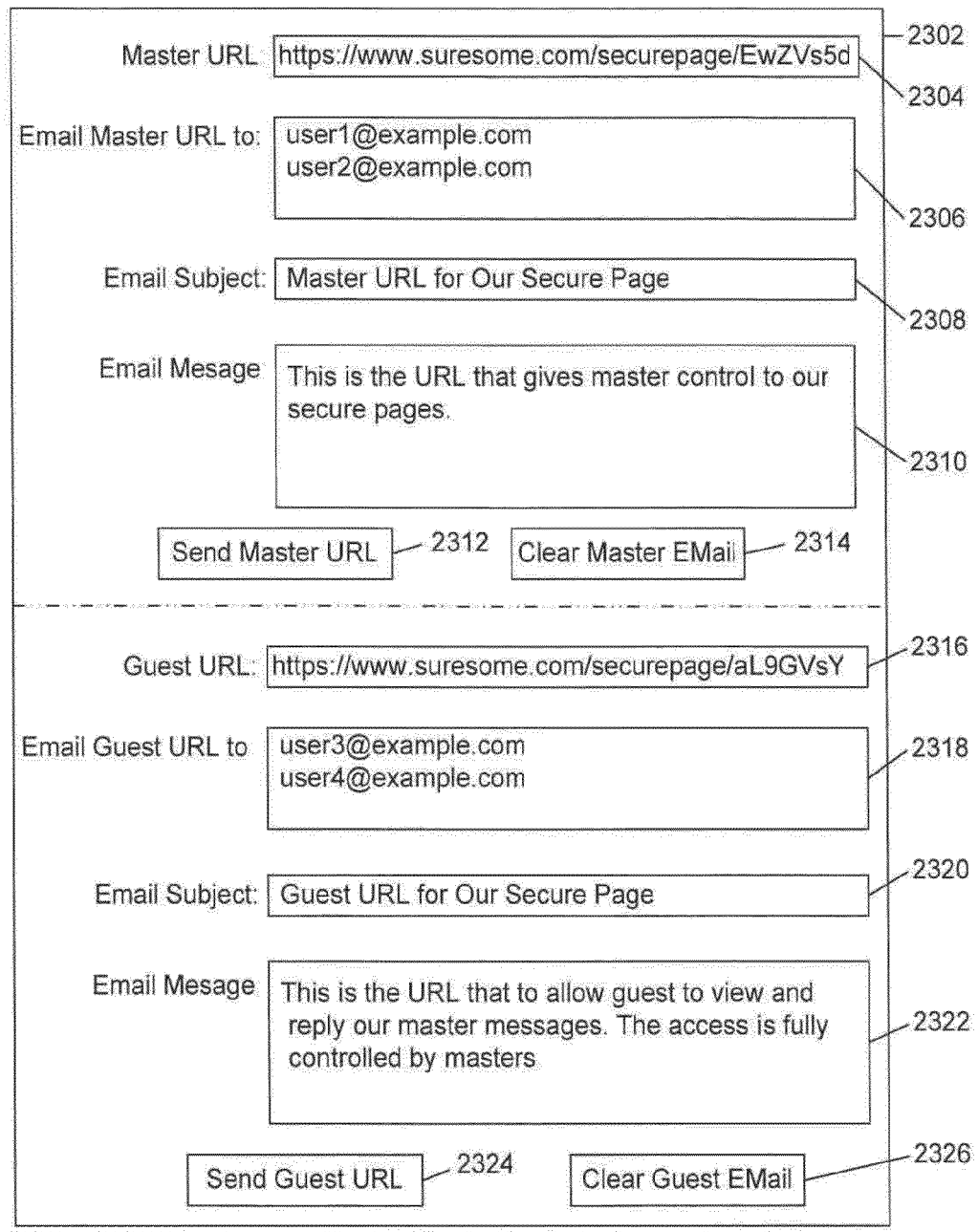
FIG. 23 is a schematic block diagram showing user interface elements for sending secure page URLs of the secure page of the system according to the present invention.

FIG. 23 illustrates the major user interface for sending out the master and guess addresses for the corresponding secure page via email, or other electronic format. Shown as 2304 may be a text box for displaying the master access address or URL. Shown as 2306 may be a text box for the user to enter email addresses, or other electronic address, as understood by those skilled in the art, for the master access address or URL to be sent to. Shown as 2308 may be a text box for the user to enter subject text for the email to be sent to the email addresses entered in master email address box 2306. Shown as 2310 may be a text box for the user to enter message text in addition to the master address or URL shown in master URL box 2304 for the email to be sent to the email addresses entered in master email address box 2306. Shown as 2312 may be a button for activating sending email with a subject to be the text entered in the subject box 2308 and a message to be the text entered in the message box 2310 along with the master address or URL shown in master URL box 2304 to the email addresses entered in email address box 2306.

Shown as 2314 may be a button for activating clearing of the email address box 2306, the email subject box 2308 and the email message box 2310. Shown as 2316 may be a text box for displaying the guest access address or URL. Shown as 2318 may be a text box for the user to enter email addresses for the guest access address or URL to be sent to. Shown as 2320 may be a text box for the user to enter subject text for the email to be sent to the email addresses entered in guest email address box 2318. Shown as 2322 may be a text box for user to enter message text in addition to the guest address or URL shown in guest URL box 2316 for the email to be sent to the email addresses entered in guest email address box 2318. Shown as 2324 may be a button for activating sending email with a subject to be the text entered in the subject box 2320 and message to be the text entered in the message box 2322 along with the guest address or URL shown in guest URL box 2316 to the email addresses entered in email address box 2318. Shown as 2326 may be a button for activating clearing of the email address box 2318, the email subject box 2320 and the email message box 2322.

Figure 24:
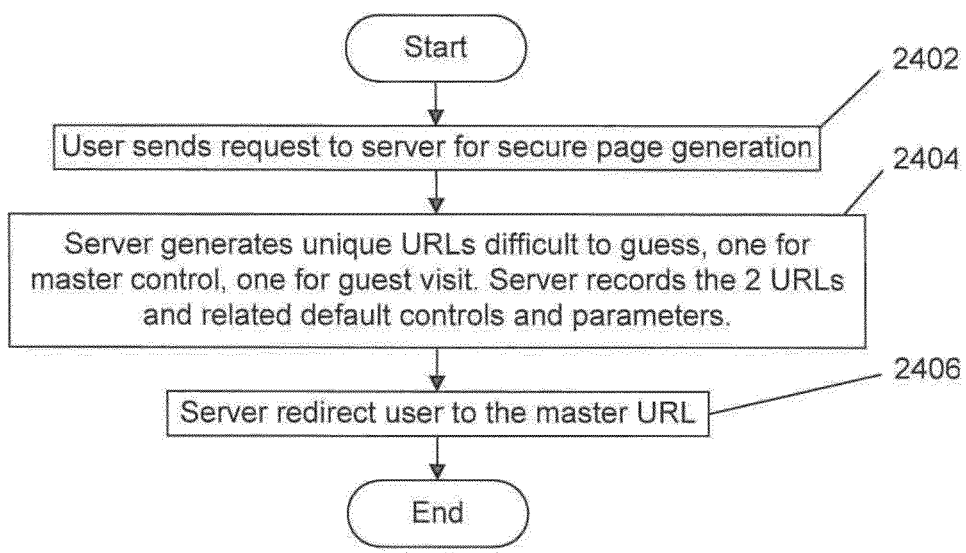
FIG. 24 is a flowchart illustrating a method of secure page creation and request redirection according to the present invention.

A flowchart showing the overall processing of the secure page generation process of present invention is illustrated in FIG. 24. Shown as 2402 may be a process for the user to request the information server 206 for secure page generation by either a clicking a, by clicking a hyperlink, or by using a special URL access. The request may be encrypted. Shown as 2404 is the process of URL generation. Plural unique access addresses, or URLs, may be generated. Special procedures such, as random number generation seeded with request time and computer process number may be used to make the access addresses or URLs unique and difficult to guess. The information server 206 is used to insure that these generated access addresses or URLs are unique by checking against existing recorded master and guest access addresses or URLs. The generation process continues until unique access addresses or URLs are obtained. One of the generated access address or URL is assigned to be a master access address or URL, the other one is assigned to be a guest access address or URL. The information server 206 records the assigned master and guest access addresses or URLs in server storage devices. Shown as 2406 is the process of redirecting the user's secure page generation request to the generated master access address or URL.

Figure 25:
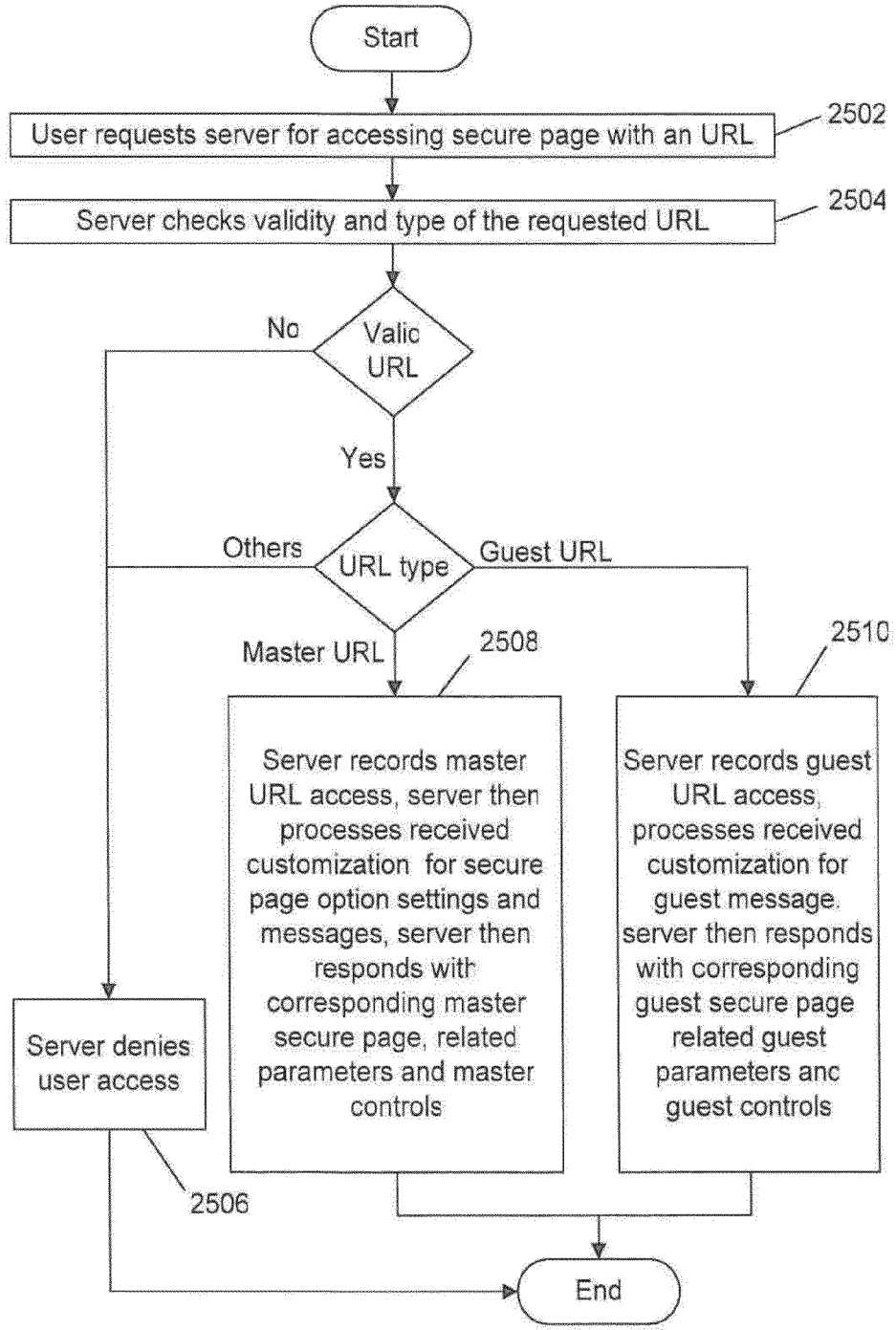
FIG. 25 is a flowchart illustrating secure page presentation according to the present invention.

A flowchart illustrating the overall processing of secure pages presentation according to the present invention is illustrated in FIG. 25. The user may initiate the request process 2502 for accessing a secure page with a corresponding access address or URL. In the process shown as 2504, the information server 206 checks the validity of and the type of the received access address or URL against the records for secure pages. If the received access address or URL is not valid or is expired, the information server 206 may then carry out process 2506 to deny the user access to the secure page. If the requested access address, however, or URL is valid, and the received access address or URL is a master access address or URL, then the process 2508 may be carried out on the information server 206 to record the access of the requested master access address or URL.

Further, if the requested address or URL is valid, then the process may be carried out on the information server 206 to process the customization of secure pages options and messages which may be received along with the requested master access address or URL, and respond the secure page request with corresponding master secure page and related parameters and controls. If the requested access address or URL is valid, and the received access address or URL is a guest URL, then the process 2510 may be carried out for the information server 206 to record the access of the requested guest access address or URL, to process the customization of guest messages which may be received along with the requested guest URL, and respond to the secure page request with corresponding guest secure page and related parameters and controls. If the requested URL is valid but the type is neither master nor guest, the information server 206 may then carry out process 2506 to deny the user access of the secure page.

Figure 26:
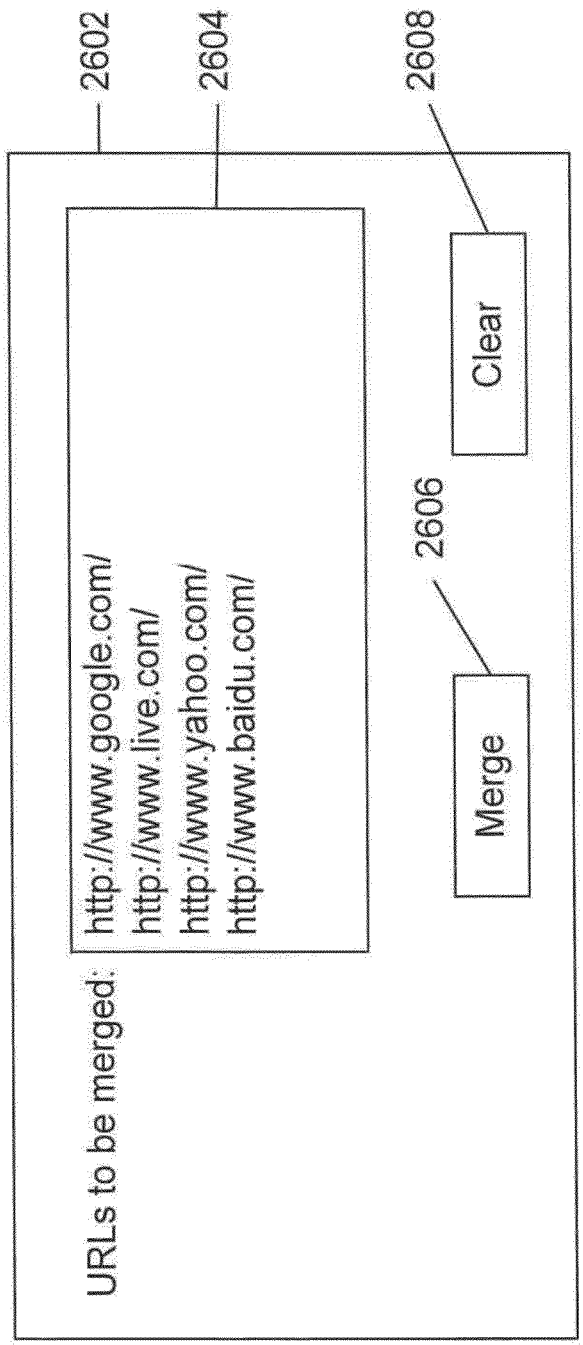
FIG. 26 is a schematic block diagram showing user interface elements for merging plural URLs according to the present invention.

FIG. 26 illustrates the major user interface of the access address or URL merging function according to the present invention. This function advantageously allows for the production of a merged URL for opening multiple pages for a corresponding user designated URLs. Shown as 2604 may be a text box for the user to enter the user designated access addresses or URLs to be merged. Shown as 2606 may be a button or a hyper link for activating the generation process for the merged access address or URL. Shown as 2608 may be a button or a hyperlink for activating the clearing of the user designated access address or URL box 2604.

Figure 27:
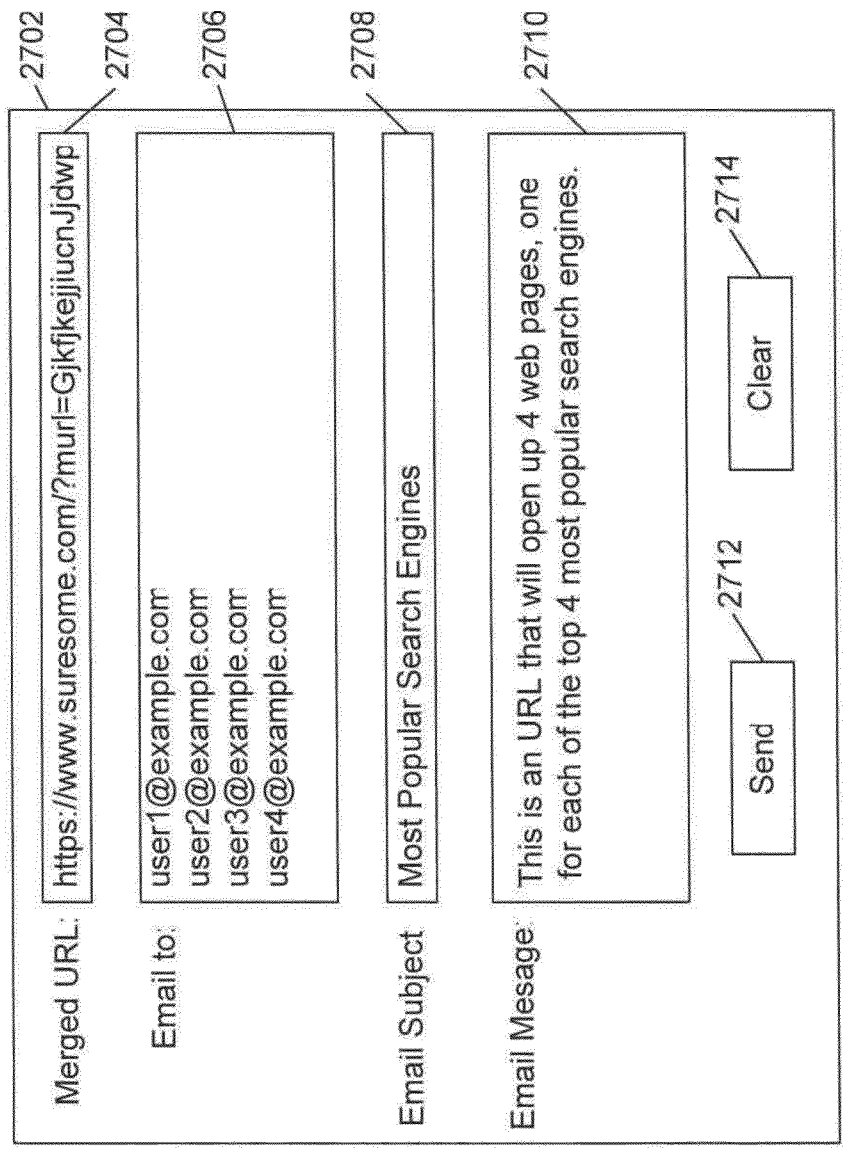
FIG. 27 is a schematic block diagram showing user interface elements for sending merged URLs according to the present invention.

FIG. 27 illustrates the major user interface associated with sending out the merged access address or URL via email according to the present invent. Shown as 2704 may be a text box displaying the merged access address or URL to be sent out via email. Shown as 2706 may be a text box for the user to enter the email addresses for the merged access address or URL shown in text box 2704 to be sent to. Shown as 2708 may be a text box for the user to enter the subject of the email to be sent out. Shown as 2710 may be a text box for the user to enter a message to be sent out along with the merged access address or URL shown in 2704 to the email addresses entered in email address box 2706. Shown as 2712 may be a button, or a hyperlink, for activating the email sending processes. Shown as 2714 may a button, or a hyperlink, for activating the clearing of the email address box 2706, email subject box 2708 and email message box 2710.

Figure 28:
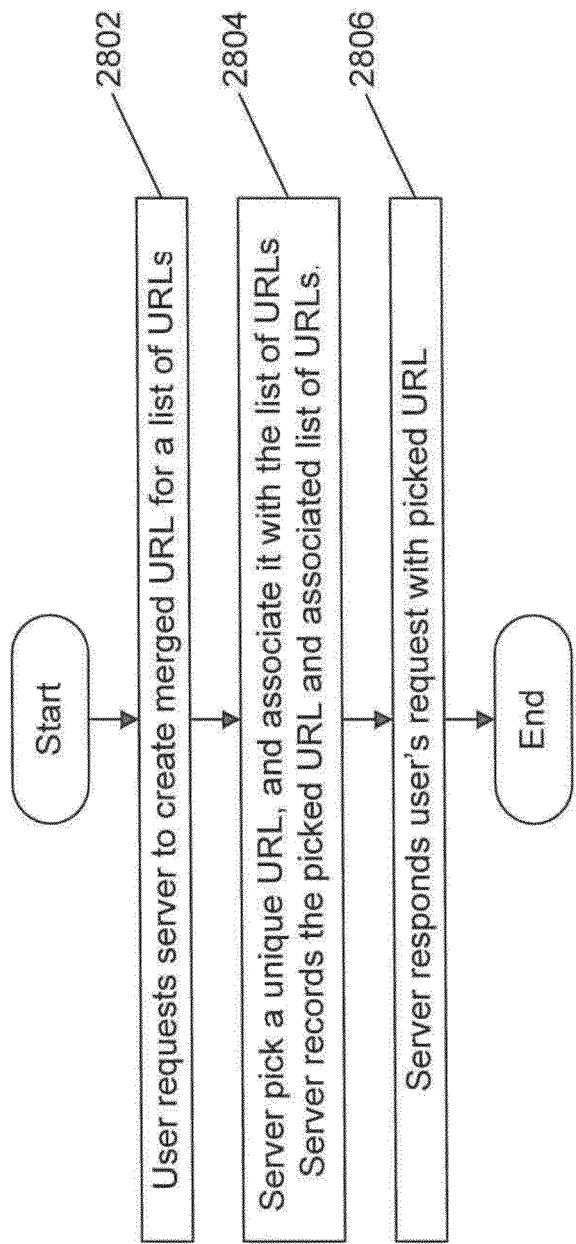
FIG. 28 is a flowchart illustrating a process of creating a merged URL according to the present invention.

A flowchart illustrating the overall process of the access address or URL merging function according to the present invention is illustrated in FIG. 28. The user may initiate the request process 2802 for generation of merged access address or URL for the designated access addresses or URLs. When the information server 206 receives the request for generation of merged access address or URL for the user designated URLs, the information server 206 may carry out process 2804 to generate an access address or URL, and check against recorded merged access addresses or URLs in the server storage devices. If the generated access address or URL is not unique, a new one may generated. This process continues until a unique access address or URL is obtained. The information server 206 may then assign the generated unique access address or URL as a corresponding merged access address or URL, and associate the corresponding merged access address or URL with the corresponding received user designated access addresses or URLs. The information server 206 may then record the corresponding merged access address or URL and the associated user designated accesses address or URLs in the storage device. The information server 206 may thereafter carry out process 2806 to respond the user request with the generated unique access address or URL as the merged access address or URL.

Figure 29:
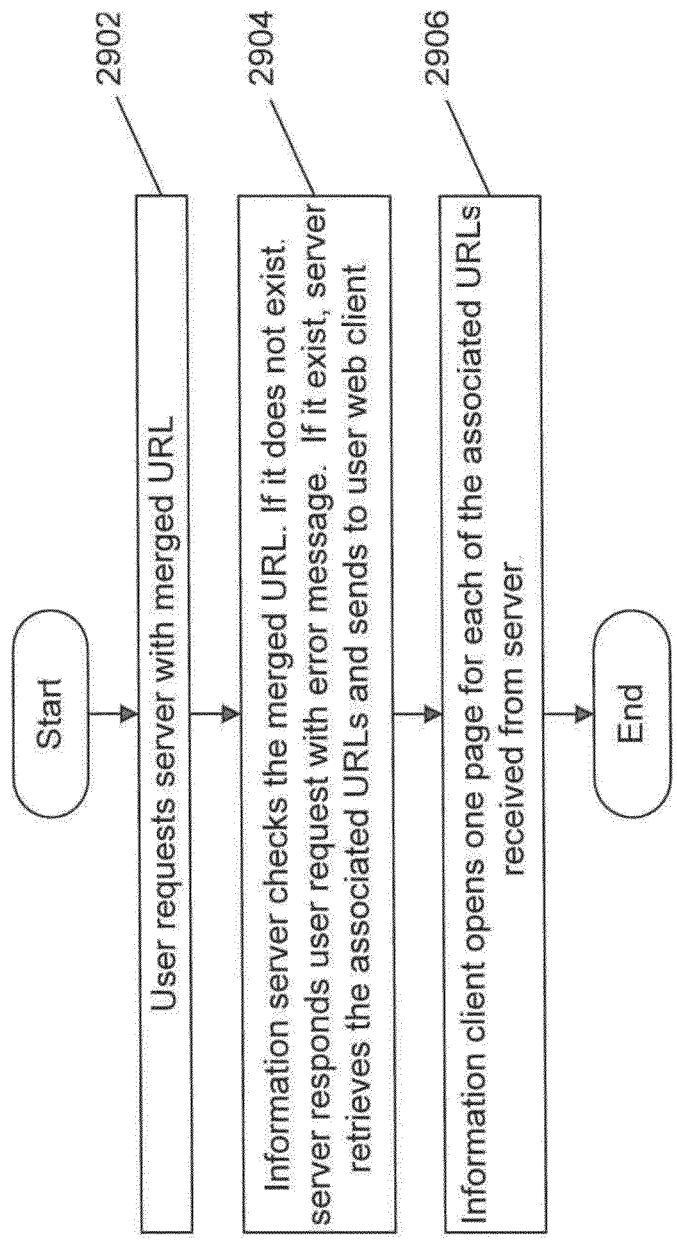
FIG. 29 is a flowchart illustrating a process of opening multiple web pages from a merged URL according to the present invention.

FIG. 29 illustrates a flowchart showing the process of opening the corresponding plural pages for the merged access address or URL according to the present invention. The user may initiate the request process 2902 by sending the merged URL to the information server 206. When the information server 206 receives the request with the merged access address or URL, the information server 206 may carry out process 2904 to look up the corresponding information for the received merged access address or URL. If corresponding information does not exist, the information server 206 may deny the user request. If, however, information does exist, the information server 206 may retrieve the corresponding designated access addresses or URLs for the received merged access address or URL, and may respond to the user request with the corresponding designated access addresses or URLs for the received merged access address or URL and along with the instructions to open web pages for the corresponding designated access addresses or URLs. The designated access addresses or URLs for the merged access address or URL may be transmitted from the server to the client by way of web page cookies. When the information client 204 receives the corresponding designated access addresses or URLs for the merged access address or URL and web page opening instructions, the information client 204 may open a corresponding page for each corresponding user designated access addresses or URLs for the merged access address or URL.

Figure 30:
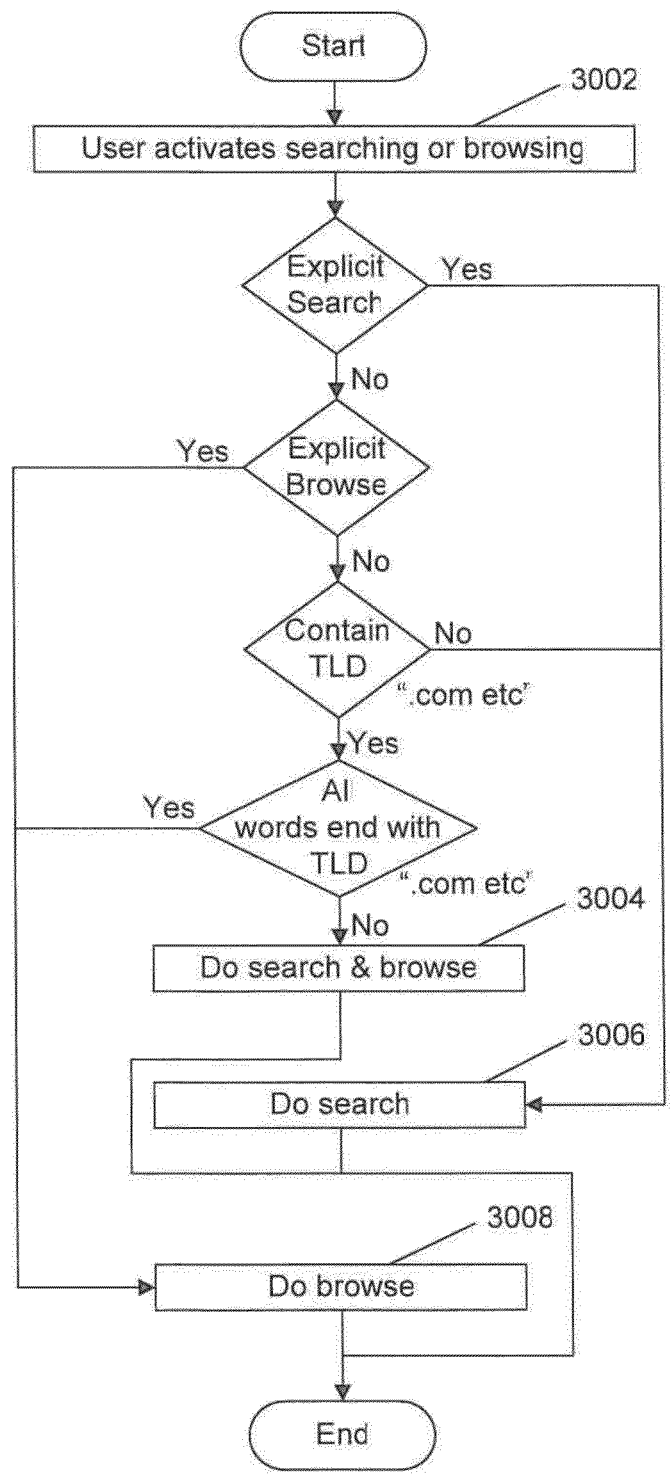
FIG. 30 is a flowchart illustrating a process of intelligent dispatching of search and browsing according to the present invention.

FIG. 30 illustrates a flowchart of the process of intelligent dispatching of searching and browsing according to the present invention. In process 3002, the user may activate searching or browsing by ways such as clicking a button or by depressing the "Enter" key. If searching is request explicitly by ways such as clicking a "Search" button or by entering a search command, such as, for example, "?", searching may be dispatched with process 3006 with the search command removed user input text to the user input element 10 as search keywords. If browsing is explicitly requested by ways such as clicking a "Browse" button or by entering a browsing command, such as, for example, ">", then browsing may be dispatched with process 3008 for each of the browsing command removed space separated text string in the input text to the user input element 10 which is ended with top level domain (TLD) names such as ".com" and ".net."

If the request is neither explicit searching nor browsing, then text inputted by the user in the input element 10 is checked to see if the top level domain (TLD) names such as ".com" and ".net" are contained. If all space separated text strings in the text inputted by the user in the input element 10 are ended with top level domain (TLD) names such as ".com" and ".net", then browsing may be dispatched with process 3008 over each space separated text string. If none of the space separated text strings in the text inputted by the user are ended with top level domain (TLD) names such as ".com" and ".net", then searching may be dispatched with process 3006 over the input text to the user input element 10. If some, but not all, of the space separated text strings in the input text to the user input element 10 are ended with top level domain (TLD) names such as ".com" and ".net", then with process 3004, searching over the search command removed text in the input element 10 may be dispatched, and browsing may be dispatched for each of the space separated text strings in the input text to the input element 10 which is ended with top level domain (TLD) names such as ".com" and ".net".

Figure 31:
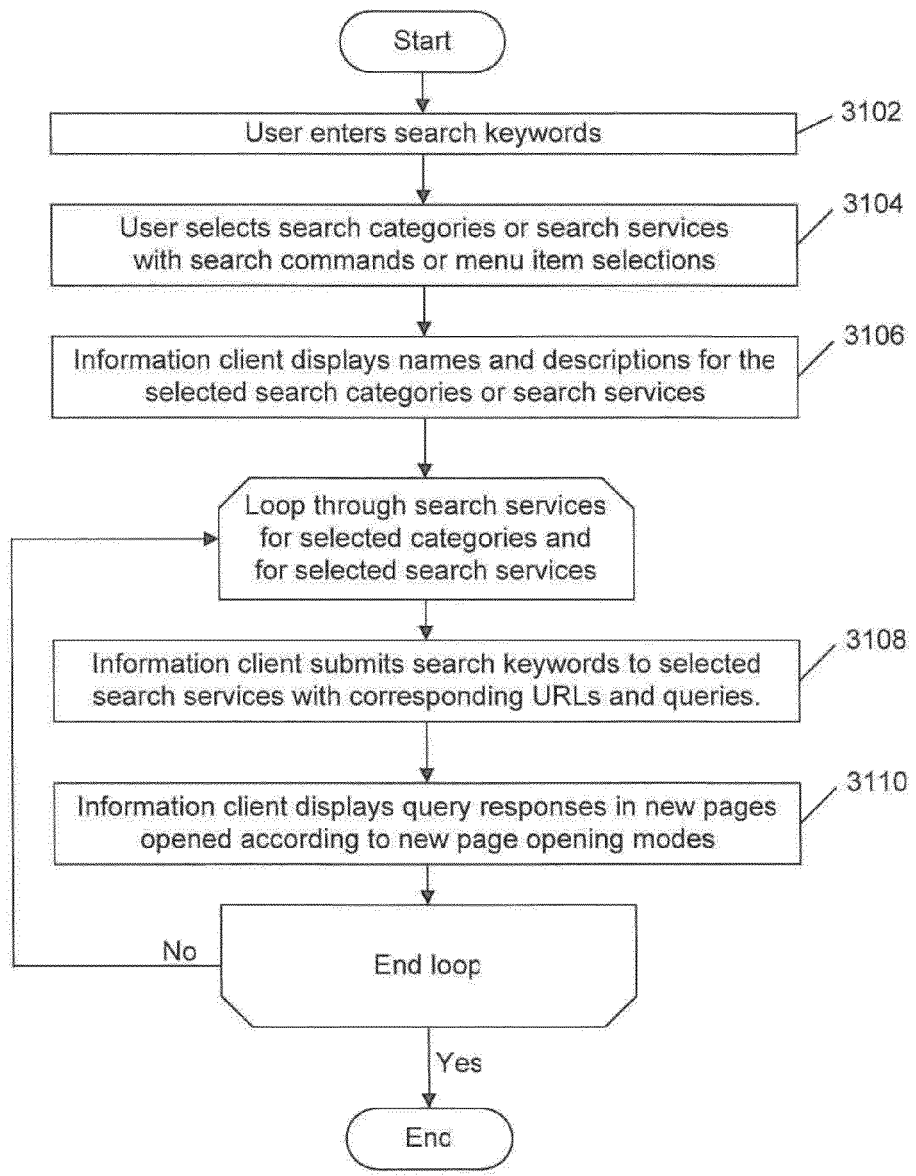
FIG. 31 is a flowchart illustrating a process for categorized searching according to the present invention.

A flowchart of the overall processing of categorized search according to the present invention is illustrated in FIG. 31. Shown as process 3102, the user may start the categorized search by entering search keywords in the user input element 10. Shown as process 3104, the user may then select search categories or search services with a search command or by selecting a menu item. Shown as process 3106, the information client 204 may then display the corresponding names or descriptions for the selected search categories or search services in proper user interface elements such as the helper element 24. The information client may then set the search services to be used for present searching to be all the search services in the selected search categories and in the selected search services. For each search service to be used for present searching, the information client 204 may then dispatch a search request to it with corresponding access address or URL and corresponding search query with the process shown as 3108. Once the information client 204 receives the search responses from the search services for the corresponding search requests, the information client 204 may then display the corresponding search responses in new pages opened in configured page opening modes with the process 3110.

Figure 32:
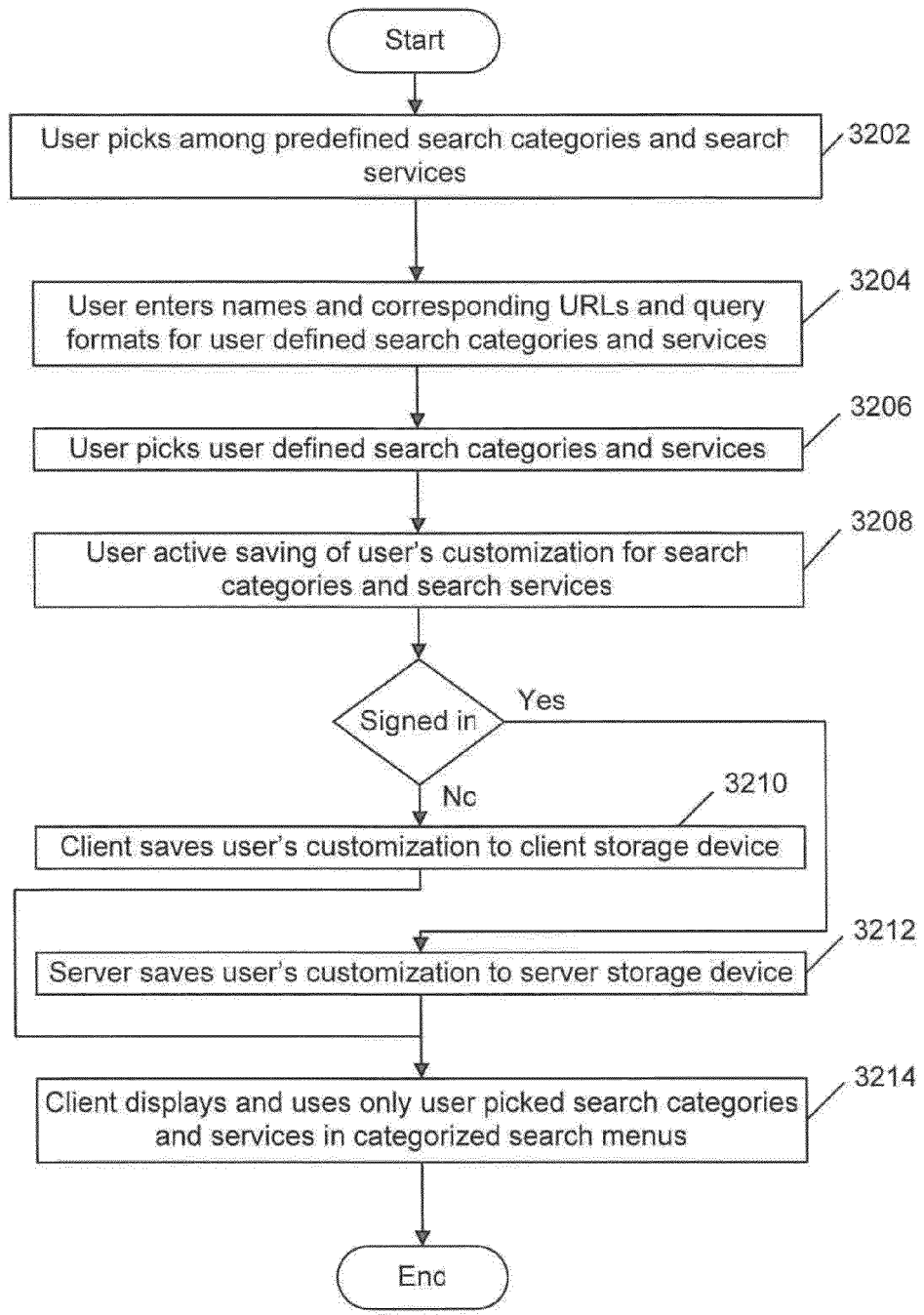
FIG. 32 is a flowchart illustrating a customization process for categorized searching according to the present invention.

A flowchart depicting the overall processing of categorized search customization according to the present invention is illustrated in FIG. 32. Shown as 3202, the user may pick search categories and search services from predefined search categories and search service. Shown as 3204, the user may also enter names and corresponding access addresses or URLs and query formats/templates for user defined search categories and search services. Shown as 3206, the user may also pick search categories and search services from user defined search categories and search services. Shown as 3208, the user may then activate saving of the user's customization of search categories and search services. The information client 204 may then check if the user is signed in. If the user is not signed in, then the user's customization may be saved on local storage device in the process shown as 3210. If, however, the user is signed in, then the user customization may be saved on the server storage device in the process shown as 3212. The information client 204 may then display and use only user picked search categories and search services in categorized search menus with the process shown as 3214.

Figure 33:
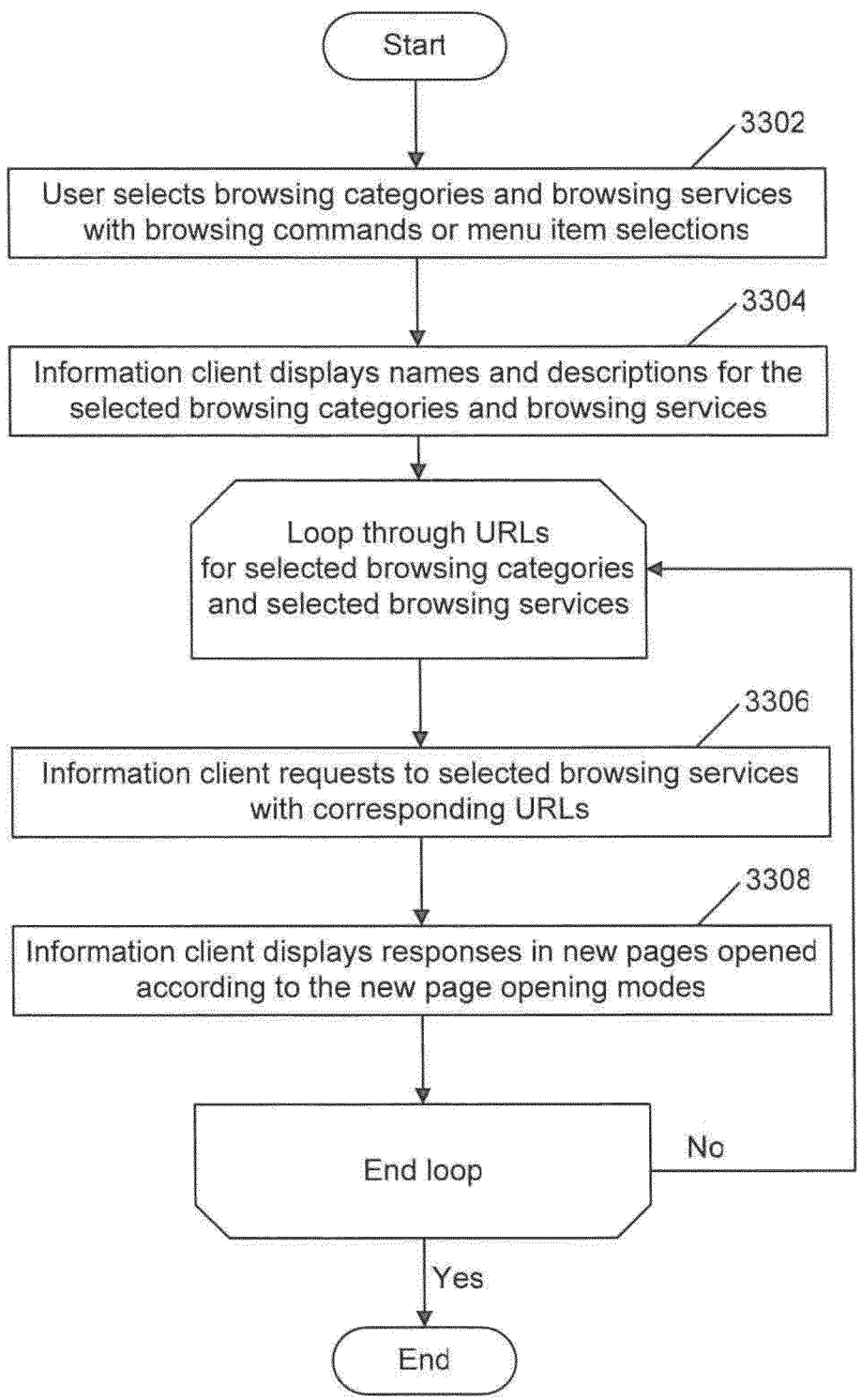
FIG. 33 is a flowchart illustrating a process of categorized browsing according to the present invention.

A flowchart depicting the overall processing of categorized browsing according to the present invention is illustrated in FIG. 33. Shown as process 3302, the user may select browsing categories or browsing services with browsing commands or menu item selections. Shown as process 3304, the information client 204 may then display the corresponding names or descriptions for the selected browsing categories or browsing services in proper user interface elements such as the helper element 26. The information client may then set the browsing services to be used for present browsing to be all the browsing services in the selected browsing categories and in the selected browsing services. For each browsing service to be used for present browsing, the information client 204 may dispatch a browsing request to it with corresponding access address or URL with the process shown as 3306. Once the information client 204 receives the browsing responses from the browsing services for the corresponding browsing requests, the information client 204 may then display the corresponding browsing responses in new pages opened according to the configured page opening modes with the process shown as 3308.

Figure 34:
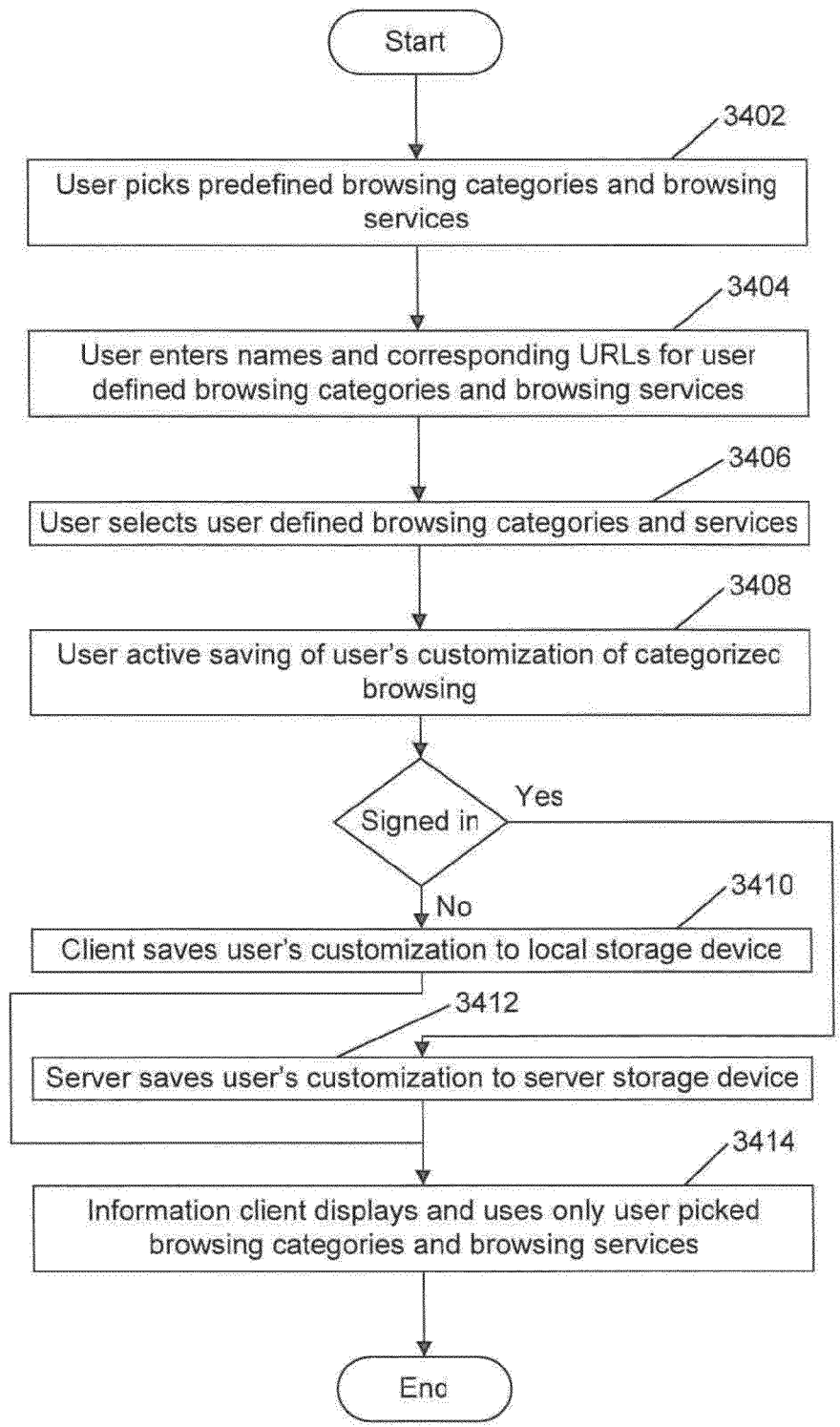
FIG. 34 is a flowchart illustrating a customization process for categorized browsing according to the present invention.

FIG. 34 depicts a flowchart of the overall processing of categorized browsing customization according to the present invention. Shown as 3402, the user may pick browsing categories and browsing services from predefined browsing categories and browsing services. Shown as 3404, the user may also enter names and corresponding access addresses or URLs for user defined browsing categories and browsing services. Shown as 3406, the user may also pick browsing categories and browsing services from user defined browsing categories and browsing services. Shown as 3408, the user may then activate saving of the user's customization of browsing categories and browsing services. The information client 204 may then check if the user is signed in. If the user is not signed in, then the user's customization may be saved on a local storage device in the process shown as 3410. If, however, the user is signed in, then the user customization may be saved on the server storage device in the process shown as 3412. The information client 204 may then display and use only user picked browsing categories and browsing services in categorized browsing menus in the process shown as 3414.

Figure 35:
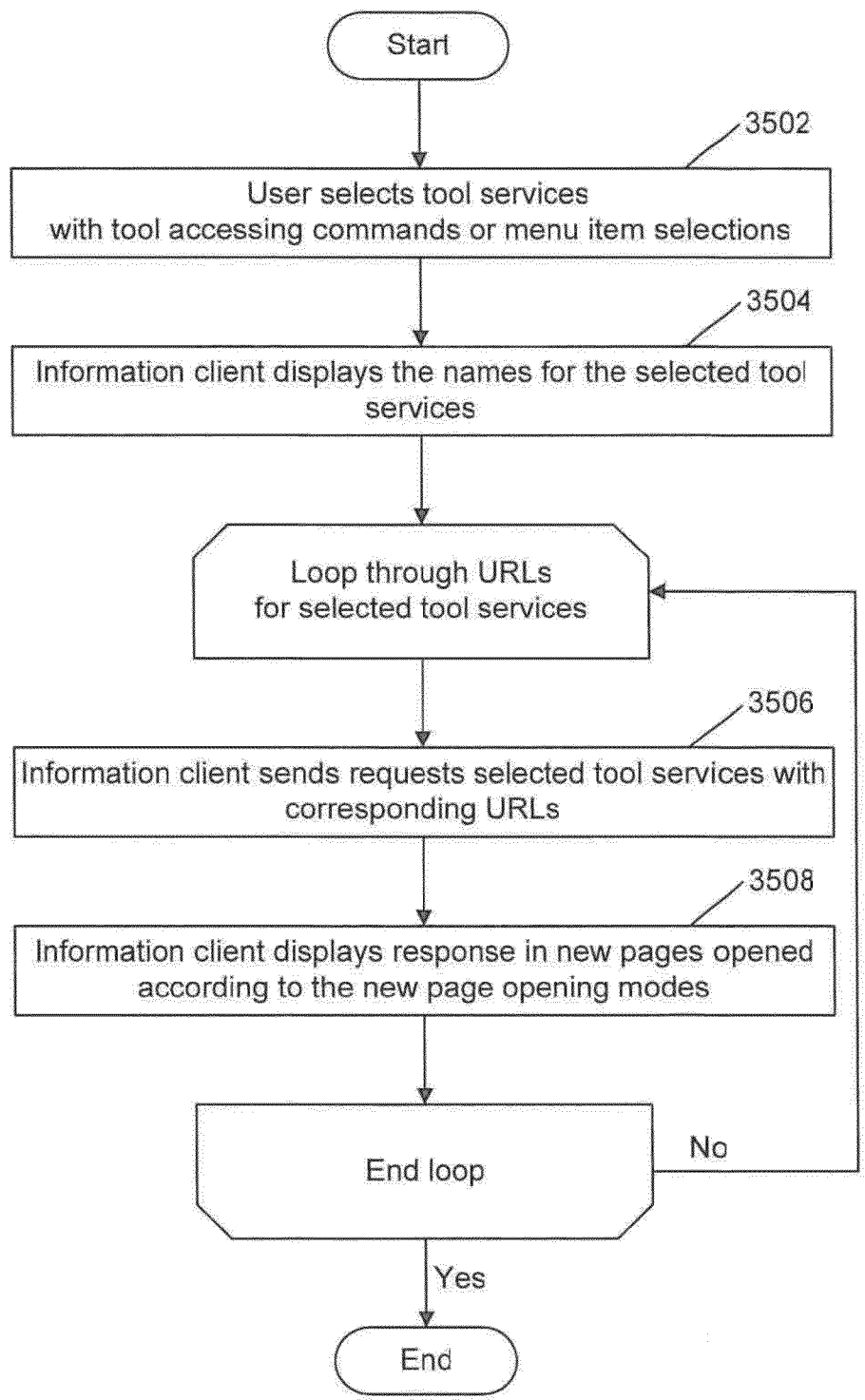
FIG. 35 is a flowchart illustrating a process of web tool accessing according to the present invention.

FIG. 35 depicts a flowchart of the overall processing of tool accessing according to the present invention. Shown as process 3502, the user may select tool categories or tool services with tool accessing command or menu item selection. Shown as process 3504, the information client 204 may then display the corresponding names or descriptions for the selected tool categories and tool services in proper user interface elements such as the helper element 28. The information client may then set the tool services to be used for present tool accessing to be all the tool services in the selected tool categories and in the selected tool services. For each tool services to be used for present tool accessing, the information client 204 may then dispatch an accessing request to it with corresponding access address or URL and related tool parameters in the process shown as 3506. Once the information client 204 receives the accessing responses from the tool services for the corresponding tool requests, the information client 204 may then display the corresponding tool responses in new pages opened according to the configured page opening modes with process 3508.

Figure 36:
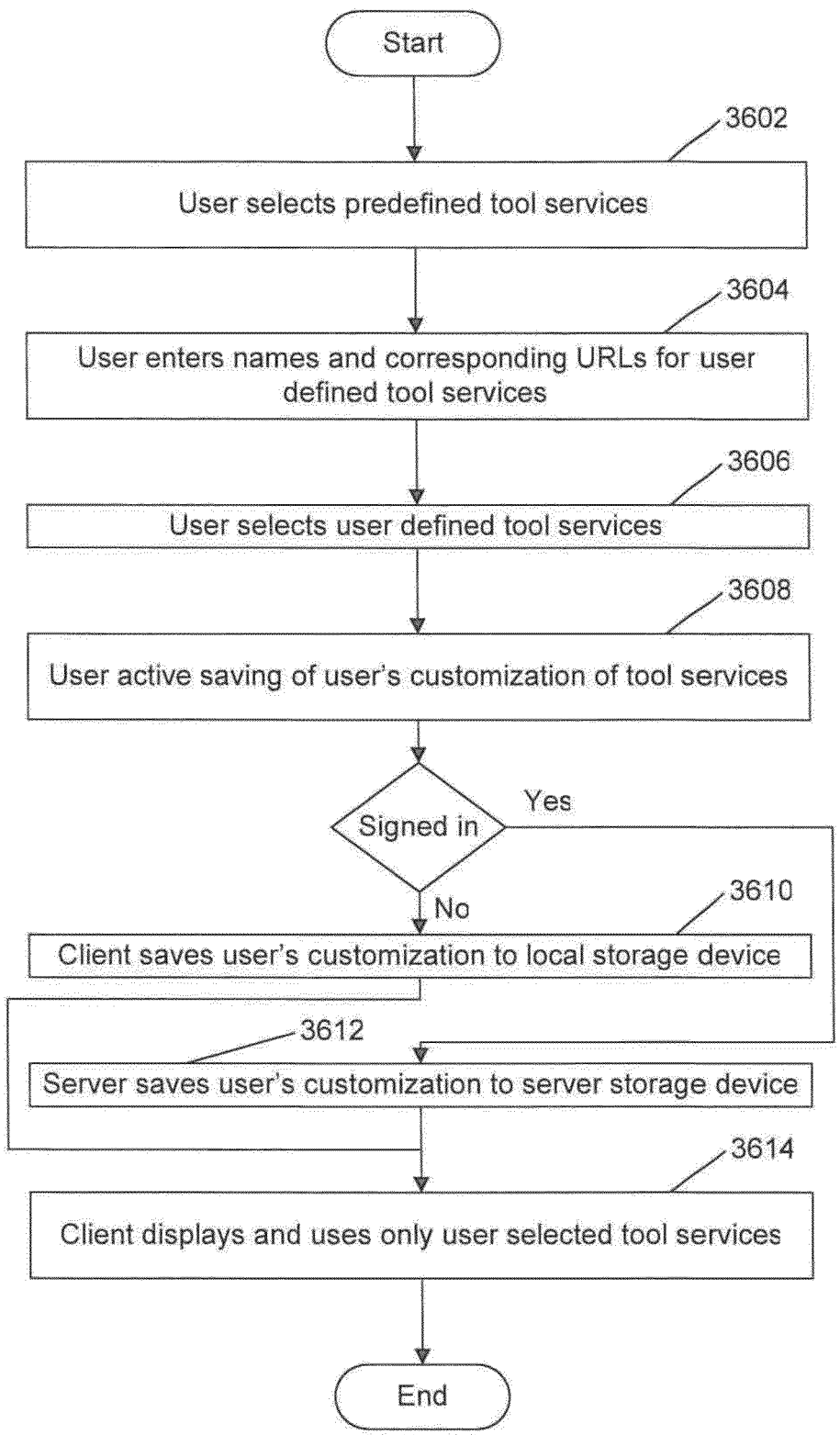
FIG. 36 is a flowchart illustrating a customization process for web tool accessing according to the present invention.

FIG. 36 depicts a flowchart of the overall processing of tool accessing customization of present invention. Shown as 3602, the user may pick tool categories and tool services from predefined tool categories and tool services. Shown as 3604, the user may also enter names and corresponding access addresses or URLs and related tool parameter templates for user defined tool categories and tool services. Shown as 3606, the user may also pick tool categories and tool services from the user defined tool categories and tool services. Shown as 3608, the user may then activate saving of the user's customization of tool categories and tool services. The information client 204 may check if the user is signed in. If the user is not signed in, then the user's customization may be saved on local storage device in the process shown as 3610. If, however, the user is signed in, then the user's customization may be saved on the server storage device in the process shown as 3612. The information client 204 may then display and use only user picked tool categories and tool services in tool accessing menus in the process shown as 3614.

Referring now additionally to FIGS. 37-46, additional aspects of the present invention are now described in greater detail. The present invention is directed to a computer implemented system and method for displaying a plurality of web pages within a single web browsing display area. The system and method according to the present invention includes determining a Uniform Resource Locator (URL) for each of the plurality of web pages to be displayed. Each of the URLs are preferably determined from user inputs and predefined settings. As illustrated, for example, in FIG. 37, the user inputs may be entered into a user input box towards an upper portion of the main page, and each of the plurality of web pages may be displayed beneath the user input box. Further, the address or URL corresponding to each of the plurality of web pages being displayed within the single web browsing display area may be positioned adjacent a top bar of each web page. It is preferable that the address or URL be depicted in an offset color so that the address is readily visible, but those skilled in the art will appreciate that any color may be used to display the address, and that the color may be fully customizable.

Figure 37:
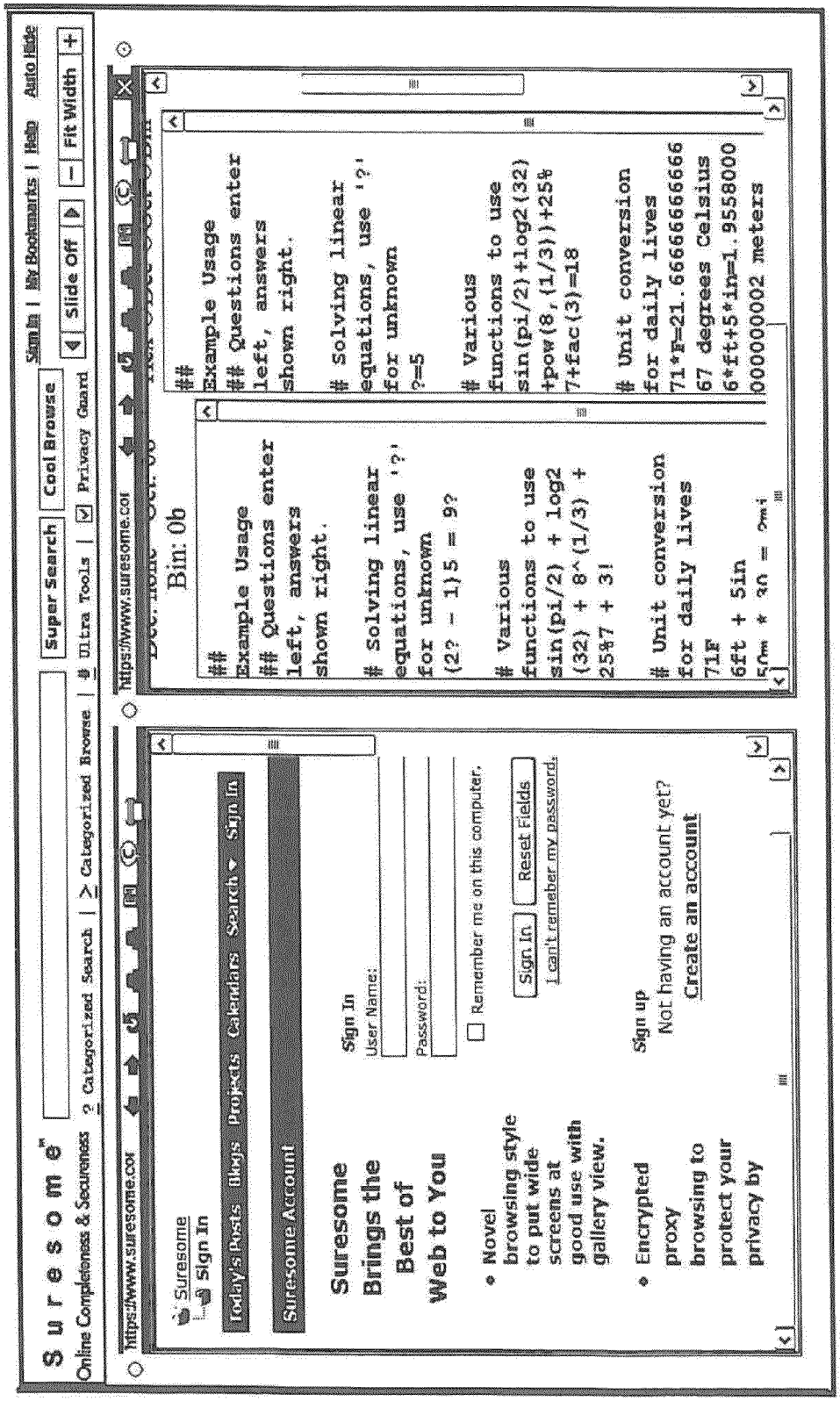
FIGS. 37-46 are screen shots of the system according to the present invention.
Figure 38:
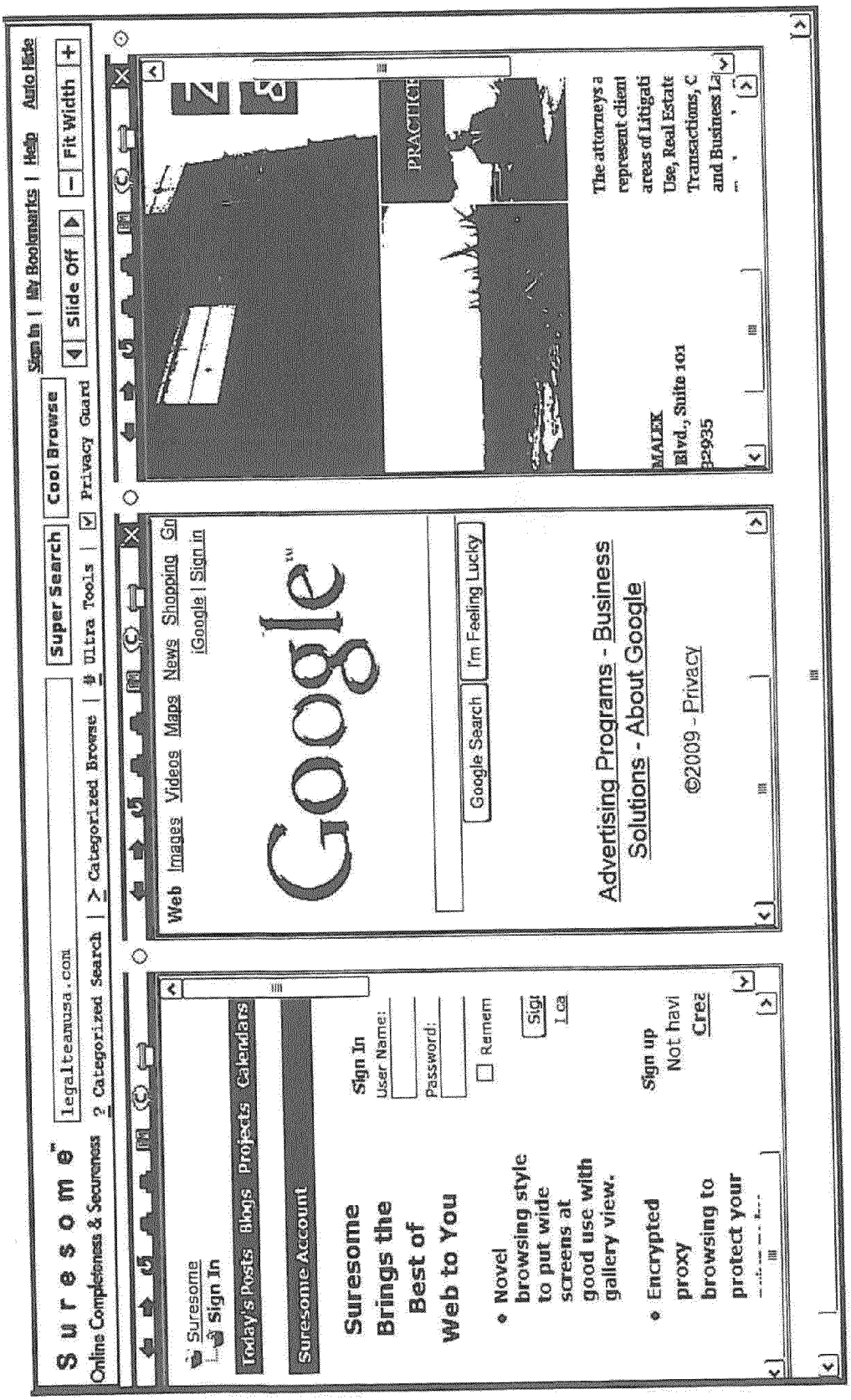
Figure 39:
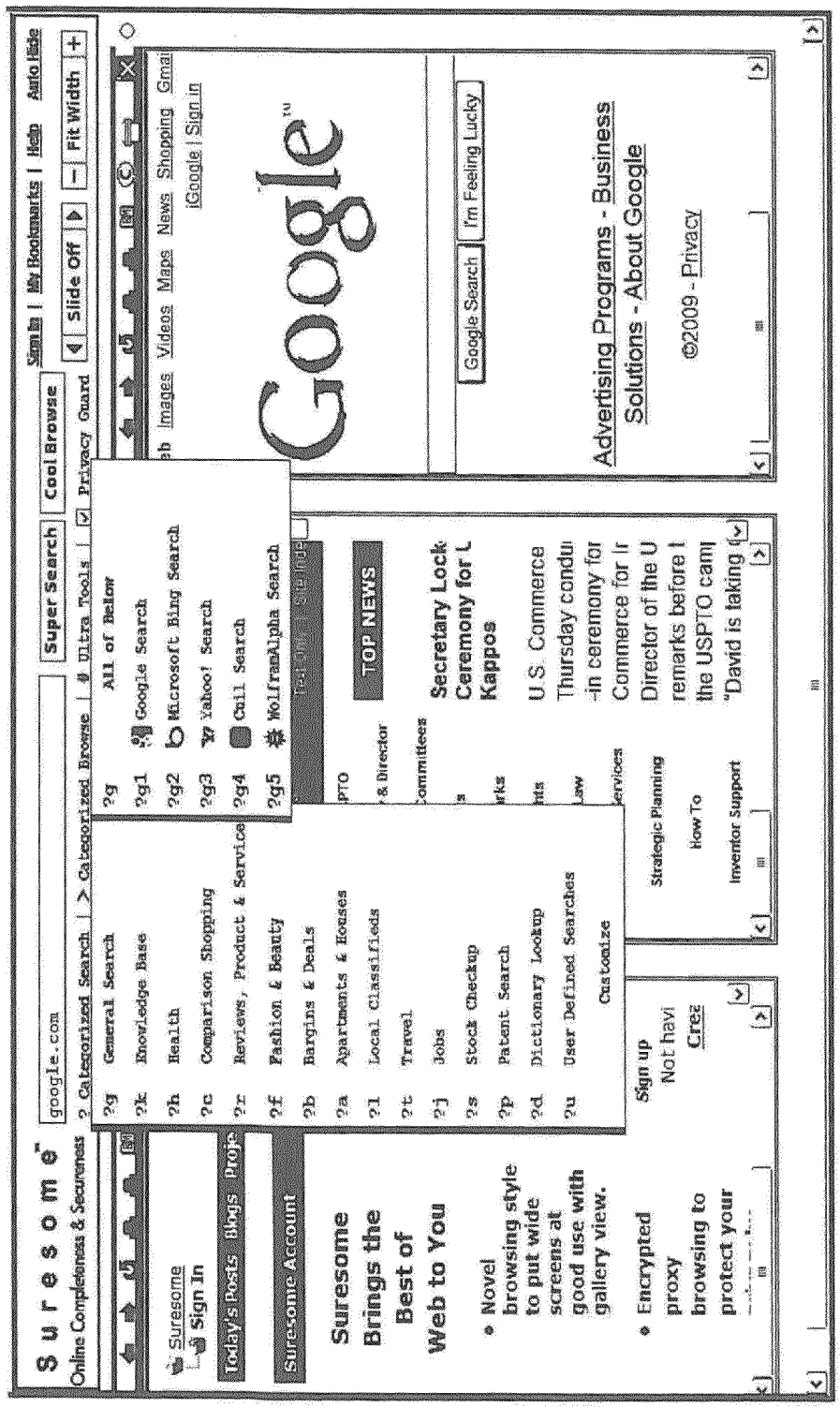
Figure 40:
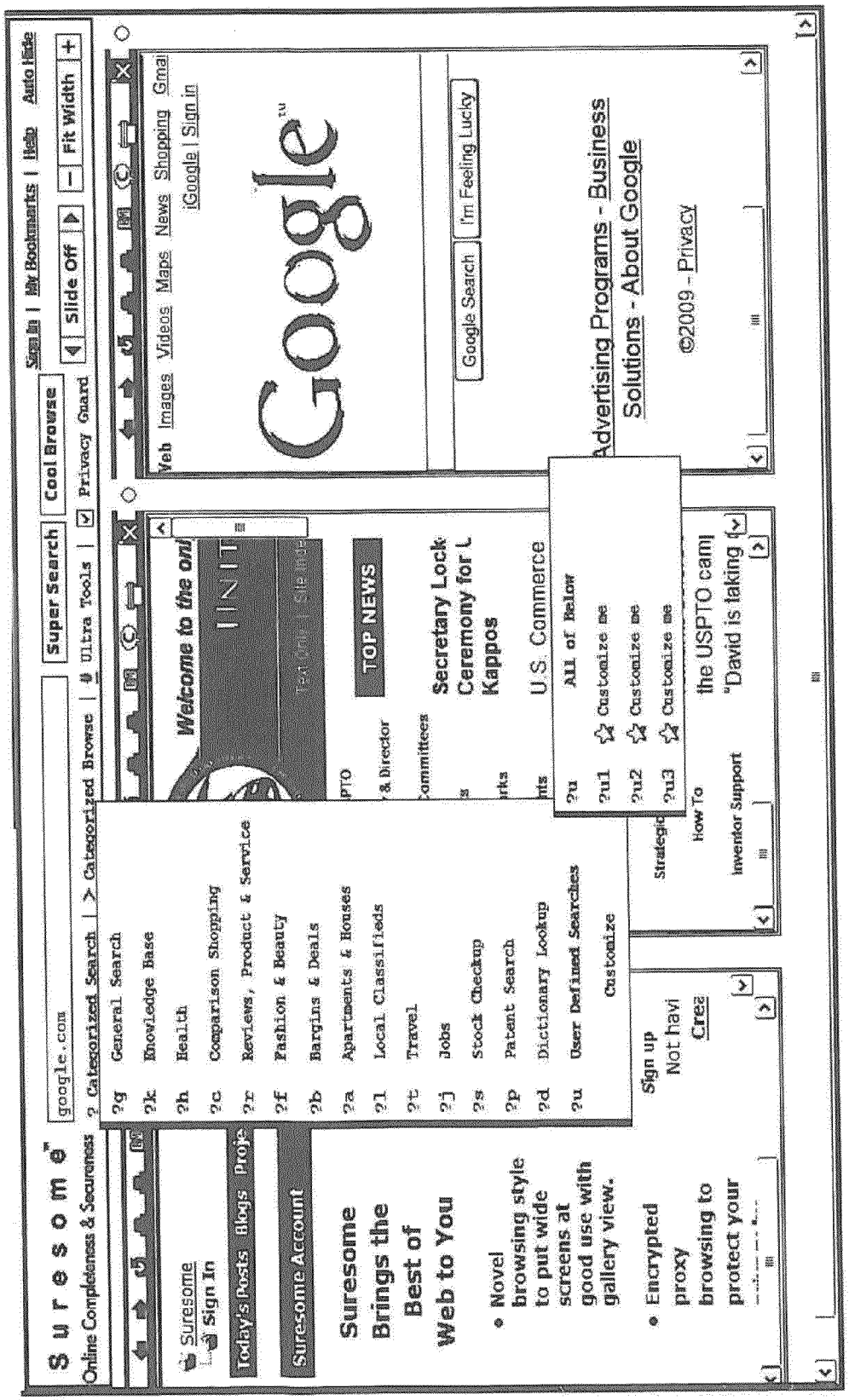

The method may also include allocating a display region within the web browsing display area to define an allocated display region. As illustrated in FIG. 37, two display regions have been allocated to display the two respective web pages. Referring additionally to FIG. 38, the method and system according to the present invention are illustrated showing three allocated display regions. Those skilled in the art will appreciate that any number of display regions may be allocated depending on the number of web pages to be opened. The method may further include displaying at least one of the plurality of web pages within the allocated display region. Again, and as perhaps best illustrated in FIGS. 37 and 38, the plurality of web pages are advantageously displayed so that one web page is displayed in one allocated region.

The system and method according to the present invention may further include providing a search tool for receiving data inputted from a user via a user interface. The data may be defined as inputted data. The inputted data may be searched using a predetermined search engine and/or a customizable selected search engine specified by the user. More specifically, and with specific reference, for example, to FIG. 39, the present invention may include a categorized search tool to allow a user to conduct a search in a plurality of different categories. The user may select the button labeled "categorized search" to select from a plurality of different ways to search. Upon selecting a search engine, search queries that are typed in the dialog box directly above the menu may be searched using the selected search engine. Search results may appear in a new window that is to be displayed within a new allocated region. Those skilled in the art will appreciate, however, that the search results may appear within the window where the search is conducted.

Several other search options are available to the user, as discussed above. For example, and as perhaps best illustrated in FIG. 40, the user may select a user defined search. The user defined search may advantageously allow the user to define their own parameters for searching to enhance search results.

This may advantageously allow the user to decrease the number of irrelevant search results that may be found when using generic search terms.

As illustrated in the screen shots in the appended figures, the web pages may be aligned in side by side relationship to one another. This advantageously allows for better use of the visible area on the single web browsing display area. More particularly, monitors have increased greatly in size, while simultaneously decreasing in price. Accordingly, many users do not utilize the full size of their monitors. The present invention advantageously allows users to view several web pages in side by side relationship so that the majority of the viewable area of the monitor may be used. Those skilled in the art will appreciate that the present invention is not limited to viewing a plurality of web pages in side by side relationship to one another, but also contemplates viewing the plurality of web pages in vertical relationship to one another, and further contemplates viewing the plurality of web pages in a hybrid between side by side and vertical. In other words, and for example only, a pair of web pages may be arranged in a stacked formation, i.e., one positioned in an upper portion of the single web browsing display area and the other positioned in the lower portion of the single web browsing display area, along with a pair of web pages being positioned in side by side relationship to one another.

As additional web pages are opened by the user, the additional allocated areas may be opened adjacent already opened web pages. With reference to the example above, an additional web page may be opened within a new additional allocated area either to the right or left of the originally opened web page, or to the top or bottom of the originally opened web page. Each of the plurality of allocated display areas may be sized to be displayed within the single web browsing display area. More specifically, the plurality of web pages may be displayed so that all of the web pages fit within the single web browsing display area. Alternately, the system of the present invention advantageously includes a horizontal scroll bar so that the user may horizontally scroll through the plurality of web pages. This can be advantageous when there are too many web pages opened by the user to all fit within the single web browsing display area.

The system of the present invention also illustratively includes a display customization tool to allow the user to customize the size of each of the plurality of allocated display areas. More specifically, the display customization tool advantageously allows the user to adjust the width of each of the allocated display areas. This allows the width of each of the plurality of web pages to either be narrowed or widened to allow the user to customize the display within the single web browsing display area. Accordingly, and depending on the number of web pages that are opened, the user may shrink the width of each of the plurality of web pages so that a greater number of web pages are visible on the single web browsing display area.

Those skilled in the art will appreciate that the display customization tool may be used to simultaneously customize the width of each of the plurality of web pages, or may be used to individually customize the width of each of the plurality of web pages. Those skilled in the art will further appreciate that the display customization tool may also be used to customize the height of each of the plurality of web pages. This may be advantageous when viewing the plurality of web pages in side by side relationship to one another, in horizontal relationship to one another, and in the hybrid relationship as described above.

Figure 41:
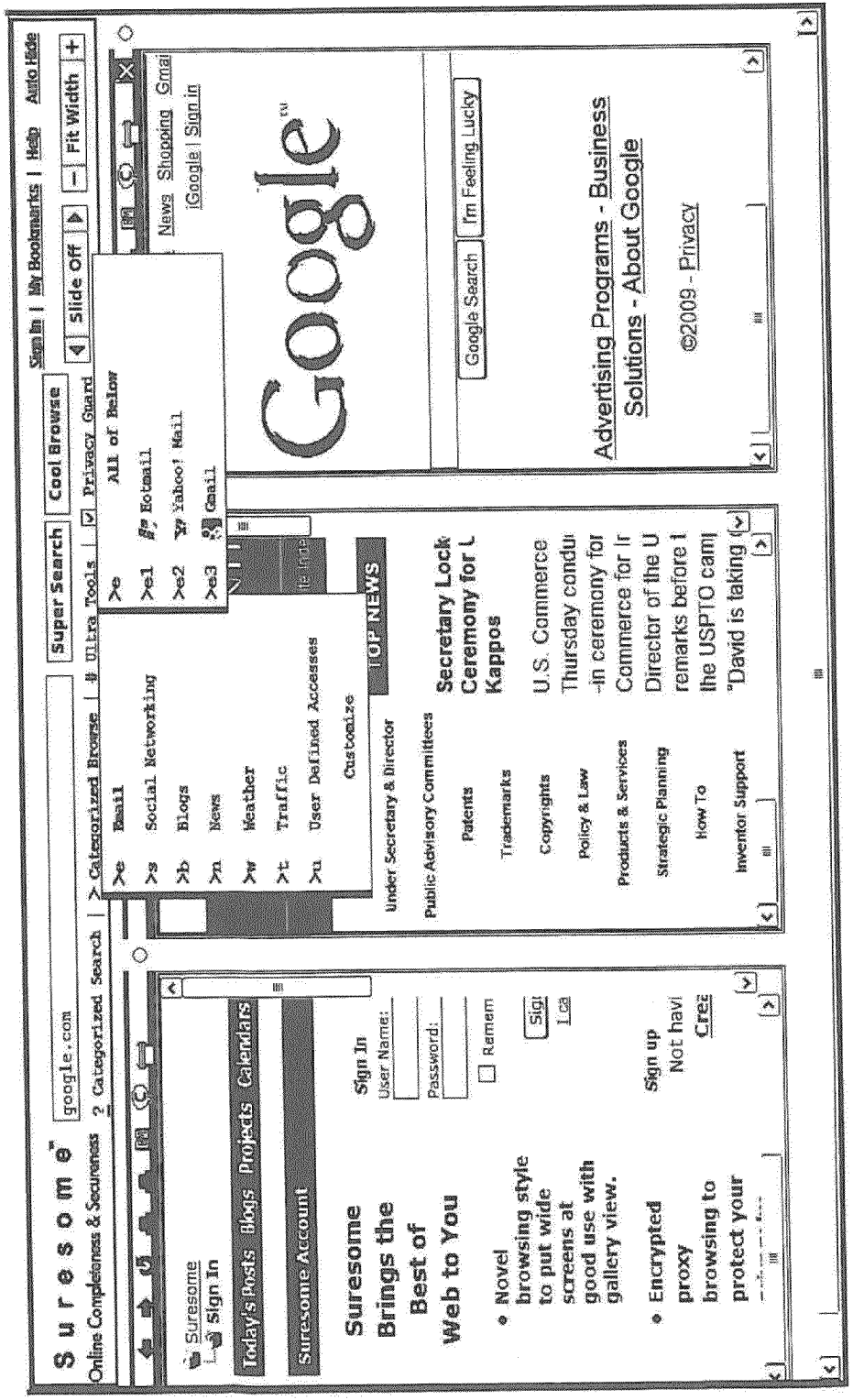
Figure 42:
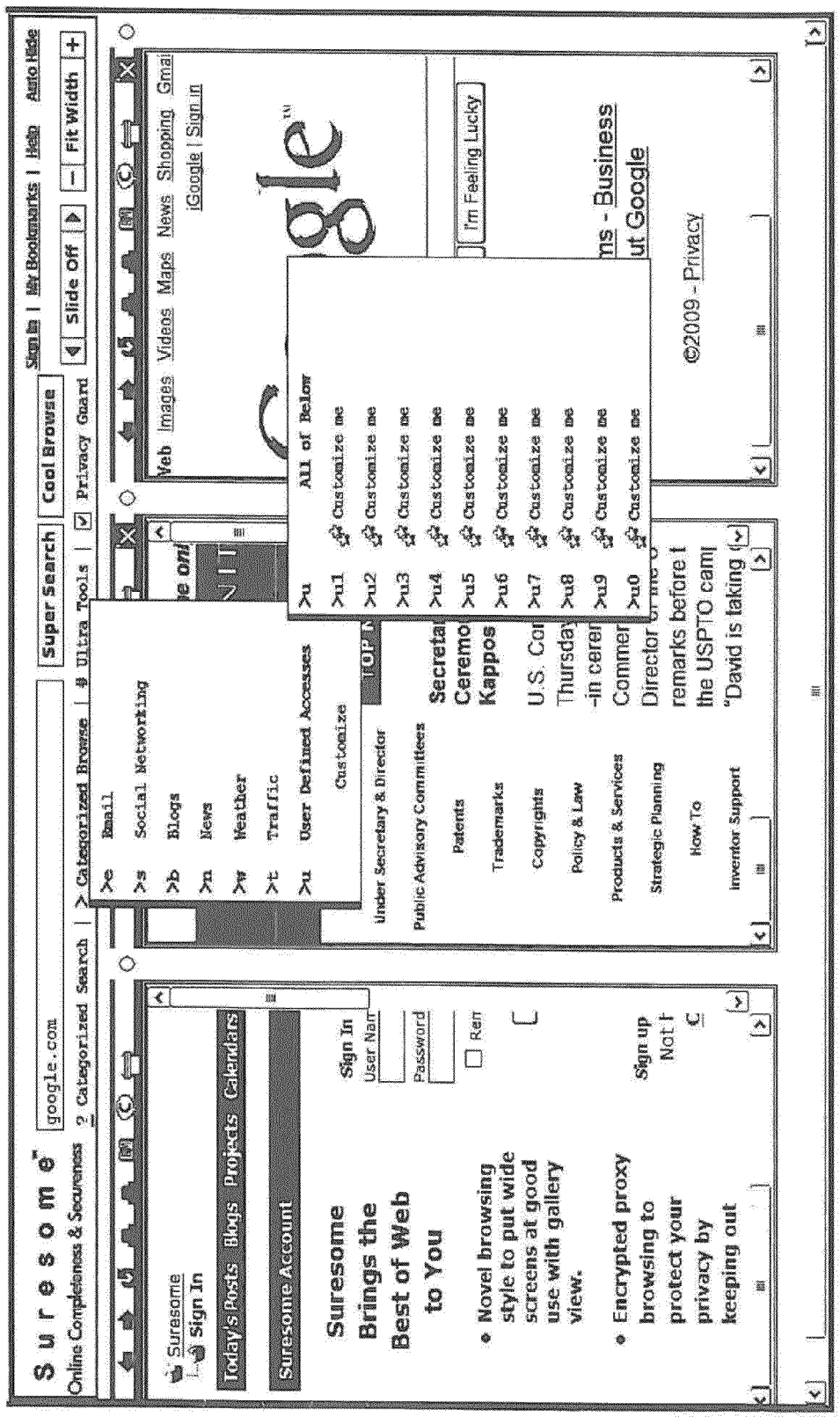

As illustrated, for example, in FIGS. 41-42, the system of the present invention illustratively includes a categorized browsing tool that allows the user to browse web pages relating to several different categories. The categories may include, for example, e-mail, social networking, blogs, news, weather, traffic, or other user defined categorized browsing sites. Accordingly, the tool bar for categorized browsing includes a plurality of browsing control tools to be used by the user to navigate each of the plurality of web pages.

As also illustrated in the screen shots of the appended figures, the plurality of browsing tools on the tool bar may include several buttons to assist the user while browsing the plurality of web pages. The buttons may include, for example, a "back" button, a "reload" button, a "forward" button, an "open new window or tab" button, a "bookmark" button, a "comment" button, and a "print" button. Those skilled in the art will appreciate that several buttons may be included in the plurality of browsing tools to advantageously enhance the user's ability to browse the plurality of web pages, and the above reference to various buttons is not meant to be limiting, but rather only meant as an example of some of the several buttons available. Further, the tool bars may be provided at a top portion of each of the plurality of web pages so that each tool bar is adapted to control the web pages with which it is associated. Those skilled in the art will appreciate, however, that the positioning of the tool bar is irrelevant with respect to the functionality of the system and method according to the present invention and, as such, the present invention contemplates any positioning of the tool bar.

The system according to the present invention may also include a position adjustment tool to allow the user to adjust the position of each of the plurality of web pages displayed within the single web browsing area. More specifically, the position adjustment tool may be provided by a button positioned toward the top of the single web browsing display area. Similar to the tool bar, however, the positioning of this button is irrelevant with respect to the functionality of the system and method according to the present invention and, as such, the present invention contemplates any positioning of this button. The position adjustment tool may advantageously allow the user to adjust the position of each of the plurality of web pages by moving the mouse over buttons to slide the single web browsing area left or right, and up or down, so that the user may access the display of each of the allocated display regions.

The system and methods of the present invention also illustratively includes an address display tool to display the web address of each of the plurality of web pages displayed within the single web browsing display area. As indicated above, the web address of each of the plurality of web pages is preferably displayed along a top portion of each of the plurality of web pages so that the user may advantageously be aware of the web page that has been opened and a new web browser display area. Those skilled in the art will appreciate that the address display tool may be displayed in any position suitable for allowing the user to know the website address, or URL, associated with each of the plurality of open web pages.

Figure 43:
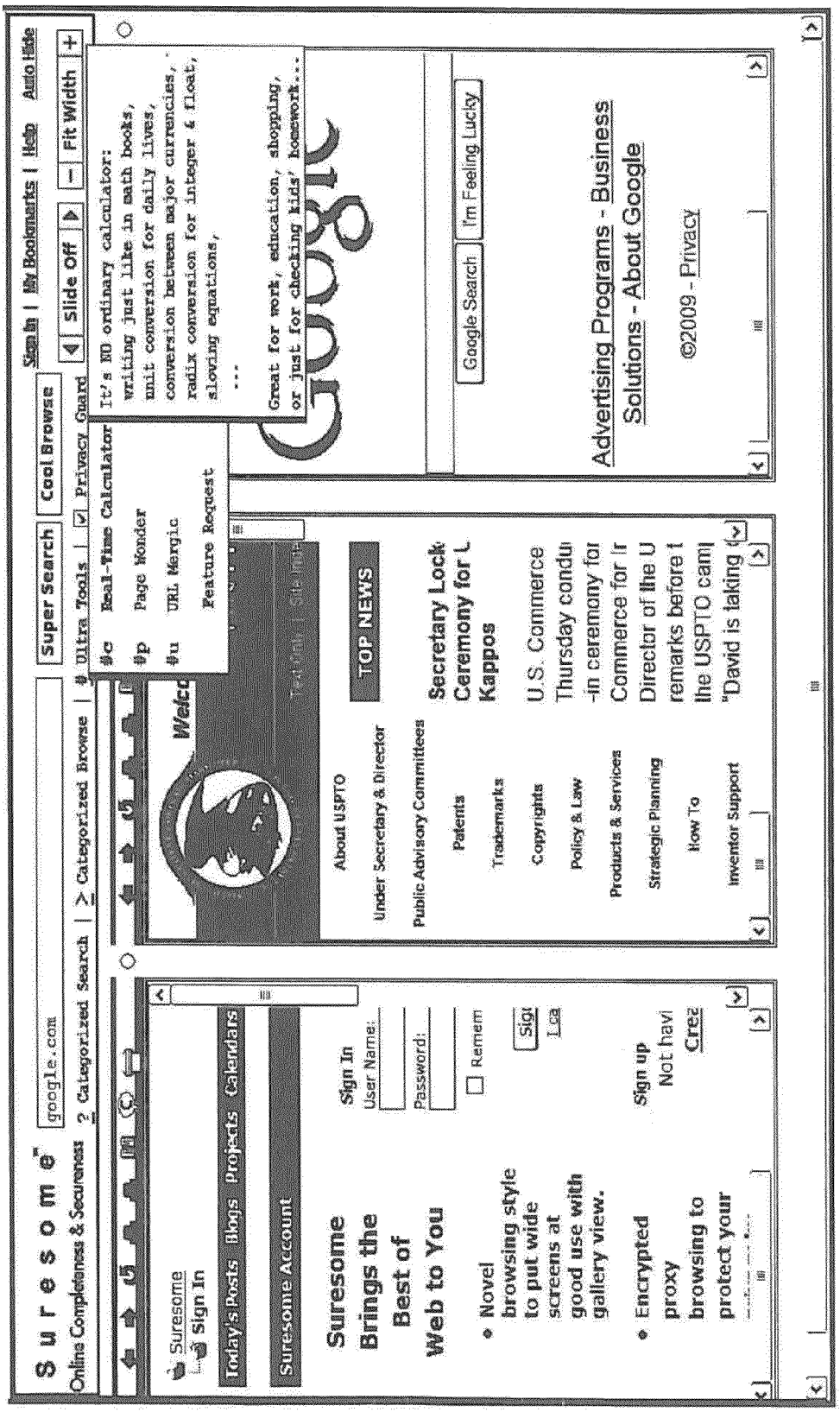

As perhaps best illustrated in FIG. 43, the system according to the present invention may provide a calculator tool to be selectively used by the user. As described in greater detail above, the calculator tool provides several advantages over traditional calculators in that it provides a 2-sheet calculator to allow a user to readily view questions and answers with which the calculator tool is being used to solve. To access the calculator tool, a user may simply click on the tool bar relating to the calculator tool or may position the mouse to hover over the tool bar to display a selection for the calculator tool.

Figure 44:
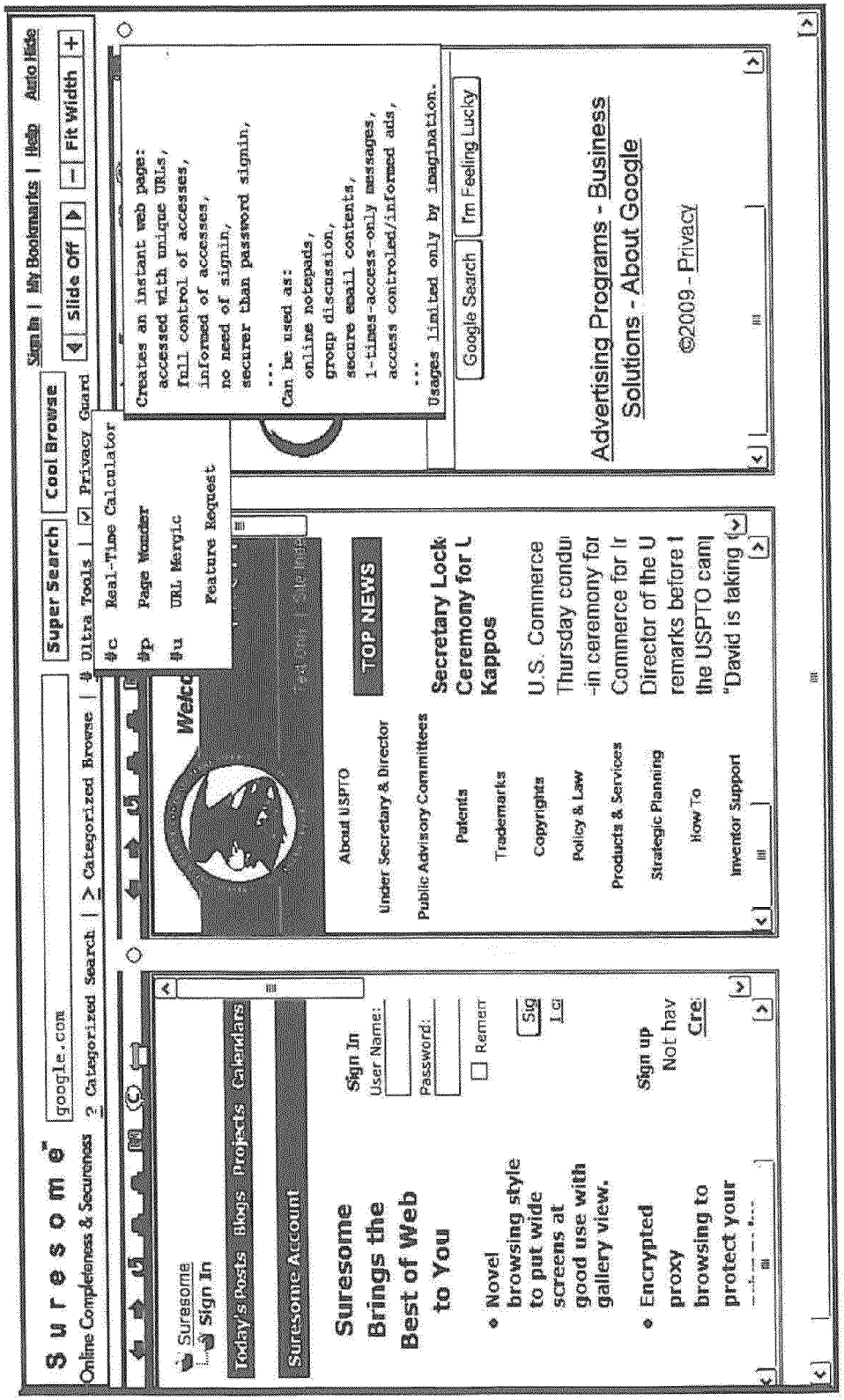

As illustrated, for example, in FIG. 44, the system and methods according to the present invention also advantageously includes a web page creation took. The web page creation tool of the system according to the present invention allows a user to create a web page access with unique URLs. It also provides the user full control of accesses, as well as providing the user with information directed to accesses. This tool can be used to create on-line notepads, group discussions, allow for the viewing of secure e-mail content, as well as several other functions that will be understood by those skilled in the art. To access the web page creation tool, a user may click on the tool bar, or may position the mouse to hover over the selection for the web page creation tool.

Figure 45:
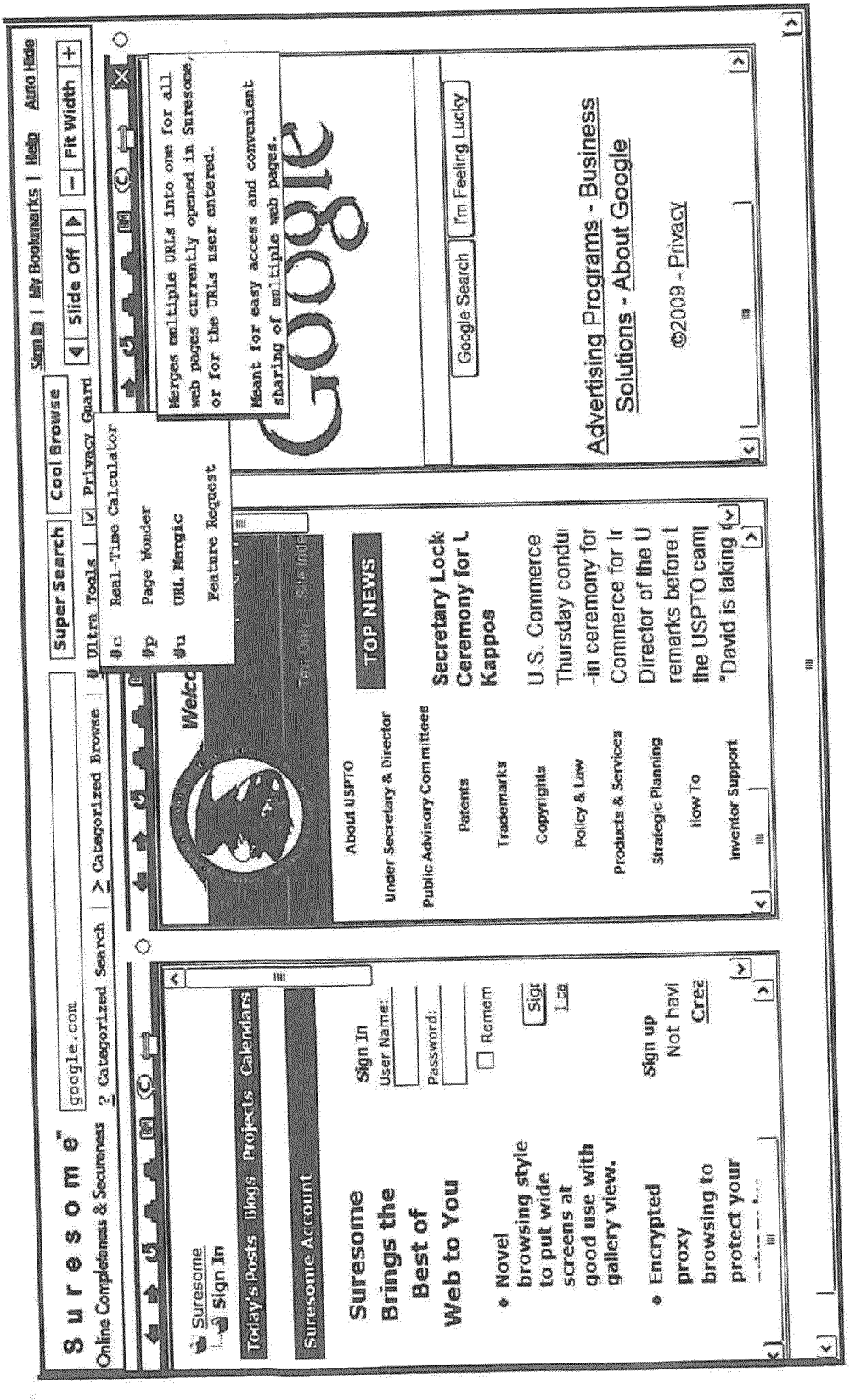
Figure 46:
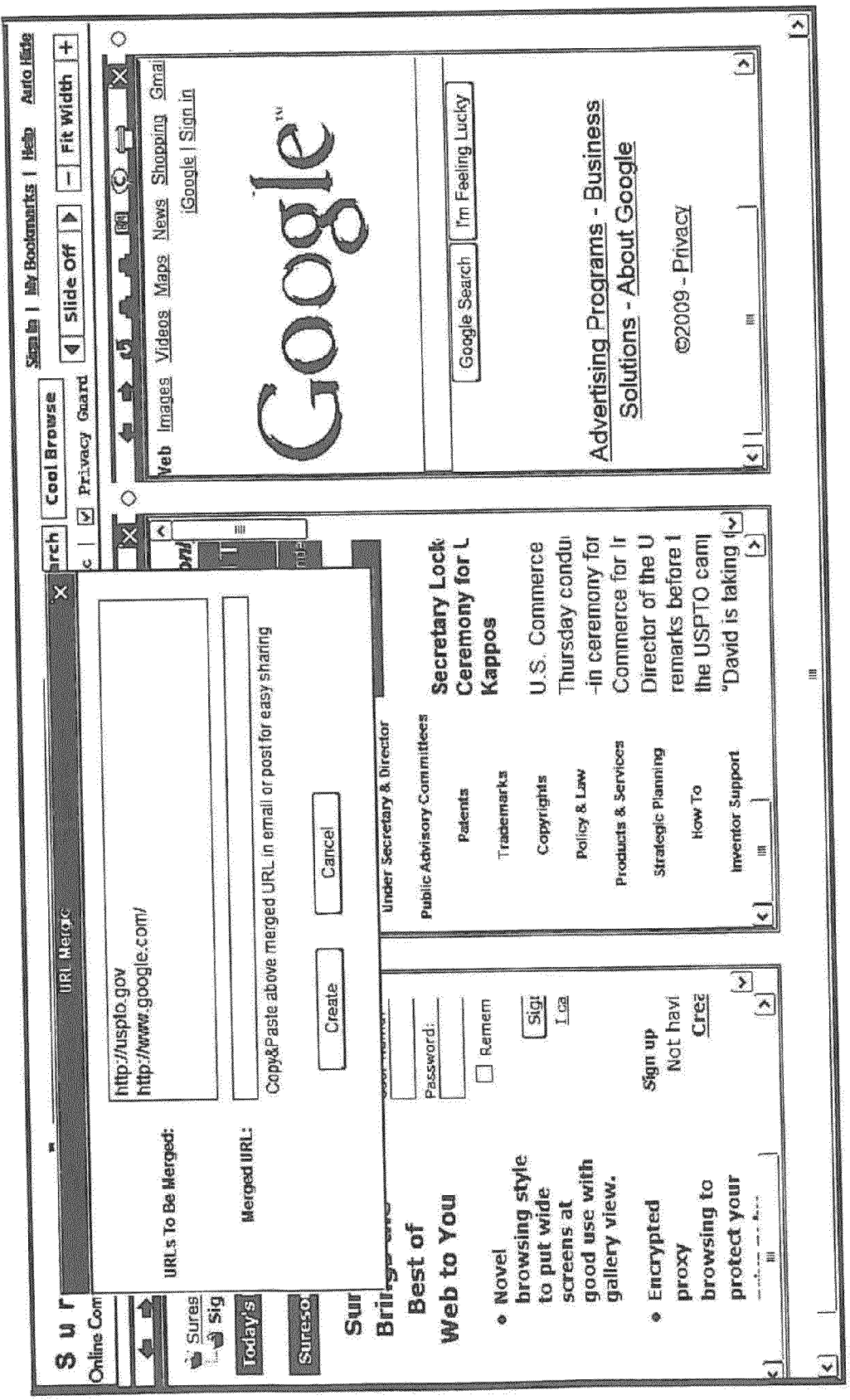

Referring finally to FIGS. 45-46, the system according to the present invention advantageously provides the user with a merge tool to provide a link relating to displaying the plurality of allocated display areas which, in turn, display the plurality of web pages in a new web browser window or a new web browser tab. As described in greater detail above, the merge tool may be used to provide a link of all the open web pages so that the link may be sent via an electronic message to another user. Upon clicking the link provided by the merge tool, an additional user may access the plurality of web pages created by the user using the merge tool. The user may access the merge tool by either clicking on the tool bar or by positioning the mouse to hover over the tool bar, and thereafter select the button relating to the merge tool.

Upon selecting the merge tool, and as perhaps best illustrated in FIG. 46, a confirmation screen may appear providing the user with a view of the URLs, i.e., web addresses, to be merged. If the user agrees with the URLs that are to be merged which are displayed in a first text box, the user may click a "create" button. Upon clicking the "create" button, the link relating to the merged websites appears in another text box. This link may be cut and pasted into an electronic message to be transmitted to another user. The present invention contemplates the ability to directly mail the merged URL displayed in the text box by clicking another button, or by inputting an e-mail address into another text box (not shown). If, however, the user does not agree with the merged URL displayed in the text box, the user may simply click the "cancel" button to exit the merge tool.

Throughout this disclosure, certain references have been made to the internet. Those skilled in the art will appreciate that this disclosure is not limited to the internet, but also encompasses any global communications network now known, or that may become known. Further, reference is made to the use of emails. It is to be understood by those skilled in the art that the disclosure is not meant to be limited to the use of emails, but instead is meant to encompass any type of electronic message such as, for example, text messages, instant messages, mobile media messages, and any other type of electronic message. Reference has also be made to a mouse pointing to items or hovering over items. Those skilled in the art will appreciate that this refers to the mouse pointer on the screen.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer implemented method for facilitating user-defined information service delivery from multiple sources using a customization toolset that comprises a categorized search menu, the method comprising:

receiving a Uniform Resource Locator (URL) for each of a plurality of web pages, each of the URLs being received as at least one of user inputs and predefined settings;

receiving a services selection defining a plurality of information services, wherein each of the plurality of web pages is configured to deliver at least one of the plurality of information services, wherein the services selection defines an information service of search service type;

allocating at least one display region within a single web browsing display area to define an allocated display region;

generating a single access address for a combined operation defined as invocation of the plurality of information services to operate in combination within the allocated display region, wherein the single access address is a categorized search command defined as a categorized search URL, and wherein the combined operation comprises a categorized search tool;

using the categorized search menu to receive search data inputted from a user via a user interface, the data being defined as inputted search data and comprising at least one of a predetermined search engine and a user-specified search engine; and using the categorized search menu to set the categorized search command configured to invoke the categorized search tool;

using the categorized search URL to invoke the categorized search tool.

2. A computer system for user-defined information service delivery from multiple sources within a single web browsing display area on a computer monitor, the system comprising:

at least one server configured to receive requests to provide a plurality of information services delivered by at least one of a plurality of web pages, wherein at least one of the plurality of information services is of a URL merge service type; and at least one user interface in communication with the at least one server, the at least one user interface configured to receive a URL for each of the plurality of web pages, each of the URLs being received as at least one of user inputs provided via the at least one user interface and predefined settings;

wherein at least one display region is allocated within the single web browsing display area to define an allocated display region so that the plurality of information services is invoked by a single access address to operate in combination within the allocated display region as specified using a customization toolset comprises at least one of a URL merging menu, a categorized search menu, and a browsing menu, the invocation being defined as a combined operation;

wherein the combined operation comprises a URL merging tool adapted to be displayed spaced apart from the at least one display region; and wherein the URL merging menu is configured to receive URL merge data inputted from a user via a user interface, the data being defined as inputted URL merge data.

3. A computer system according to claim 2 wherein the customization toolkit comprises a categorized search menu; wherein at least one of the plurality of information services is of a search service type; wherein the combined operation comprises a categorized search tool adapted to be displayed spaced apart from the at least one display region; and wherein the categorized search menu is configured to receive search data inputted from a user via a user interface, the data being defined as inputted search data.

4. A computer system according to claim 3 wherein the inputted search data comprises at least one of a predetermined search engine and a customizable selected search engine specified by the user using the categorized search menu.

5. A computer system according to claim 2 wherein the customization toolkit comprises a categorized browsing menu; wherein at least one of the plurality of information services is of a browsing service type; wherein the combined operation comprises a categorized browsing tool adapted to be displayed spaced apart from the at least one display region; and wherein the categorized browsing menu is configured to receive browsing data inputted from a user via a user interface, the data being defined as inputted browsing data.

6. A computer system according to claim 2 wherein the customization toolkit comprises a web tool accessing menu; wherein at least one of the plurality of information services is of a web tool service type; wherein the combined operation comprises a web tool accessing tool adapted to be displayed spaced apart from the at least one display region; and wherein the web tool accessing menu is configured to receive web tool data inputted from a user via a user interface, the data being defined as inputted web tool data.

7. A computer system according to claim 2 wherein the customization toolkit includes a display customization tool to allow the user to customize a size of each of the plurality of allocated display areas.

8. A computer system according to claim 2 wherein the customization toolkit comprises a position adjustment tool to allow a user to adjust a position of at least one of the plurality of web pages displayed within the single web browsing area.

9. A computer system according to claim 2 wherein the customization toolkit comprises an address display tool to display a web address of each of the plurality of web pages displayed within the single web browsing area.

10. A computer implemented method for facilitating user-defined information service delivery from multiple sources using a customization toolset wherein the customization toolset comprises a categorized browsing service type, the method comprising:
receiving a Uniform Resource Locator (URL) for each of a plurality of web pages, each of the URLs being received as at least one of user inputs and predefined settings;
receiving a services selection defining a plurality of information services, wherein each of the plurality of web pages is configured to deliver at least one of the plurality of information services, wherein the service selection defines an information service of browsing service type;
allocating at least one display region within a single web browsing display area to define an allocated display region;
generating a single access address for a combined operation defined as invocation of the plurality of information services to operate in combination within the allocated display region, wherein the single access address is a categorized browsing command that is defined as a categorized browsing URL, and wherein the combined operation comprises a categorized browsing tool;
using the categorized browsing menu to receive browsing data inputted from a user via a user interface, the browsing data being defined as inputted browsing data and comprising at least one of a predetermined browsing service and a user-specified browsing service;
using the categorized browsing menu to set the categorized browsing command configured to invoke the categorized browsing tool; and
using the categorized browsing URL to invoke the categorized browsing tool.

11. A method according to claim 10 wherein the method further comprises using the categorized browsing menu to receive browsing category data inputted from a user via a user interface, the browsing category data being defined as inputted browsing category data and comprising at least one of a predetermined browsing category and a user-specified browsing category each of a browsing category type selected from the group consisting of email, social networking, blog, news, weather, and traffic.

12. A computer implemented method for facilitating user-defined information service delivery from multiple sources using a customization toolset, wherein the customization toolset comprises a web tool accessing menu, the method comprising:
receiving a Uniform Resource Locator (URL) for each of a plurality of web pages, each of the URLs being received as at least one of user inputs and predefined settings;
receiving a services selection defining a plurality of information services, wherein each of the plurality of web pages is configured to deliver at least one of the plurality of information services, wherein the services selection defines an information service of web tool service type;
allocating at least one display region within a single web browsing display area to define an allocated display region;
generating a single access address for a combined operation defined as invocation of the plurality of information services to operate in combination within the allocated display region, wherein the single access address is a web tool accessing command defined as a web tool accessing URL, and wherein the combined operation comprises a web tool accessing tool;
using the web tool accessing menu to receive web tool data inputted from a user via a user interface, the web tool data being defined as inputted web tool data and comprising at least one of a predetermined web tool service and a user-specified web tool service;
using the web tool accessing menu to set the web tool accessing command configured to invoke the web tool accessing tool; and
using the web tool accessing URL to invoke the web tool accessing tool.

13. A method according to claim 12 wherein the web tool accessing URL is a 2-sheet calculator URL; and wherein the method further comprises using the 2-sheet calculator URL to invoke a 2-sheet calculator tool.

14. A method according to claim 13 wherein the 2-sheet calculator tool includes a 2-sheet calculator user interface comprising a question sheet and an answer sheet; and the method further comprises:
using the question sheet of the 2-sheet calculator user interface to receive input questions;
using the answer sheet of the 2-sheet calculator user interface to display output answers.

15. A computer implemented method for facilitating user-defined information service delivery from multiple sources using a customization toolset, wherein the customization toolset comprises a URL merging menu, the method comprising:
receiving a Uniform Resource Locator (URL) for each of a plurality of web pages, each of the URLs being received as at least one of user inputs and predefined settings;
receiving a services selection defining a plurality of information services, wherein each of the plurality of web pages is configured to deliver at least one of the plurality of information services, wherein the services selection defines an information service of URL merge service type;

allocating at least one display region within a single web browsing display area to define an allocated display region;

generating a single access address for a combined operation defined as invocation of the plurality of information services to operate in combination within the allocated display region, wherein the single access address is a merged URL, and wherein the combined operation comprises a URL merging tool;

using the URL merging menu to receive URL merge data inputted from a user via a user interface, the URL merge data being defined as inputted URL merge data and comprising at least one of a predetermined URL and a user-specified URL; and using the URL merging menu to set the merged URL configured to invoke the URL merging tool.

* * * * *